(12) United States Patent
Aoki et al.

(10) Patent No.: US 8,056,199 B2
(45) Date of Patent: Nov. 15, 2011

(54) METHODS OF PRODUCING MULTILAYER CAPACITOR

(75) Inventors: Takashi Aoki, Tokyo (JP); Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 111 days.

(21) Appl. No.: 12/537,834

(22) Filed: Aug. 7, 2009

(65) Prior Publication Data

US 2010/0095498 A1  Apr. 22, 2010

(30) Foreign Application Priority Data

Oct. 21, 2008 (JP) .................................. 2008-271219
Oct. 21, 2008 (JP) .................................. 2008-271220
Oct. 21, 2008 (JP) .................................. 2008-271249

(51) Int. Cl.
  *H01G 4/12* (2006.01)
(52) U.S. Cl. ...... 29/25.42; 29/593; 29/25.03; 361/306.3
(58) Field of Classification Search ............ 29/830–831, 29/846–847, 25.01–25.03, 25.41–25.42; 361/502–504, 514–518, 303, 306.3, 311
See application file for complete search history.

(56) References Cited

U.S. PATENT DOCUMENTS

| | | | | |
|---|---|---|---|---|
| 5,488,765 | A * | 2/1996 | Kubota et al. | 29/593 |
| 6,715,197 | B2 * | 4/2004 | Okuyama et al. | 29/592.1 |
| 6,938,332 | B2 * | 9/2005 | Harada et al. | 29/830 |
| 7,369,395 | B2 | 5/2008 | Togashi | |
| 7,828,033 | B2 * | 11/2010 | Aoki | 156/541 |

FOREIGN PATENT DOCUMENTS

| | | |
|---|---|---|
| JP | A-62-118505 | 5/1987 |
| JP | A-2000-49058 | 2/2000 |
| JP | A-2002-184647 | 6/2002 |
| JP | A-2003-168621 | 6/2003 |
| JP | A-2004-179528 | 6/2004 |
| JP | A-2006-286930 | 10/2006 |

* cited by examiner

*Primary Examiner* — Minh Trinh
(74) *Attorney, Agent, or Firm* — Oliff & Berridge, PLC

(57) ABSTRACT

A method of producing a multilayer capacitor has steps of preparing a plurality of first and second ceramic green sheets, a step of laminating the plurality of first and second ceramic green sheets, and a step of cutting a ceramic green sheet laminate body along predetermined intended cutting lines to obtain laminate chips of individual multilayer capacitor units. When preparing the first ceramic green sheets, first and second internal electrode patterns are formed so that the first and second internal electrode patterns are alternately arranged in a perpendicular configuration, with the first and second internal electrode patterns being continuous across intended cutting lines.

12 Claims, 79 Drawing Sheets (a)

(b)

(a)

(b)

(a)

(b)

(a)

(b)

(a)

(b)

(a)

(b)

METHODS OF PRODUCING MULTILAYER CAPACITOR

BACKGROUND OF THE INVENTION

1. Field of the Invention

The present invention relates to methods of producing a multilayer capacitor with an element body including a capacitance section and an ESR control section.

2. Related Background Art

There is a known multilayer capacitor having an element body of a nearly rectangular parallelepiped shape in which a plurality of internal electrodes are laminated together with a dielectric layer in between (e.g., Japanese Patent Application Laid-open No. 2003-168621 hereinafter referred to as Patent Document 1). In the multilayer capacitor described in Patent document 1, the element body includes a capacitance section and an ESR (Equivalent Series Resistance) control section.

The capacitance section is configured in a structure in which a first internal electrode exposed in a first side face and connected to a first polarity and a second internal electrode exposed in a second side face opposed to the first side face and connected to a second polarity alternate with at least one dielectric layer in between. The ESR control section is configured with a third internal electrode exposed in the first side face in which the first internal electrode is exposed and in a third side face adjacent to the first side face, and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity.

In the capacitance section the first and second internal electrodes are connected to connection conductors only and in the ESR control section the third and fourth internal electrodes are connected to the respective connection conductors and external electrodes. In the multilayer capacitor described in Patent Document 1, therefore, the connection conductors to which the first and second internal electrodes are connected in parallel are connected in series to the external electrodes and, therefore, a higher ESR can be achieved when compared with the conventional configuration where the internal electrodes are connected in parallel to the external electrodes.

SUMMARY OF THE INVENTION

In production of the multilayer capacitor described in Patent Document 1, because the multilayer capacitor has the first to fourth internal electrodes, it is generally necessary to prepare a ceramic green sheet on which a first internal electrode pattern corresponding to the first internal electrode is formed, a ceramic green sheet on which a second internal electrode pattern corresponding to the second internal electrode is formed, a ceramic green sheet on which a third internal electrode pattern corresponding to the third internal electrode is formed, and a ceramic green sheet on which a fourth internal electrode pattern corresponding to the fourth internal electrode is formed. Then these ceramic green sheets are laminated in a predetermined order to obtain a ceramic green sheet laminate body. Thereafter, the obtained ceramic green sheet laminate body is cut along predetermined intended cutting lines to obtain a laminate chip of an individual multilayer capacitor unit, and the laminate chip is fired to obtain an element body.

However, the above production method needs to prepare the four types of ceramic green sheets on which the corresponding internal electrode patterns each are independently formed, in addition to ceramic green sheets without internal electrode patterns, which complicates production steps and which may increase production cost. If in the above production method a deviation is caused on the occasion of laminating the ceramic green sheets or on the occasion of cutting the ceramic green sheet laminate body, lead portions of the internal electrodes could fail to be exposed in the side faces of the element body. In this case, it becomes infeasible to achieve the function as a capacitor and the multilayer capacitor obtained is a defective product, which decreases a production yield.

An object of the present invention is therefore to provide multilayer capacitor production methods capable of simply obtaining a multilayer capacitor with an element body including a capacitance section and an ESR control section and improving a production yield of the multilayer capacitor.

A method according to the present invention is a method of producing a multilayer capacitor comprising an element body of a substantially rectangular parallelepiped shape in which a plurality of internal electrodes are laminated together with a dielectric layer in between, the element body including: a capacitance section constructed in a structure in which a first internal electrode exposed in a first side face and connected to a first polarity and a second internal electrode exposed in a second side face opposed to the first side face and connected to a second polarity alternate with at least one dielectric layer in between; and an ESR control section having a third internal electrode exposed in the first side face in which the first internal electrode is exposed and in a third side face adjacent to the first side face, and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity, the method comprising: a step of preparing a plurality of first ceramic green sheets for the capacitance section on each of which a first internal electrode pattern corresponding to the first internal electrode and a second internal electrode pattern corresponding to the second internal electrode are formed; a step of preparing a plurality of second ceramic green sheets for the ESR control section on each of which a third internal electrode pattern corresponding to the third internal electrode and a fourth internal electrode pattern corresponding to the fourth internal electrode are formed; a step of laminating the plurality of first and second ceramic green sheets in such a manner that the first ceramic green sheets deviate from each other and the second ceramic green sheets deviate from each other by a length of one internal electrode pattern between two adjacent sheets in a predetermined direction, to obtain a ceramic green sheet laminate body; a step of cutting the ceramic green sheet laminate body along a predetermined intended cutting line to obtain a laminate chip of an individual multilayer capacitor unit; and a step of firing the laminate chip to obtain the element body, wherein in the step of preparing the first ceramic green sheets, the first and second internal electrode patterns are formed so that the first and second internal electrode patterns are alternately arranged in the predetermined direction and in a direction perpendicular to the predetermined direction and so that portions corresponding to lead portions of the first and second internal electrodes in the first and second internal electrode patterns are continuous across the predetermined intended cutting line, and wherein in the step of preparing the second ceramic green sheets, the third and fourth internal electrode patterns are formed so that the third and fourth internal electrode patterns are alternately arranged in the predetermined direction and in the direction perpendicular to the predetermined direction and so that portions corresponding to lead portions of the third and fourth internal electrodes in the third and fourth internal electrode patterns are continuous across the predetermined intended cutting line.

In the production method of multilayer capacitor according to the present invention, the ceramic green sheets with the internal electrode patterns to be prepared are just the two types of ceramic green sheets, the first ceramic green sheets for the capacitance section on which the first and second internal electrode patterns are formed and the second ceramic green sheets for the ESR control section on which the third and fourth internal electrode patterns are formed; therefore, it simplifies the production steps and reduces the production cost.

According to the present invention, the portions corresponding to the lead portions are continuous across the predetermined intended cutting line in the first and second internal electrode patterns formed on the first ceramic green sheets. Furthermore, the portions corresponding to the lead portions are also continuous across the predetermined intended cutting line in the third and fourth internal electrode patterns formed on the second ceramic green sheets. For this reason, even if a deviation is caused on the occasion of laminating the ceramic green sheets or on the occasion of cutting the ceramic green sheet laminate body, the portions corresponding to the lead portions of the first to fourth internal electrodes in the first to fourth internal electrode patterns will be always exposed in the side faces (cut faces) in the resultant laminate chip. Therefore, the present invention suppresses occurrence of a defective product in which the first to fourth internal electrodes fail to be exposed in the side faces of the element body, and permits the multilayer capacitor with the element body including the capacitance section and the ESR control section to be produced with a good yield.

Another method according to the present invention is a method of producing a multilayer capacitor comprising an element body of a substantially rectangular parallelepiped shape in which a plurality of internal electrodes are laminated together with a dielectric layer in between, the element body including: a capacitance section constructed in a structure in which a first internal electrode exposed in a first side face and connected to a first polarity and a second internal electrode exposed in a second side face opposed to the first side face and connected to a second polarity alternate with at least one dielectric layer in between; and an ESR control section having a third internal electrode exposed in the first side face in which the first internal electrode is exposed and in a third side face adjacent to the first side face, and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity, the method comprising: a step of preparing a plurality of first ceramic green sheets for the capacitance section on each of which a first internal electrode pattern corresponding to the first internal electrode and a second internal electrode pattern corresponding to the second internal electrode are formed; a step of preparing a plurality of second ceramic green sheets for the ESR control section on each of which a third internal electrode pattern corresponding to the third internal electrode and a fourth internal electrode pattern corresponding to the fourth internal electrode are formed; a step of laminating the plurality of first and second ceramic green sheets in such a manner that the first ceramic green sheets deviate from each other and the second ceramic green sheets deviate from each other by a length of one internal electrode pattern between two adjacent sheets in a predetermined direction, to obtain a ceramic green sheet laminate body; a step of cutting the ceramic green sheet laminate body along a predetermined intended cutting line to obtain a laminate chip of an individual multilayer capacitor unit; and a step of firing the laminate chip to obtain the element body, wherein in the step of preparing the first ceramic green sheets, the first and second internal electrode patterns are formed so that the first and second internal electrode patterns are alternately arranged in the predetermined direction and in a direction perpendicular to the predetermined direction and so that portions corresponding to lead portions of the first and second internal electrodes in the first and second internal electrode patterns are continuous across the predetermined intended cutting line, and wherein in the step of preparing the second ceramic green sheets, the third and fourth internal electrode patterns are formed so that the third and fourth internal electrode patterns are alternately arranged in the predetermined direction and in the direction perpendicular to the predetermined direction, so that portions corresponding to lead portions of the third and fourth internal electrodes in the third and fourth internal electrode patterns are continuous across the predetermined intended cutting line, and so that the third and fourth internal electrode patterns are alternately connected in one direction intersecting with the predetermined direction and the direction perpendicular to the predetermined direction.

In the production method of multilayer capacitor according to the present invention, the ceramic green sheets with the internal electrode patterns to be prepared are just the two types of ceramic green sheets, the first ceramic green sheets for the capacitance section on which the first and second internal electrode patterns are formed and the second ceramic green sheets for the ESR control section on which the third and fourth internal electrode patterns are formed; therefore, it simplifies the production steps and reduces the production cost.

According to the present invention, the portions corresponding to the lead portions are continuous across the predetermined intended cutting line in the first and second internal electrode patterns formed on the first ceramic green sheets. Furthermore, the portions corresponding to the lead portions are also continuous across the predetermined intended cutting line in the third and fourth internal electrode patterns formed on the second ceramic green sheets. For this reason, even if a deviation is caused on the occasion of laminating the ceramic green sheets or on the occasion of cutting the ceramic green sheet laminate body, the portions corresponding to the lead portions of the first to fourth internal electrodes in the first to fourth internal electrode patterns will be always exposed in the side faces (cut faces) in the resultant laminate chip. Therefore, the present invention suppresses occurrence of a defective product in which the first to fourth internal electrodes fail to be exposed in the side faces of the element body, and permits the multilayer capacitor with the element body including the capacitance section and the ESR control section to be produced with a good yield.

Still another method according to the present invention is a method of producing a multilayer capacitor comprising an element body of a substantially rectangular parallelepiped shape in which a plurality of internal electrodes are laminated together with a dielectric layer in between, the element body including: a capacitance section constructed in a structure in which a first internal electrode exposed in a first side face and connected to a first polarity and a second internal electrode exposed in a second side face opposed to the first side face, and connected to a second polarity alternate with at least one dielectric layer in between; and an ESR control section having a third internal electrode exposed in the first side face in which the first internal electrode is exposed and in a third side face adjacent to the first side face, and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity, the method comprising: a step of preparing a plurality of first ceramic green sheets for the capacitance section on each of which a first internal electrode pattern corresponding to the first internal electrode and a second internal electrode pattern corresponding to the second internal electrode are formed; a step of preparing a plurality of second ceramic green sheets for the ESR control section on each of which a third internal electrode pattern corresponding to the third internal electrode and a fourth internal electrode pattern corresponding to the fourth internal electrode are formed; a step of laminating the plurality of first and second ceramic green sheets in such a manner that the first ceramic green sheets deviate from each other and the second ceramic green sheets deviate from each other by a length of one internal electrode pattern between two adjacent sheets in a predetermined direction, to obtain a ceramic green sheet laminate body; a step of cutting the ceramic green sheet laminate body along a predetermined intended cutting line to obtain a laminate chip of an individual multilayer capacitor unit; and a step of firing the laminate chip to obtain the element body, wherein in the step of preparing the first ceramic green sheets, the first and second internal electrode patterns are formed so that the first and second internal electrode patterns are arranged each in juxtaposition in a first direction and alternately arranged in a second direction perpendicular to the first direction and so that portions corresponding to lead portions of the first and second internal electrodes in the first and second internal electrode patterns are continuous across the predetermined intended cutting line, wherein in the step of preparing the second ceramic green sheets, the third and fourth internal electrode patterns are formed so that the third and fourth internal electrode patterns are alternately arranged in one direction out of the first and second directions and arranged each in juxtaposition in the other direction out of the first and second directions, so that portions corresponding to lead portions of the third and fourth internal electrodes in the third and fourth internal electrode patterns are continuous across the predetermined intended cutting line, and so that, concerning four mutually adjacent third and fourth internal electrode patterns, the third and fourth internal electrode patterns are connected in a circuiting shape, and wherein in the step of obtaining the ceramic green sheet laminate body, the predetermined direction is set to be a direction intersecting with the first and second directions.

In the production method of multilayer capacitor according to the present invention, the ceramic green sheets with the internal electrode patterns to be prepared are just the two types of ceramic green sheets, the first ceramic green sheets for the capacitance section on which the first and second internal electrode patterns are formed and the second ceramic green sheets for the ESR control section on which the third and fourth internal electrode patterns are formed; therefore, it simplifies the production steps and reduces the production cost.

According to the present invention, the portions corresponding to the lead portions are continuous across the predetermined intended cutting line in the first and second internal electrode patterns formed on the first ceramic green sheets. Furthermore, the portions corresponding to the lead portions are also continuous across the predetermined intended cutting line in the third and fourth internal electrode patterns formed on the second ceramic green sheets. For this reason, even if a deviation is caused on the occasion of laminating the ceramic green sheets or on the occasion of cutting the ceramic green sheet laminate body, the portions corresponding to the lead portions of the first to fourth internal electrodes in the first to fourth internal electrode patterns will be always exposed in the side faces (cut faces) in the resultant laminate chip. Therefore, the present invention suppresses occurrence of a defective product in which the first to fourth internal electrodes fail to be exposed in the side faces of the element body, and permits the multilayer capacitor with the element body including the capacitance section and the ESR control section to be produced with a good yield.

Preferably, the predetermined intended cutting line includes a first intended cutting line extending in parallel with the predetermined direction, and a second intended cutting line perpendicular to the first intended cutting line, and in the portions corresponding to the lead portions of the third and fourth internal electrodes, a width of a region across the first intended cutting line is different from a width of a region across the second intended cutting line. In this case, it is feasible to simply obtain the multilayer capacitor in which the widths of the lead portions of the third internal electrode and the fourth internal electrode are different.

Preferably, in the step of preparing the first ceramic green sheets, an electrode pattern for a dummy electrode is formed so as to have a space from the first and second internal electrode patterns and extend across the predetermined intended cutting line, and in the step of preparing the second ceramic green sheets, an electrode pattern for a dummy electrode is formed so as to have a space from the third and fourth internal electrode patterns and extend across the predetermined intended cutting line. In this case, the electrode patterns for the dummy electrodes are always exposed in the side faces (cut faces) in the laminate chip obtained, thereby obtaining the element body in which the dummy electrodes are also exposed in the side faces. The dummy electrodes are provided for increasing contact areas with external conductors in forming the external conductors on the element body and thereby increasing connection strength between the element body and the external conductors. When the electrode patterns for dummy electrodes are formed on the first and second ceramic green sheets, the electrode patterns function as level difference absorbing layers, which suppresses occurrence of a level difference due to the thickness of the first to fourth internal electrode patterns and thus prevents the laminate chip (element body) from being deformed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference symbols, without redundant description.

First Embodiment

Figure 1:
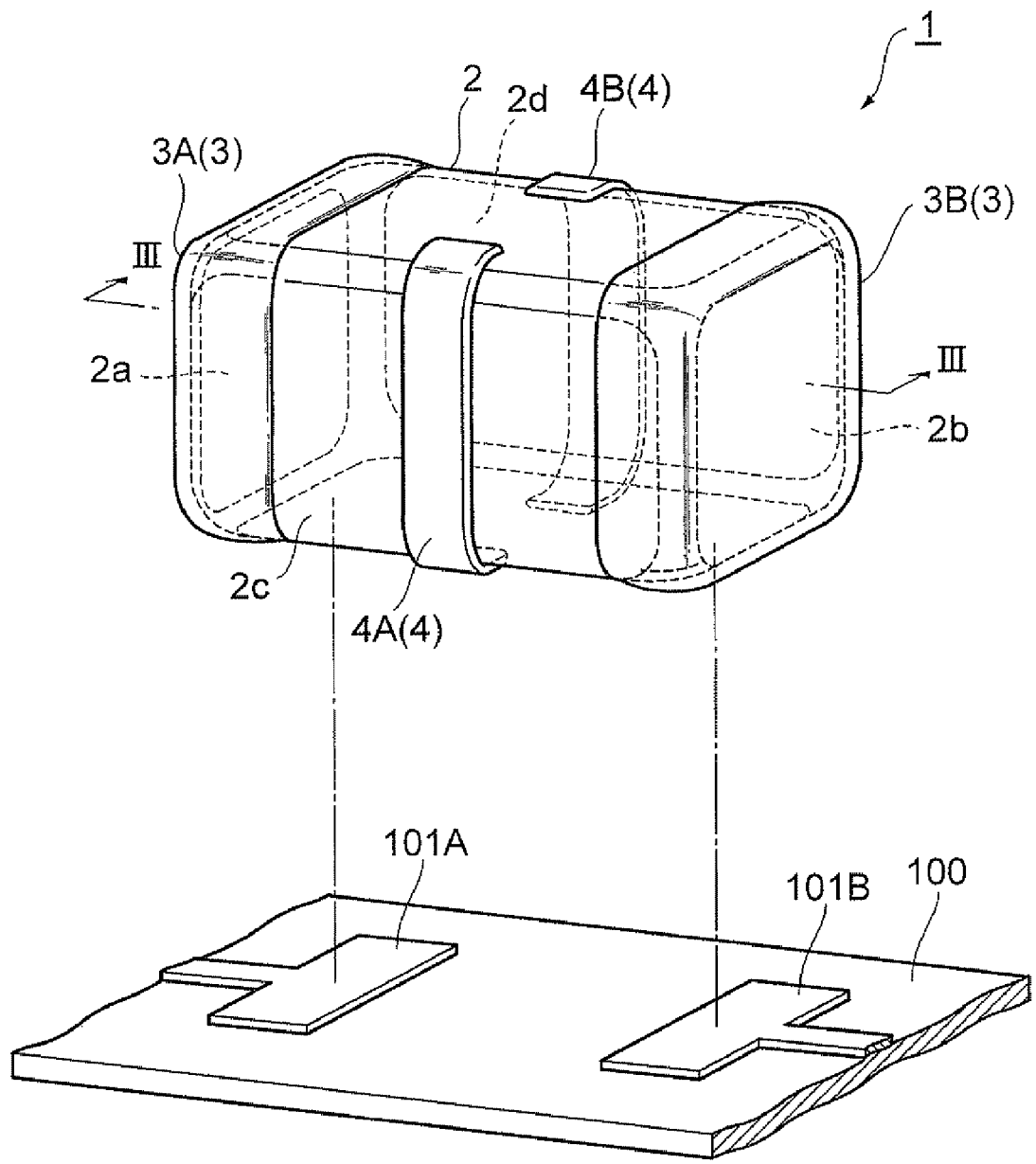
FIG. 1 is a perspective view showing a multilayer capacitor according to the first embodiment.
Figure 2:
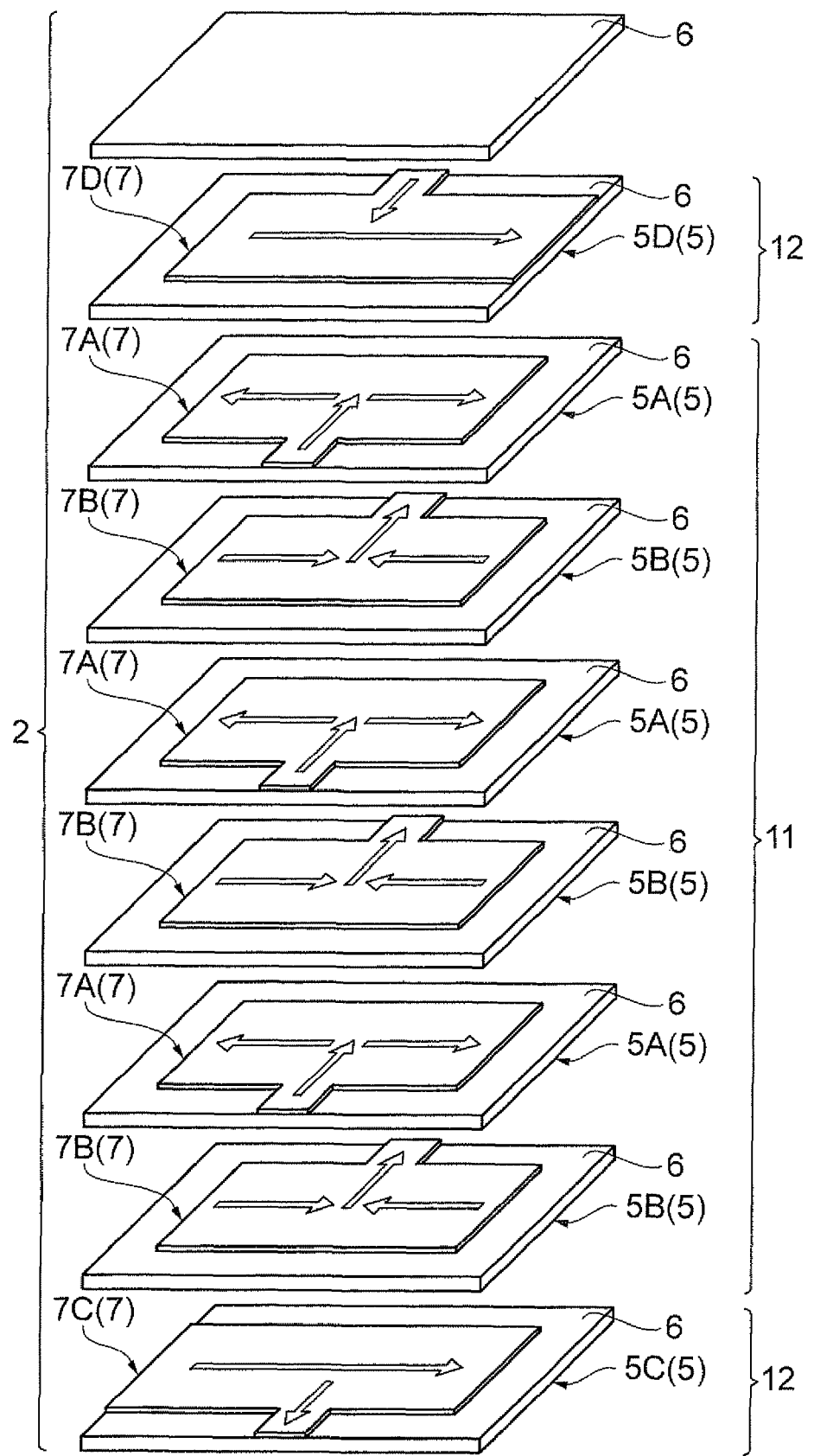
FIG. 2 is a drawing showing a layer configuration of the multilayer capacitor shown in FIG. 1.
Figure 3:
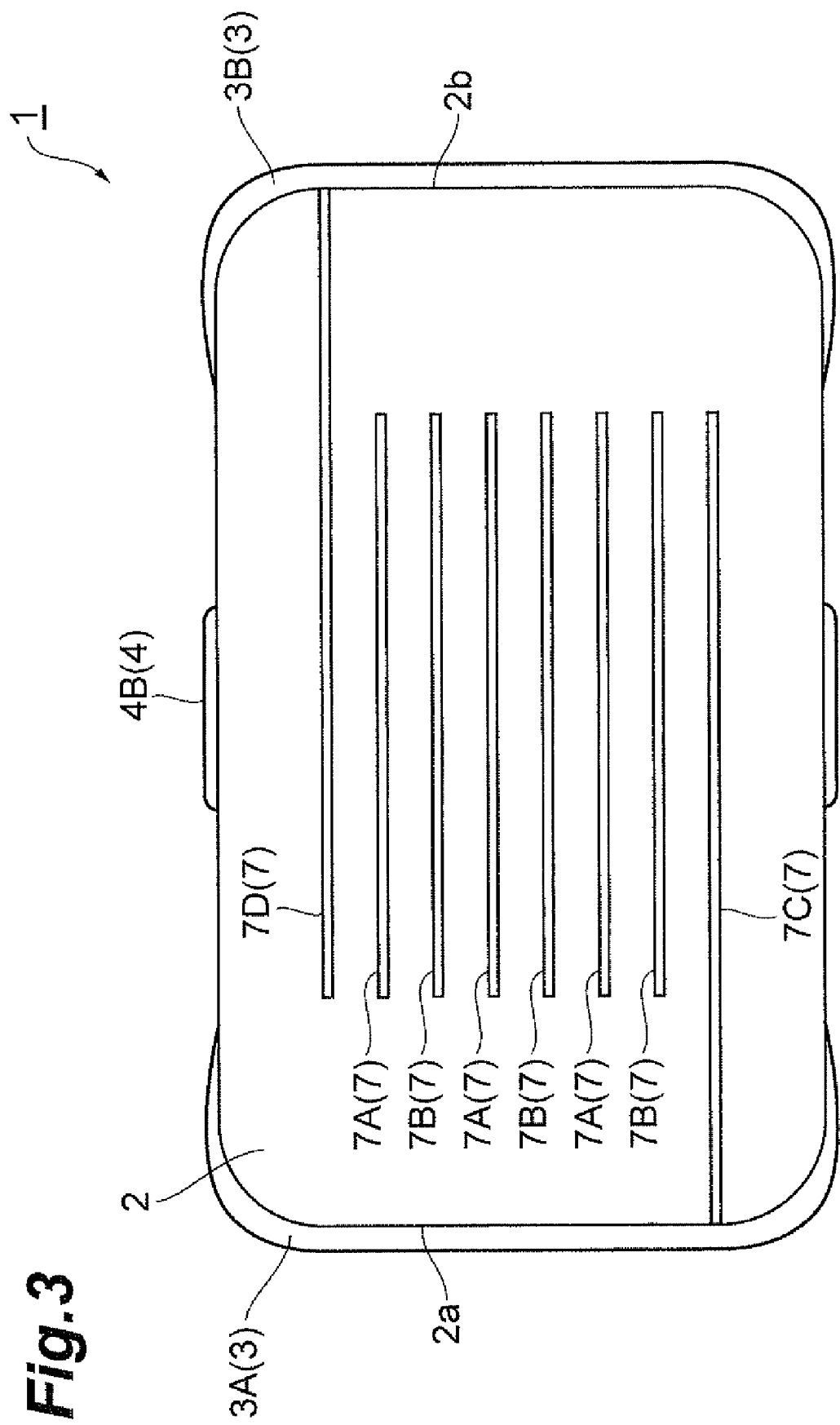
FIG. 3 is a sectional view along line III-III in FIG. 1.

First, the following will describe a configuration of a multilayer capacitor 1 produced by a production method of multilayer capacitor according to the first embodiment, with reference to FIGS. 1 to 3. FIG. 1 is a perspective view showing the multilayer capacitor according to the first embodiment. FIG. 2 is a drawing showing a layer configuration of the multilayer capacitor shown in FIG. 1 and FIG. 3 a sectional view along line III-III in FIG. 1.

As shown in FIGS. 1 to 3, the multilayer capacitor 1 is constructed with an element body 2 of a nearly rectangular parallelepiped shape, and a plurality of external conductors arranged on the exterior surface of the element body 2. The plurality of external conductors consist of external electrodes 3 (3A, 3B) formed on side faces opposed to each other in the longitudinal direction of the element body 2, and connection conductors 4 (4A, 4B) formed on side faces opposed to each other in the transverse direction of the element body 2.

The element body 2, as shown in FIG. 2, is composed of a plurality of composite layers 5 with internal electrodes 7 of different patterns on dielectric layers 6, and the dielectric layers 6 laid as outermost layers of the composite layers 5 and functioning as protecting layers. The dielectric layers 6 consist of sintered bodies of ceramic green sheets containing a dielectric ceramic and the internal electrodes 7 consist of sintered bodies of an electroconductive paste. In the practical multilayer capacitor 1, the layers are so integrated that no boundary can be visually recognized between the dielectric layers 6, 6.

The external electrodes 3 and connection conductors 4 are made by firing an electroconductive paste containing an electroconductive metal powder and glass frit. The external electrodes 3 are electrodes connected to predetermined polarities when the multilayer capacitor 1 is mounted on a mounting board. The connection conductors 4 are conductors which connect the internal electrodes 7 belonging to a below-described capacitance section 11 in the element body 2, in parallel to each other, and so-called NC (No Contact) conductors not to be connected directly to the mounting board.

The external electrode 3A is an electrode connected, for example, to the positive polarity (first polarity) on the occasion of mounting the multilayer capacitor 1 on the board, and is formed so as to cover one side face 2a out of the pair of side faces opposed in the longitudinal direction of the element body 2. The external electrode 3B is an electrode connected, for example, to the negative polarity (second polarity) on the occasion of mounting the multilayer capacitor 1 on the board, and is formed so as to cover the other side face 2b out of the pair of side faces opposed in the longitudinal direction of the element body 2.

The connection conductor 4A is formed on one side face 2c along a lamination direction out of the side faces perpendicular to the pair of side faces 2a, 2b of the element body 2 and the connection conductor 4B is formed on the other side face 2d opposed to the side face 2c. The connection conductors 4A, 4B extend in a belt-like shape in the aforementioned lamination direction on the side faces 2c, 2d, respectively, and have pad portions projecting onto the end faces in the lamination direction of the element body 2. The external electrodes 3A, 3B and the connection conductors 4A, 4B are kept separate from each other with a predetermined space between them and electrically insulated from each other.

A board 100 to be used in mounting of the multilayer capacitor 1 has an anode land pattern 101A and a cathode land pattern 101B. The anode land pattern 101A and the cathode land pattern 101B are formed, for example, in a belt-like shape along the width direction of the external electrode 3A and external electrode 3B and connected to predetermined circuit wires. In a mounted structure of the multilayer capacitor 1, the external electrode 3A is bonded to the anode land pattern 101A and the external electrode 3B to the cathode land pattern 101B. The connection conductor 4A and the connection conductor 4B are bonded to neither the anode land pattern 101A nor the cathode land pattern 101B. Namely, in the mounted structure of the multilayer capacitor 1, only the external electrode 3A and external electrode 3B are made to be bonded to the board 100.

The configuration of the element body 2 will be described below in further detail.

The element body 2, as shown in FIGS. 2 and 3, has a capacitance section 11 contributing mainly to the capacitance of the multilayer capacitor, and an ESR control section 12 for controlling ESR of the multilayer capacitor 1.

Figure 4:
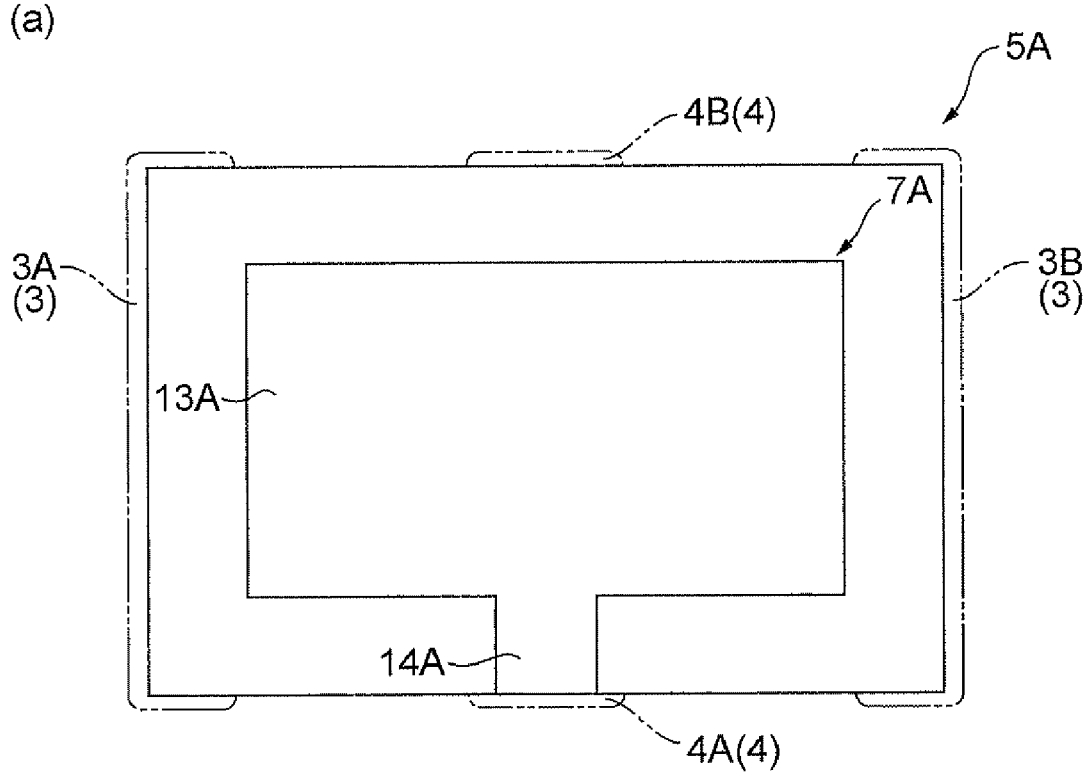
FIG. 4 is a plan view showing composite layers in a capacitance section.
Figure 4:
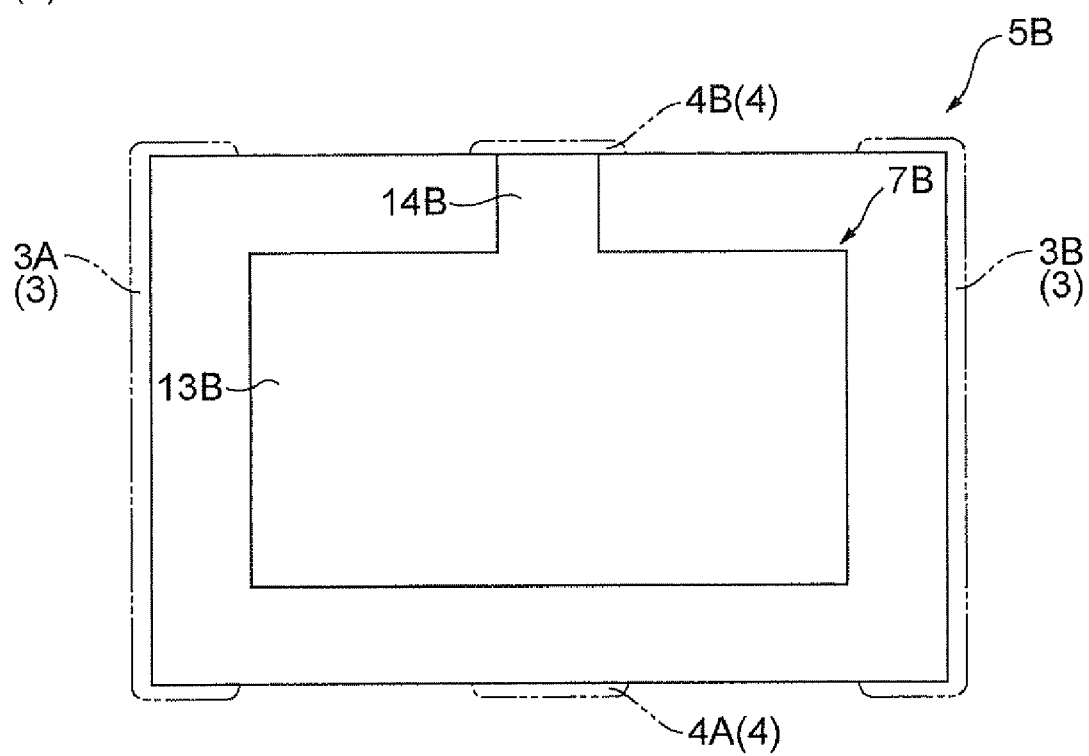

The capacitance section 11, as shown in FIG. 4, is formed in a structure in which two types of composite layers 5A, 5B different in the shape of the internal electrode are alternately laminated in multiple layers. The internal electrode 7A of each composite layer 5A, as shown in FIG. 4(a), has a main electrode portion 13A formed in a central region, and a lead portion 14A led from one side of the main electrode portion 13A. The main electrode portion 13A is of a nearly rectangular shape. The lead portion 14A is of a belt-like shape. The end of the lead portion 14A is exposed in the side face 2c of the element body 2 to be connected to the connection conductor 4A.

The internal electrode 7B of each composite layer 5B, as shown in FIG. 4(b), has a main electrode portion 13B formed in a central region, and a lead portion 14B led from one side of the main electrode portion 13B. The main electrode portion 13B is of a nearly rectangular shape. In the first embodiment, the main electrode portion 13A and the main electrode portion 13B have the same shape. The lead portion 14B is of a belt-like shape. The end of the lead portion 14B is exposed in the side face 2d of the element body 2, opposite to the lead portion 14A, and is connected to the connection conductor 4B. In the first embodiment, the lead portion 14A and the lead portion 14B have the same shape.

In the capacitance section 11, mutually overlapping portions where the main electrode portions 13A of the internal electrodes 7A and the main electrode portions 13B of the internal electrodes 7B overlap each other when viewed from the lamination direction, serve as a capacitance forming region. In the first embodiment, the entire surface of the main electrode portion 13A overlaps with the entire surface of the main electrode portion 13B, which ensures a sufficient capacitance forming region.

Figure 5:
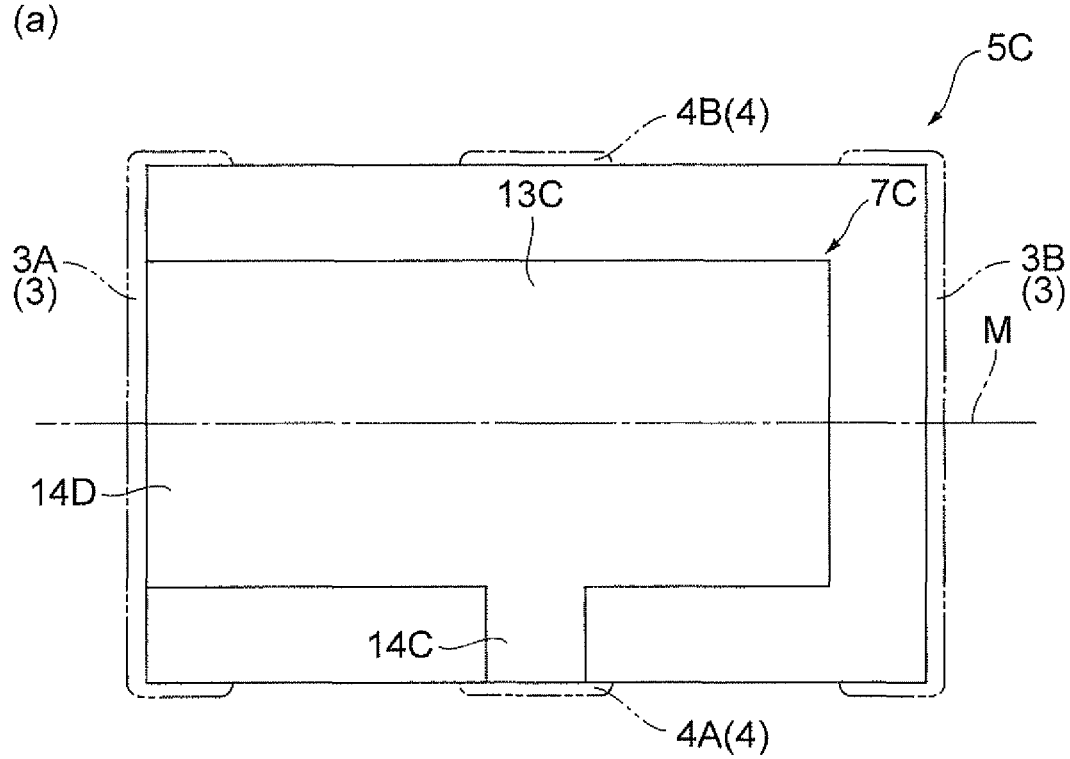
FIG. 5 is a plan view showing composite layers in an ESR control section.
Figure 5:
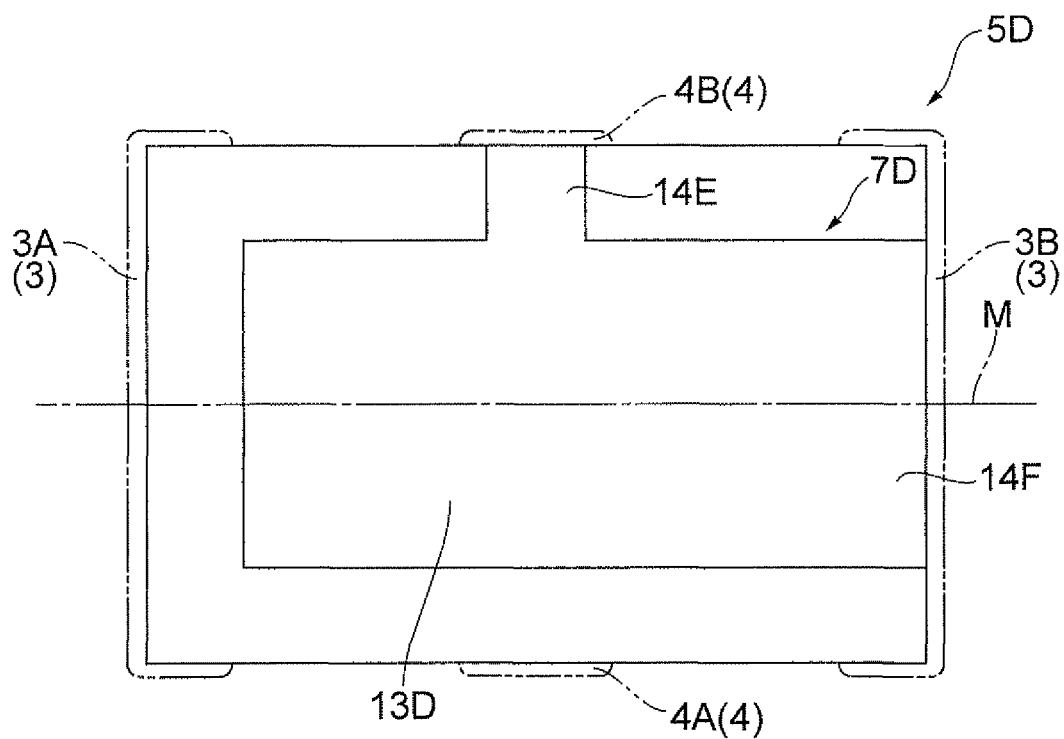

The ESR control section 12 is arranged so as to interpose the capacitance section 11 in between in the lamination direction. The ESR control section 12, as shown in FIG. 5, is composed of two composite layers 5C, 5D different in the shape of the internal electrode. The internal electrode 7C of the composite layer 5C, as shown in FIG. 5(a), has a main electrode portion 13C formed in a central region, and lead portions 14C, 14D led from two respective different sides of the main electrode portion 13C.

The main electrode portion 13C is of a nearly rectangular shape. The lead portions 14C, 14D are of a belt-like shape. One end of the lead portion 14C is exposed in the side face 2c of the element body 2 to be connected to the connection conductor 4A. One end of the lead portion 14D is exposed in the side face 2a of the element body 2 to be connected to the external electrode 3A. The width of the lead portion 14D is set to be the same as the length of the short sides of the main electrode portion 13C.

As the composite layer 5C is so configured, each internal electrode 7A of the capacitance section 11 is connected through the lead portion 14A to the connection conductor 4A and further connected through the connection conductor 4A and the lead portions 14C, 14D to the external electrode 3A. Therefore, the internal electrodes 7A come to have the positive polarity in a mounted state of the multilayer capacitor.

The width of the lead portion 14C and the width of the lead portion 14A are set to be smaller than the width of the lead portion 14D. This setting results in forming narrowed portions with a smaller cross-sectional area, in conductor portions (current paths) routed from the internal electrodes 7A to the external electrode 3A.

The internal electrode 7D of the composite layer 5D, as shown in FIG. 5(b), has a main electrode portion 13D formed in a central region, and lead portions 14E, 14F led from two respective different sides of the main electrode portion 13D. The main electrode portion 13D is of a nearly rectangular shape. The lead portions 14E, 14F are of a belt-like shape. One end of the lead portion 14E is exposed in the side face 2d of the element body 2 to be connected to the connection conductor 4B. One end of the lead portion 14F is exposed in the side face 2b of the element body 2 to be connected to the external electrode 3B. The width of the lead portion 14F is set to be the same as the length of the short sides of the main electrode portion 13D.

As the composite layer 5D is so configured, each internal electrode 7B of the capacitance section 11 is connected through the lead portion 14B to the connection conductor 4B and further connected through the connection conductor 4B, the main electrode portion 13D, and the lead portions 14E, 14F to the external electrode 3B. Therefore, the internal electrodes 7B come to have the negative polarity in the mounted state of the multilayer capacitor.

The width of the lead portion 14E and the width of the lead portion 14B are set to be smaller than the width of the lead portion 14F. This setting results in forming narrowed portions with a smaller cross-sectional area, in conductor portions (current paths) routed from the internal electrodes 7B to the external electrode 3B.

In the multilayer capacitor 1 having the configuration as described above, each internal electrode 7 in the capacitance section 11 is connected to the connection conductor 4 only and each internal electrode 7 in the ESR control section 12 is connected to the connection conductor 4 and the external electrode 3. Therefore, the connection conductors 4 to which the internal electrodes 7 are connected in parallel are connected in series to the external electrodes 3, and this configuration can achieve a higher ESR than in the conventional configuration where the internal electrodes 7 are connected in parallel to the external electrodes 3.

In the multilayer capacitor 1, the internal electrodes 7A and the internal electrodes 7B of the different polarities are alternately arranged in the capacitance section 11, and the lead portions 14A for connection between the internal electrodes 7A and the connection conductor 4 and the lead portions 14B for connection between the internal electrodes 7B and the connection conductor 4B extend opposite to each other toward the side faces 2c, 2d opposed to each other in the element body 2. Therefore, as shown in FIG. 2, directions of electric currents flowing through the internal electrodes 7A in the capacitance forming region are opposite to those through the internal electrodes 7B in the capacitance forming region, whereby magnetic fields generated by the electric currents cancel each other in part. This enables reduction in ESL.

The below will describe a method of producing the multilayer capacitor 1 having the above-described configuration, with reference to FIGS. 6 to 12.

Figure 6:
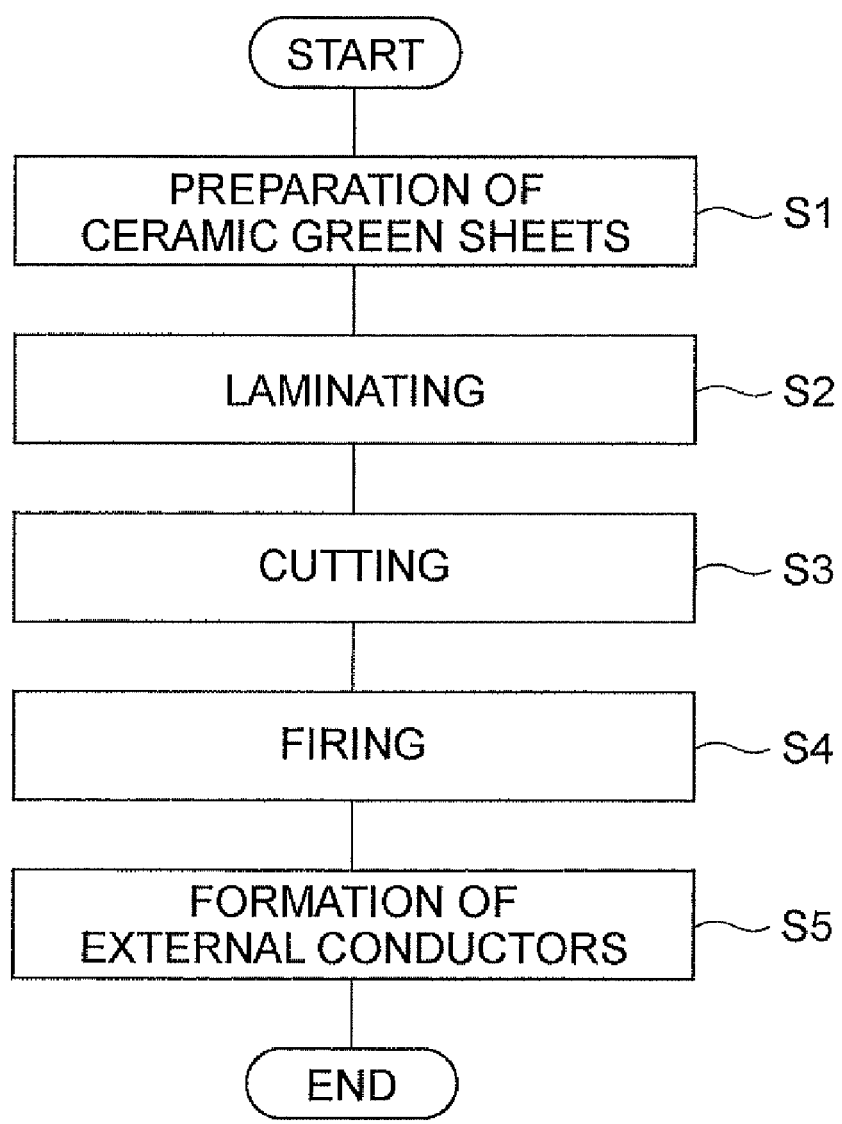
FIG. 6 is a flowchart showing a procedure of a production method of multilayer capacitor according to the first embodiment.

FIG. 6 shows a procedure of the production method of multilayer capacitor 1 according to the first embodiment. The production method of multilayer capacitor 1 according to the first embodiment consists of respective steps of ceramic green sheet preparing step S1, laminating step S2, cutting step S3, firing step S4, and external conductor forming step S5 as shown in FIG. 6.

Figure 7:
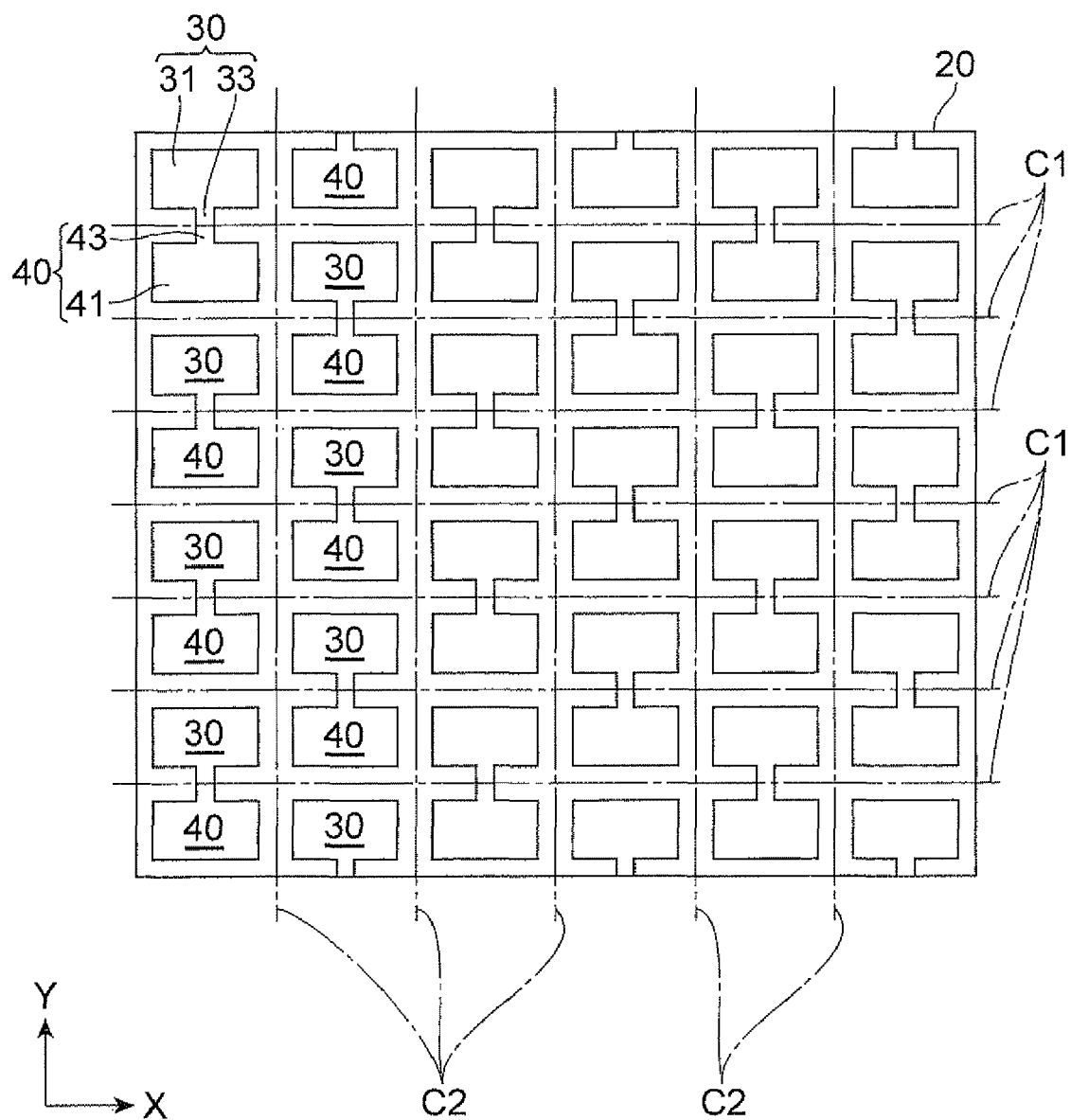
FIG. 7 is a plan view showing a ceramic green sheet.

The ceramic green sheet preparing step S1 includes preparing a plurality of ceramic green sheets 20 shown in FIG. 7. FIG. 7 is a plan view showing a ceramic green sheet.

A ceramic green sheet 20 is of a rectangular shape and a plurality of internal electrode patterns are formed on a top surface thereof. The plurality of internal electrode patterns consist of internal electrode patterns 30 corresponding to the internal electrodes 7A, and internal electrode patterns 40 corresponding to the internal electrodes 7B. Each internal electrode pattern 30 has a portion 31 corresponding to the main electrode portion 13A, and a portion 33 corresponding to the lead portion 14A. Each internal electrode pattern 40 has a portion 41 corresponding to the main electrode portion 13B, and a portion 43 corresponding to the lead portion 14B.

The internal electrode patterns 30 and the internal electrode patterns 40 are alternately arranged in a first direction (X-direction in FIG. 7) and in a second direction (Y-direction in FIG. 7) and are formed so that the portion 33 corresponding to the lead portion 14A and the portion 43 corresponding to the lead portion 14B are continuous across an intended cutting line C1. The internal electrode pattern 30 and the internal electrode pattern 40 adjacent in the second direction are continuous through their respective portions 33, 43 corresponding to the lead portions 14A, 14B. The first direction is a direction parallel to one side of the ceramic green sheet 20 and the second direction a direction parallel to one side of the ceramic green sheet 20 and perpendicular to the first direction.

Figure 8:
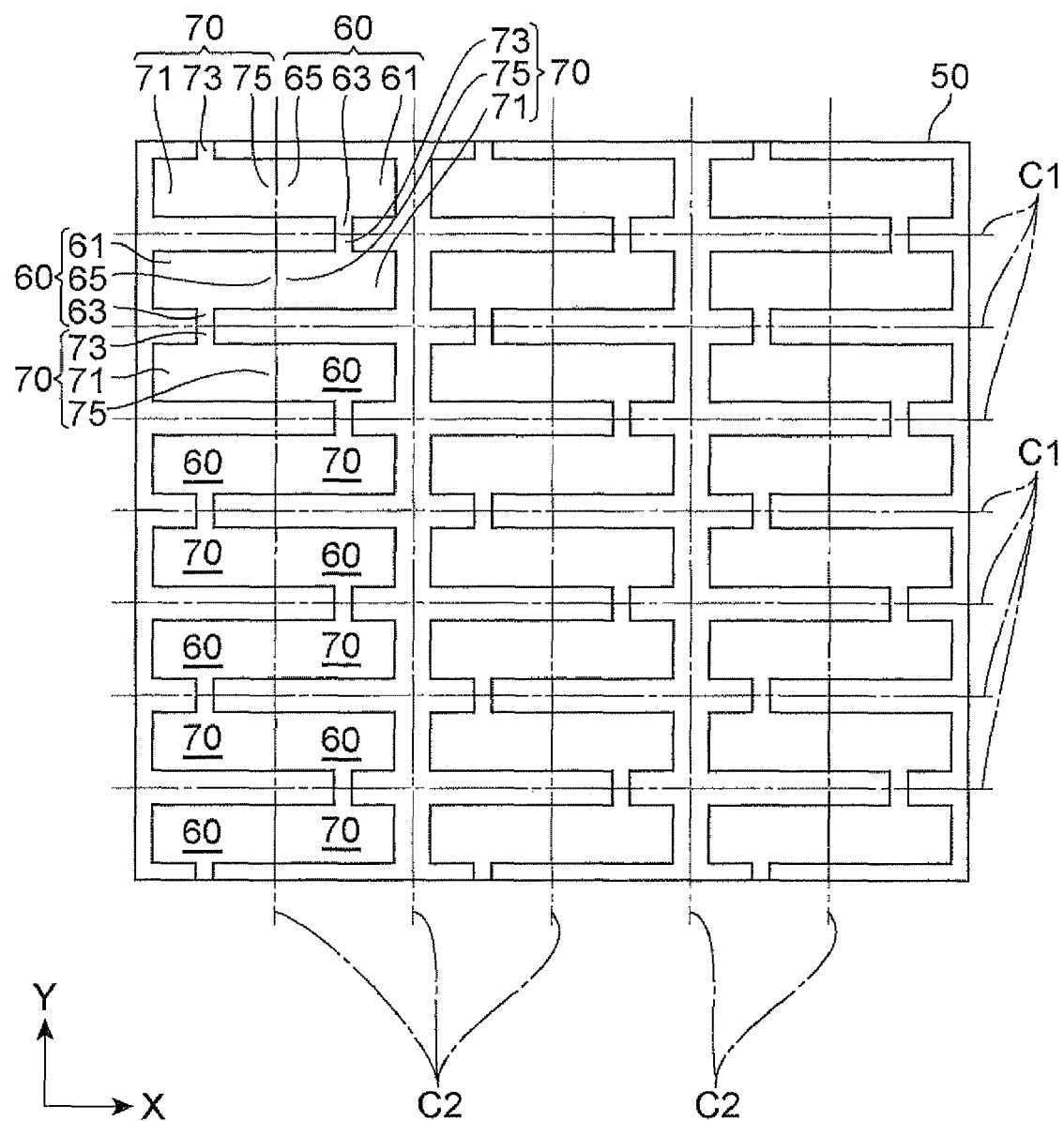
FIG. 8 is a plan view showing a ceramic green sheet.

The ceramic green sheet preparing step S1 also includes preparing a plurality of ceramic green sheets 50 shown in FIG. 8. FIG. 8 is a plan view showing a ceramic green sheet.

The ceramic green sheet 50 is of a rectangular shape and a plurality of internal electrode patterns are formed on a top surface thereof. The plurality of internal electrode patterns consist of internal electrode patterns 60 corresponding to the internal electrodes 7C, and internal electrode patterns 70 corresponding to the internal electrodes 7D. Each internal electrode pattern 60 has a portion 61 corresponding to the main electrode portion 13C, a portion 63 corresponding to the lead portion 14C, and a portion 65 corresponding to the lead portion 14D. Each internal electrode pattern 70 has a portion 71 corresponding to the main electrode portion 13D, a portion 73 corresponding to the lead portion 14E, and a portion 75 corresponding to the lead portion 14F.

The internal electrode patterns 60 and the internal electrode patterns 70 are formed so as to be alternately arranged in a first direction (X-direction in FIG. 8) and in a second direction (Y-direction in FIG. 8). The internal electrode patterns 60 and the internal electrode patterns 70 are also formed so that the portion 63 corresponding to the lead portion 14C and the portion 73 corresponding to the lead portion 14E are continuous across an intended cutting line C1 and so that the portion 65 corresponding to the lead portion 14D and the portion 75 corresponding to the lead portion 14F are continuous across an intended cutting line C2. The internal electrode pattern 60 and internal electrode pattern 70 adjacent in the second direction are continuous through their respective portions 63, 73 corresponding to the lead portions 14C, 14E. The internal electrode pattern 60 and internal electrode pattern 70 adjacent in the first direction are continuous through their respective portions 65, 75 corresponding to the lead portions 14D, 14F. The internal electrode patterns 60 and the internal electrode patterns 70 extend in a meandering shape in the second direction. The first direction is a direction parallel to one side of the ceramic green sheet 50 and the second direction a direction parallel to one side of the ceramic green sheet 50 and perpendicular to the first direction.

The ceramic green sheets 20, 50 are obtained, for example, by preparing a ceramic slurry by adding a binder resin (e.g., an organic binder resin or the like), a solvent, a plasticizer, etc. in a dielectric material containing barium titanate as a major component, and mixing and dispersing them, applying the ceramic slurry onto a support, and thereafter drying it. The internal electrode patterns 30, 40, 60, 70 are formed, for example, by applying an electrode paste onto the top surfaces of the ceramic green sheets 20, 50 and then drying it. The electrode paste is, for example, a paste composition obtained by mixing a binder resin, a solvent, etc. in a metal powder of Ni, Ag, or Pd. A method of applying the electrode paste is, for example, screen printing.

Figure 9:
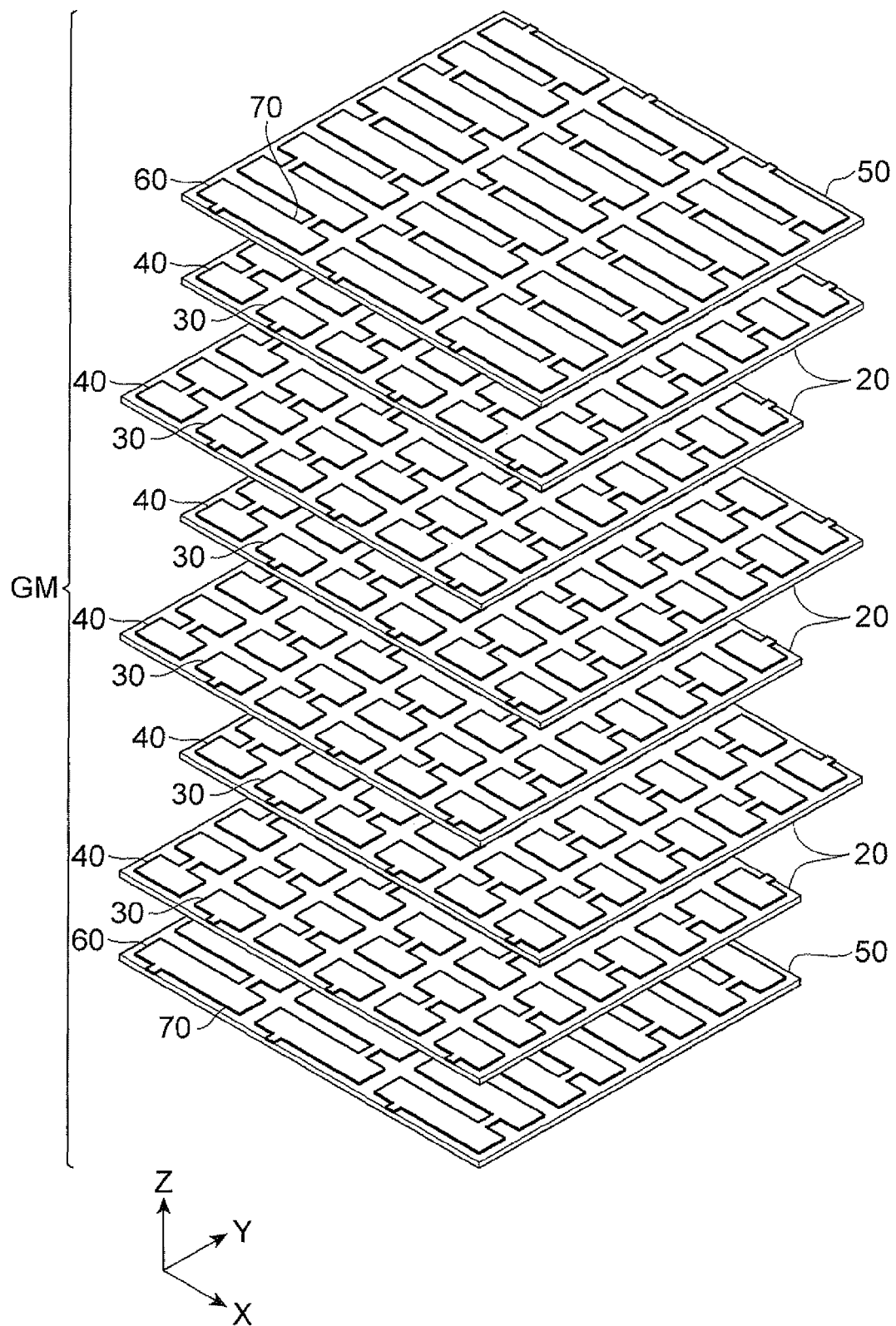
FIG. 9 is a perspective view showing an order of laminating ceramic green sheets in a laminating step.
Figure 10:
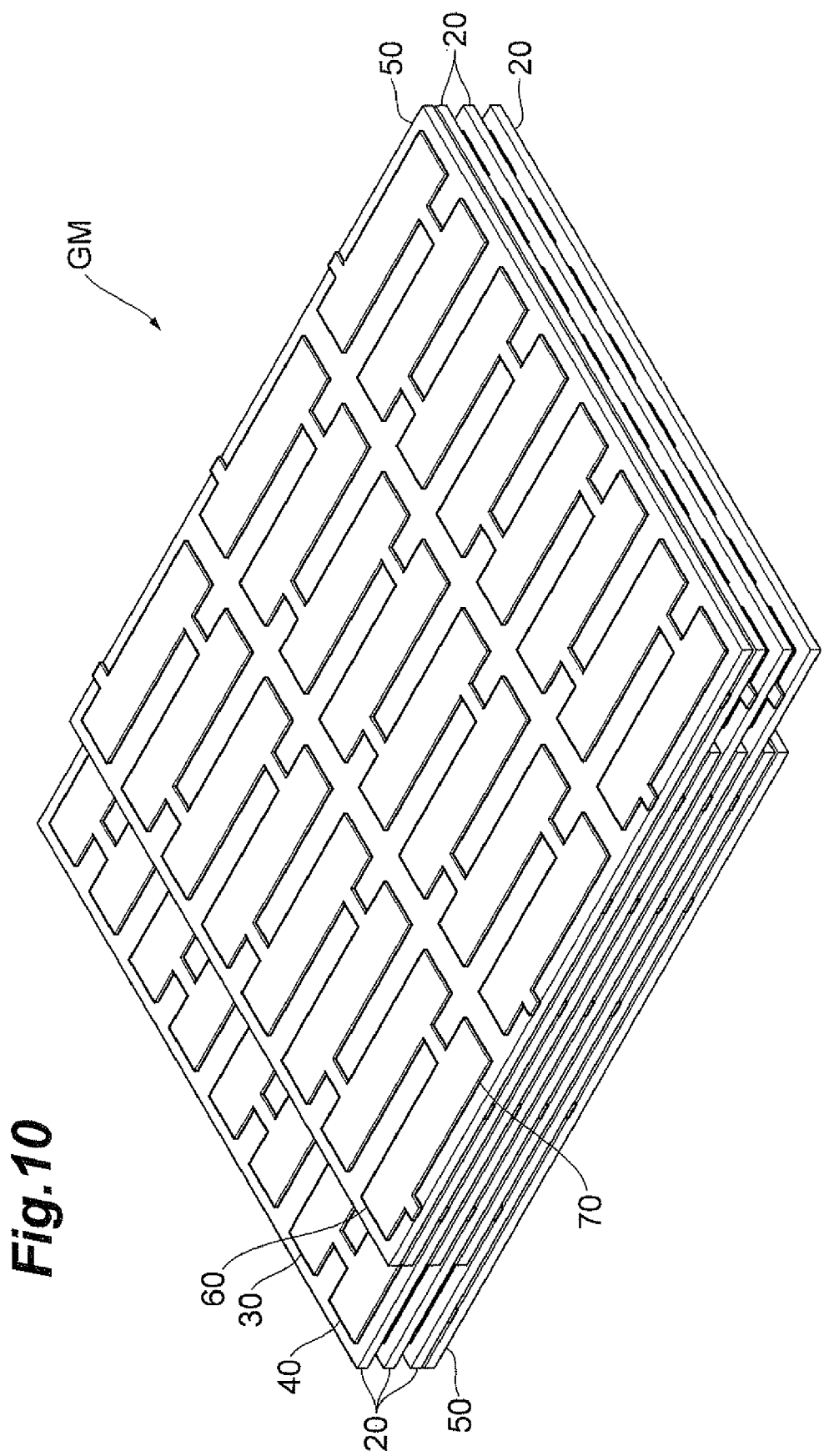
FIG. 10 is a perspective view showing a ceramic green sheet laminate body.

The subsequent laminating step S2 is, as shown in FIG. 9, to laminate a plurality of ceramic green sheets 20, 50, together with ceramic green sheets without any internal electrode patterns (not shown), in a third direction (Z-direction in FIG. 9) perpendicular to the first and second directions. This process provides a ceramic green sheet laminate body GM shown in FIG. 10. At this time, the ceramic green sheets 20, 50 are laminated in such a manner that the ceramic green sheets 20 deviate from each other and the ceramic green sheets 50 deviate from each other by a length of one internal electrode pattern between two adjacent sheets in the first direction.

Furthermore, the ceramic green sheets 20, 50 are also laminated so that the positions of the internal electrode patterns 30 coincide with the positions of the internal electrode patterns 40 and so that the positions of the internal electrode patterns 60 coincide with the positions of the internal electrode patterns 70. Namely, the ceramic green sheets 20, 50 are laminated in such a manner that the portions 31, 41, 61, 71 corresponding to the main electrode portions 13A, 13B, 13C, 13D in the internal electrode patterns 30, 40, 60, 70 wholly overlap with each other when viewed from the third direction. The ceramic green sheets without any internal electrode patterns constitute outermost layers of the ceramic green sheet laminate body GM.

Figure 11:
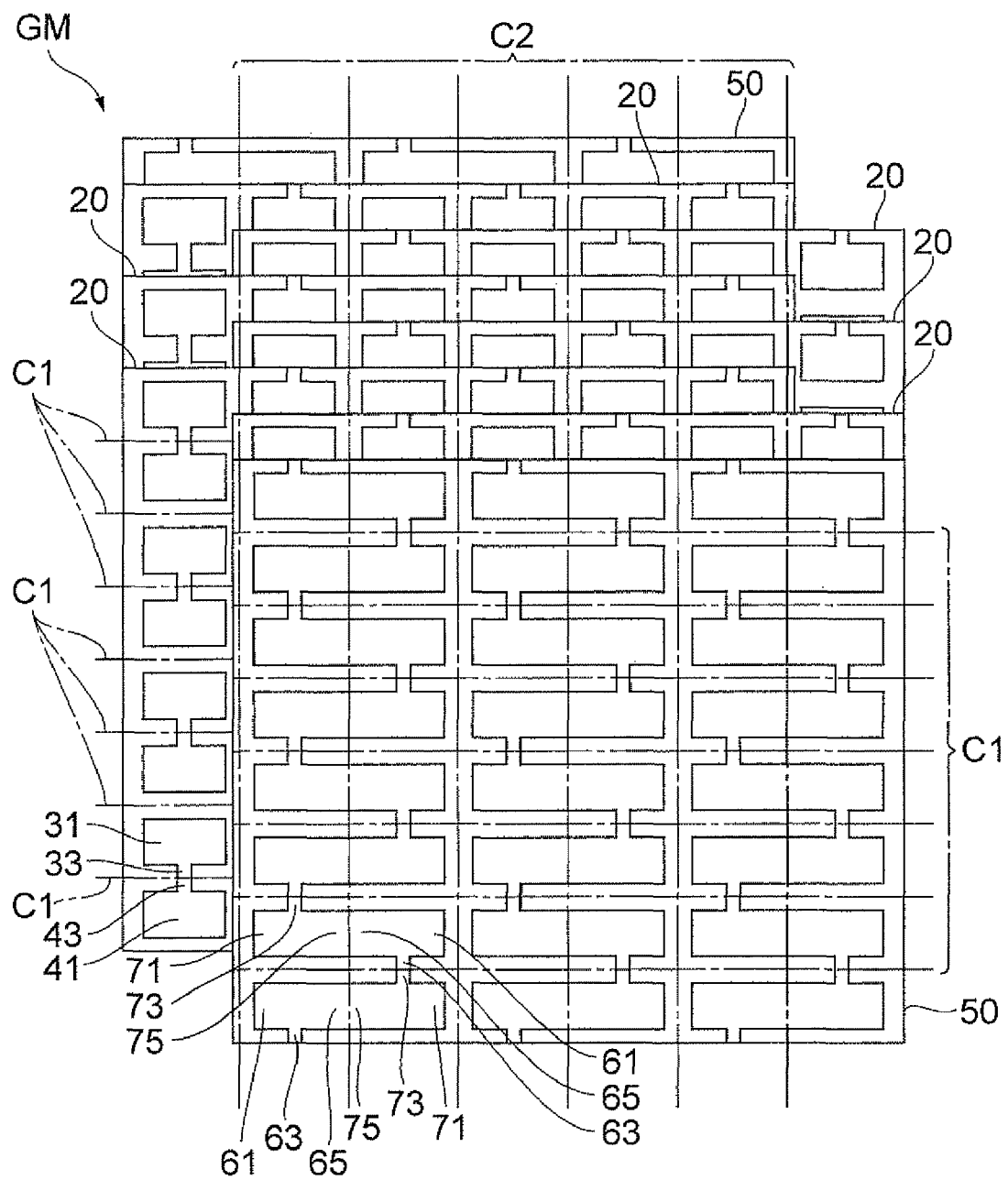
FIG. 11 is a plan view showing the ceramic green sheet laminate body in a decomposed state for explaining a cutting step.
Figure 12:
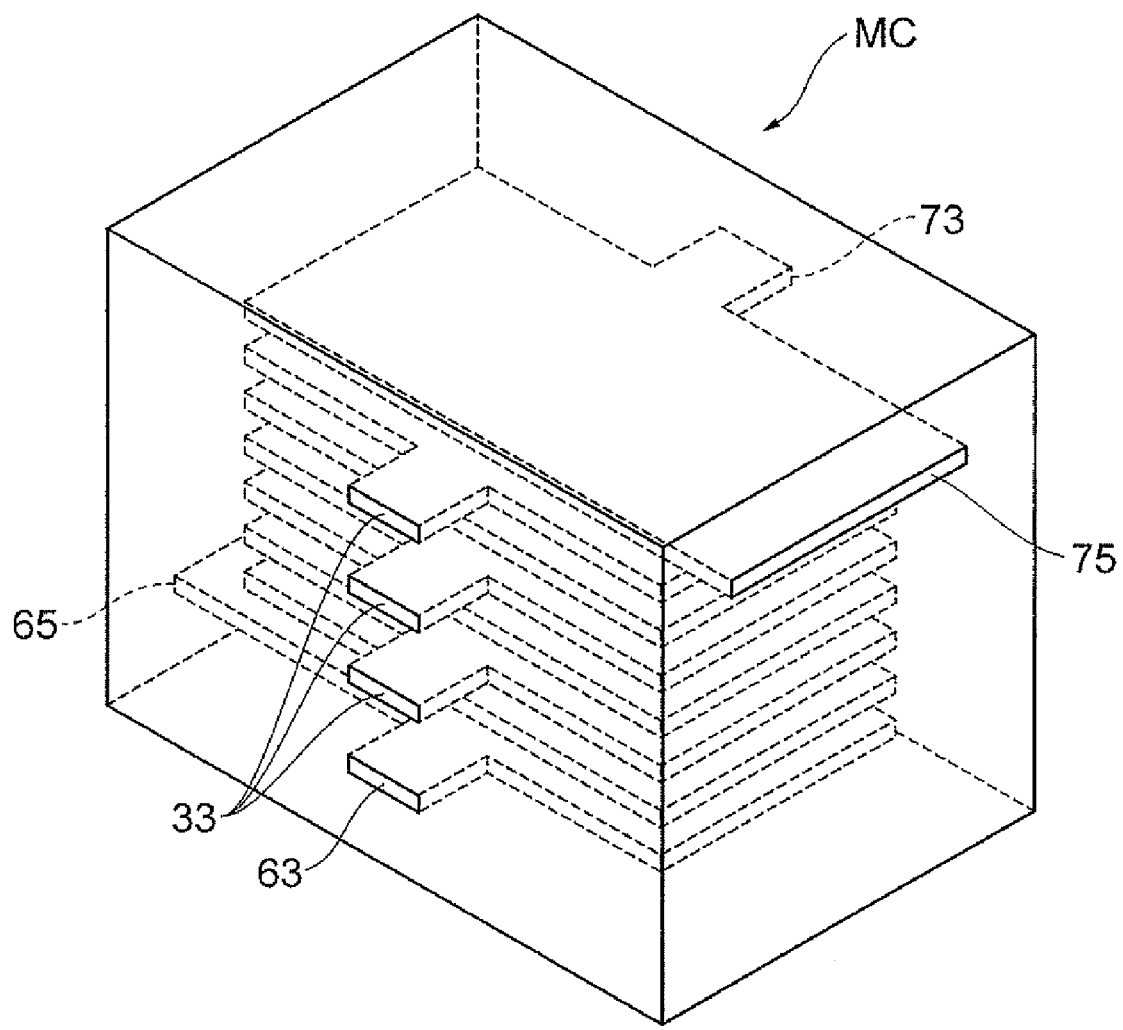
FIG. 12 is a perspective view showing a laminate chip.

The subsequent cutting step S3 is, as shown in FIG. 11, to cut the ceramic green sheet laminate body GM along intended cutting lines C1, C2. This process provides laminate chips MC of individual multilayer capacitor units shown in FIG. 12. FIG. 11 is a plan view showing the ceramic green sheet laminate body GM in a decomposed state, for explaining the cutting step S3. The intended cutting lines C1 and the intended cutting lines C2 are perpendicular to each other.

When the ceramic green sheet laminate body GM is cut along the intended cutting lines C1, the continuous portions 33, 43 corresponding to the lead portions 14A, 14B are cut in the middle, whereby the portions 33, 43 corresponding to the lead portions 14A, 14B are exposed in respective cut faces. Similarly, the continuous portions 63, 73 corresponding to the lead portions 14C, 14E are cut in the middle, whereby the portions 63, 73 corresponding to the lead portions 14C, 14E are exposed in respective cut faces. When the ceramic green sheet laminate body GM is cut along the intended cutting lines C2, the continuous portions 65, 75 corresponding to the lead portions 14D, 14F are cut in the middle, whereby the portions 65, 75 corresponding to the lead portions 14D, 14F are exposed in respective cut faces. In each laminate chip MC, therefore, the portions 33, 43, 63, 73, 65, 75 corresponding to the respective lead portions 14A, 14B, 14C, 14E, 14D, 14F are exposed in the side faces thereof.

The subsequent firing step S4 is to heat the laminate chips MC to carry out drying, debindering, and firing. This process provides the element bodies 2 of multilayer capacitors 1.

The subsequent external conductor forming step S5 is to form the external electrodes 3A, 3B and the connection conductors 4A, 4B on the exterior surface of each element body 2. This process finally provides the aforementioned multilayer capacitors 1. The external electrodes 3A, 3B and the connection conductors 4A, 4B are formed by applying an electrode paste onto their corresponding portions on the exterior surface of the element body 2, firing it, and electroplating it. The electroplating can be carried out, for example, using Cu, Ni, and Sn. The electrode paste to be used is, for example, a paste containing Ag, Cu, or Ni as a major component.

As described above, the production method of the first embodiment involves simply preparing only two types of ceramic green sheets, the ceramic green sheets 20 for capacitance section 11 with the internal electrode patterns 30, 40, and the ceramic green sheets 50 for ESR control section 12 with the internal electrode patterns 60, 70, as the ceramic green sheets with the internal electrode patterns, which simplifies the production steps of multilayer capacitor 1 and reduces the production cost.

In the production method of the first embodiment, the portions 33, 43 corresponding to the lead portions 14A, 14B are continuous across the intended cutting line C1, in the internal electrode patterns 30, 40 formed on the ceramic green sheets 20. In the internal electrode patterns 60, 70 formed on the ceramic green sheets 50, the portions 63, 73 corresponding to the lead portions 14C, 14E are also continuous across the intended cutting line C1 and the portions 65, 75 corresponding the lead portions 14D, 14F are continuous across the intended cutting line C2. For this reason, even if there is a deviation on the occasion of laminating the ceramic green sheets 20, 50 or on the occasion of cutting the ceramic green sheet laminate body GM, the portions 33, 43, 63, 73, 65, 75 corresponding to the lead portions 14A, 14B, 14C, 14E, 14D, 14F in the internal electrode patterns 30, 40, 60, 70 will always be exposed in the side faces of cut faces in each laminate chip MC obtained. Therefore, the multilayer capacitors 1 each provided with the element body 2 including the capacitance section 11 and the ESR control section 12 can be produced with a good yield, while suppressing occurrence of defective products in which the internal electrodes 7A, 7B, 7C, 7D fail to be exposed in the side faces 2a, 2b, 2c, 2d of the element body 2.

Second Embodiment

Figure 13:
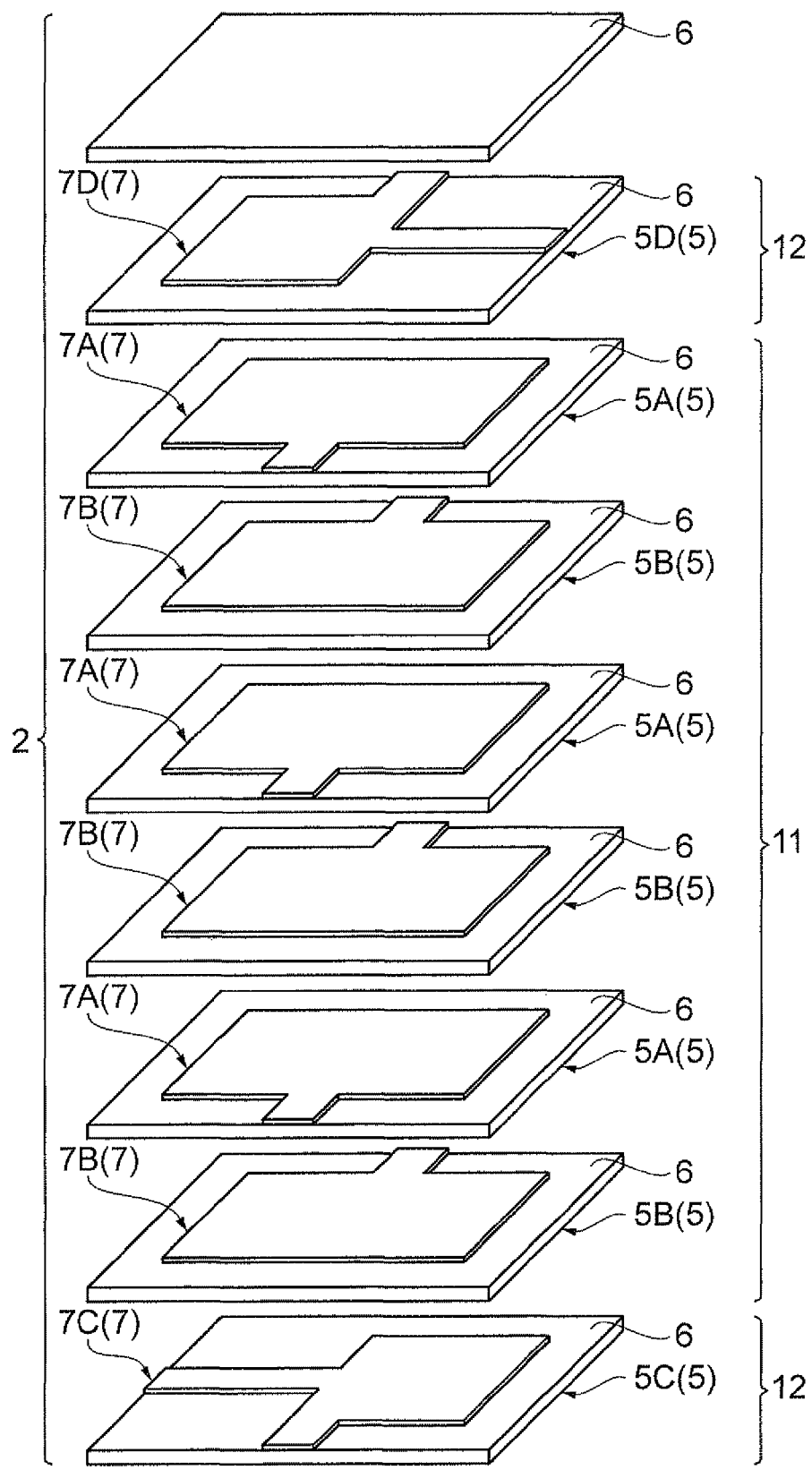
FIG. 13 is a drawing showing a layer configuration of a multilayer capacitor according to the second embodiment.
Figure 14:
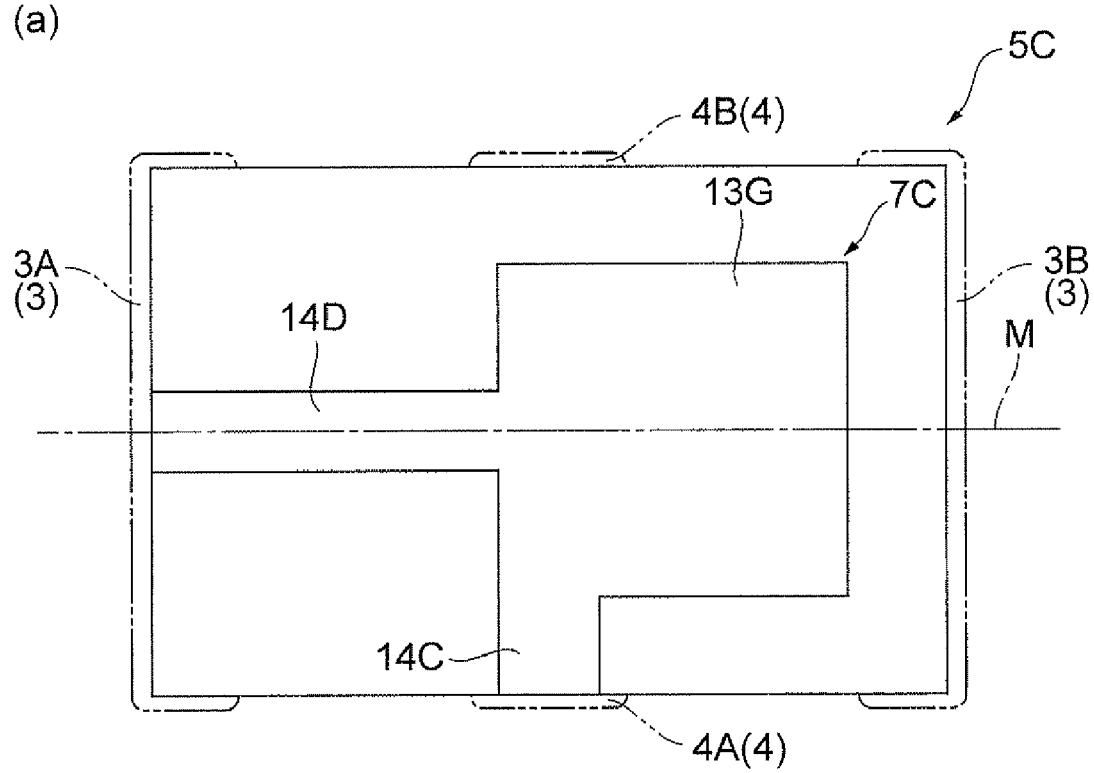
FIG. 14 is a plan view showing composite layers in an ESR control section.
Figure 14:
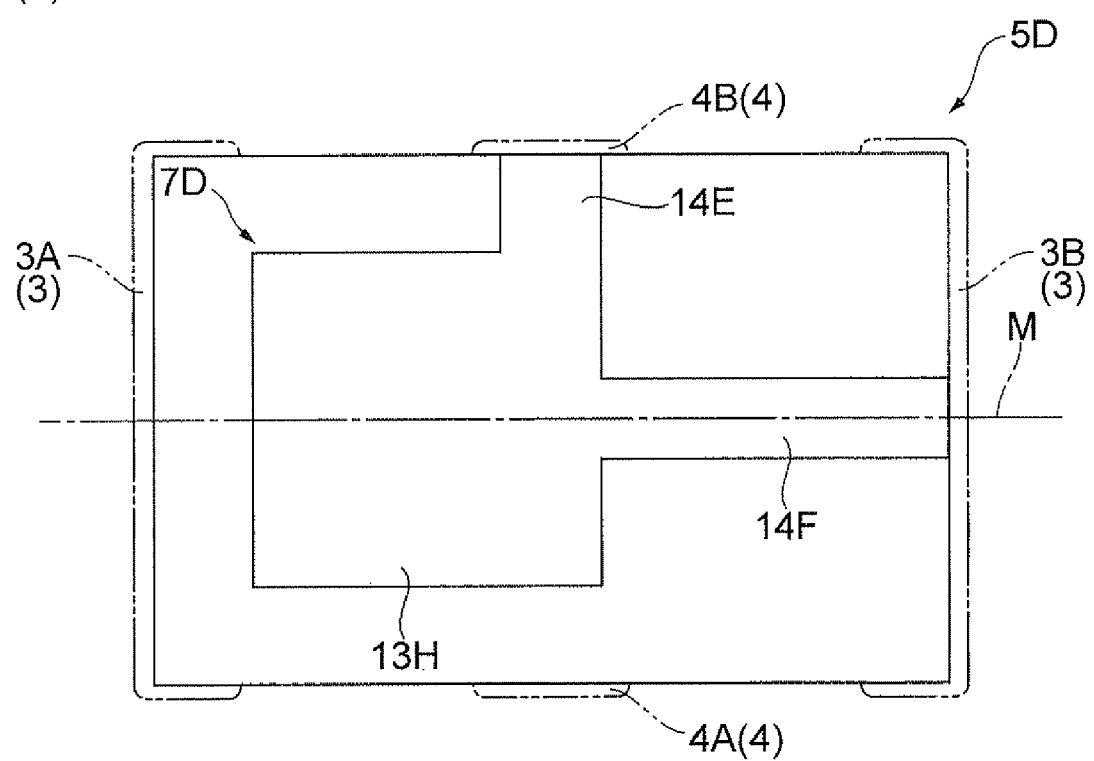

The following will describe a configuration of a multilayer capacitor produced by a production method of multilayer capacitor according to the second embodiment, with reference to FIGS. 13 and 14. The multilayer capacitor of the second embodiment is different in the shapes of the internal electrodes 7C, 7D of the ESR control section 12 from the multilayer capacitor 1 of the first embodiment described above.

Although omitted from illustration, the multilayer capacitor in the second embodiment is provided with the element body 2, external electrodes 3A, 3B, and connection conductors 4A, 4B as the foregoing multilayer capacitor 1 is. The element body 2, as shown in FIG. 13, is composed of a plurality of composite layers 5 with internal electrodes 7 of different patterns on dielectric layers 6, and the dielectric layers 6 laid as outermost layers of the composite layers 5 and functioning as protecting layers. The element body 2 has the capacitance section 11 and the ESR control section 12, as shown in FIG. 13. The capacitance section 11 has the same configuration as the capacitance section 11 in the aforementioned multilayer capacitor 1.

The ESR control section 12 is composed of two composite layers 5C, 5D different in the shape of the internal electrode. The internal electrode 7C of the composite layer 5C, as shown in FIG. 14(a), has a main electrode portion 13G formed in a central region, and lead portions 14C, 14D led from two respective different sides of the main electrode portion 13G. The main electrode portion 13G is of a nearly rectangular shape and is opposed to a nearly half portion on the external electrode 3B side of the main electrode portion 13A in the internal electrode 7A.

The width of the lead portion 14D is set to be smaller than the width of the lead portion 14C and the width of the lead portion 14A. This setting results in forming a narrowed portion with a smaller cross-sectional area, at the position corresponding to the lead portion 14D on current paths routed from the internal electrodes 7A to the external electrode 3A.

The internal electrode 7D of the composite layer 5D, as shown in FIG. 14(b), has a main electrode portion 13H formed in a central region, and lead portions 14E, 14F led from two respective different sides of the main electrode portion 13H. The main electrode portion 13H is of a nearly rectangular shape and is opposed to a nearly half portion on the external electrode 3A side of the main electrode portion 13B in the internal electrode 7B.

The width of the lead portion 14F is set to be smaller than the width of the lead portion 14E and the width of the lead portion 14B. This setting results in forming a narrowed portion with a smaller cross-sectional area, at the position corresponding to the lead portion 14F on current paths routed from the internal electrodes 7B to the external electrode 3B.

The multilayer capacitor having the configuration as described above can also achieve a higher ESR than in the conventional configuration where the internal electrodes 7 are connected in parallel to the external electrodes 3, as the aforementioned multilayer capacitor 1 can.

In the multilayer capacitor of the second embodiment, the width of the lead portion 14D of the internal electrode 7C and the width of the lead portion 14F of the internal electrode 7D in the ESR control section 12 are smaller than the width of any of the lead portions 14C, 14A, 14E, 14B. This configuration reduces the cross-sectional area of the conductor portions for connection between the internal electrodes 7 and the external electrodes 3 and thus achieves further improvement in ESR.

The below will describe a production method of the multilayer capacitor having the above-described configuration, with reference to FIGS. 15 to 19.

The production method of multilayer capacitor according to the second embodiment includes respective steps of the ceramic green sheet preparing step, laminating step, cutting step, firing step, and external conductor forming step as in the first embodiment.

Figure 15:
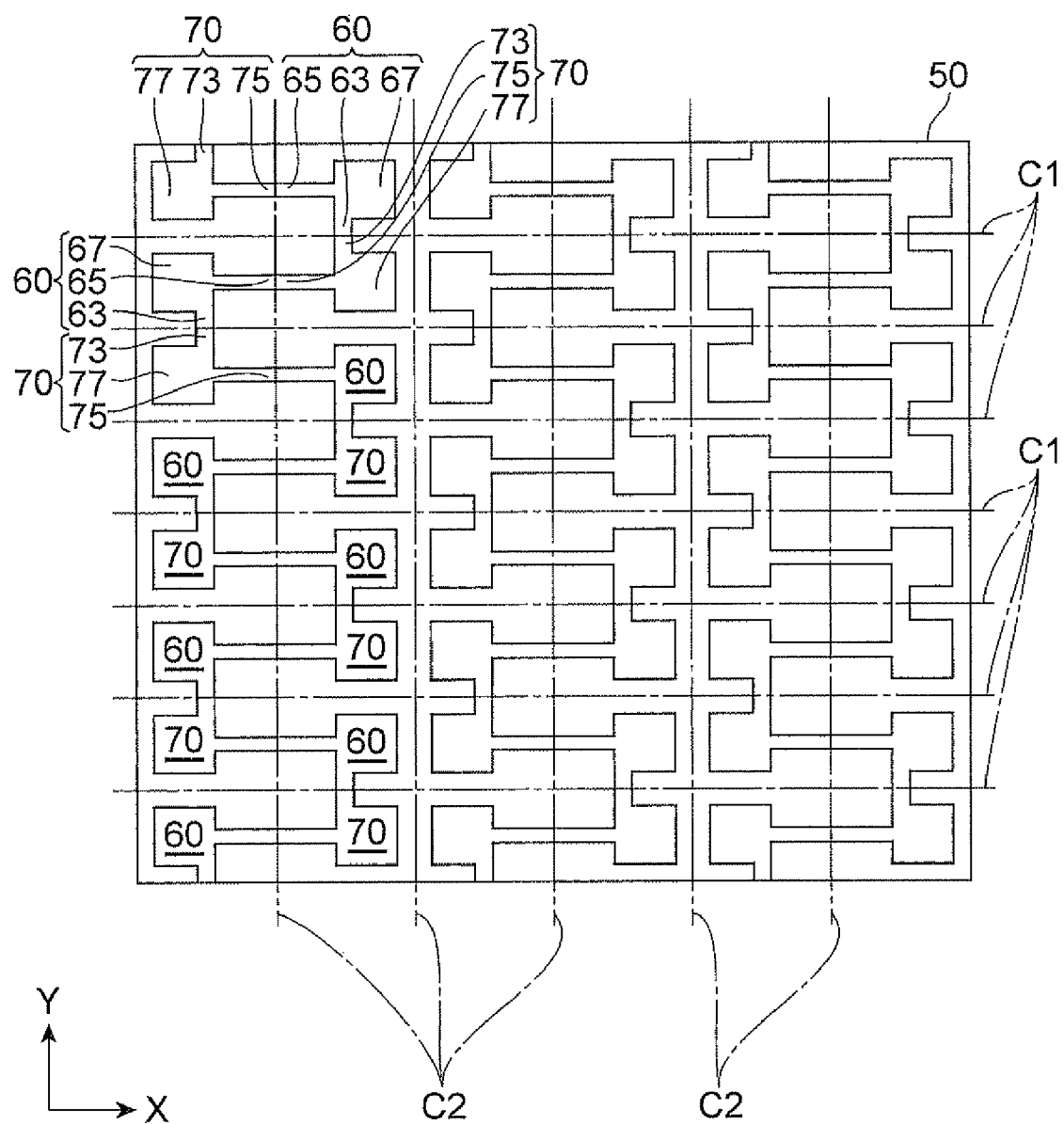
FIG. 15 is a plan view showing a ceramic green sheet.

The ceramic green sheet preparing step includes preparing a plurality of ceramic green sheets 20 shown in FIG. 7. The ceramic green sheet preparing step also includes preparing a plurality of ceramic green sheets 50 shown in FIG. 15. FIG. 15 is a plan view showing a ceramic green sheet.

The ceramic green sheet 50 has internal electrode patterns 60 corresponding to the internal electrodes 7C, and internal electrode patterns 70 corresponding to the internal electrodes 7D, formed thereon. Each internal electrode pattern 60 has a portion 67 corresponding to the main electrode portion 13G, a portion 63 corresponding to the lead portion 14C, and a portion 65 corresponding to the lead portion 14D. Each internal electrode pattern 70 has a portion 77 corresponding to the main electrode portion 13H, a portion 73 corresponding to the lead portion 14E, and a portion 75 corresponding to the lead portion 14F.

The internal electrode patterns 60 and the internal electrode patterns 70 are formed so as to be alternately arranged in a first direction (X-direction in FIG. 15) and in a second direction (Y-direction in FIG. 15). The internal electrode patterns 60 and the internal electrode patterns 70 are also formed so that the portion 63 corresponding to the lead portion 14C and the portion 73 corresponding to the lead portion 14E are continuous across an intended cutting line C1 and so that the portion 65 corresponding to the lead portion 14D and the portion 75 corresponding to the lead portion 14F are continuous across an intended cutting line C2. The internal electrode pattern 60 and internal electrode pattern 70 adjacent in the second direction are continuous through their respective portions 63, 73 corresponding to the lead portions 14C, 14E. The internal electrode pattern 60 and internal electrode pattern 70 adjacent in the first direction are continuous through their respective portions 65, 75 corresponding to the lead portions 14D, 14F. The internal electrode patterns 60 and the internal electrode patterns 70 extend in a meandering shape in the second direction.

Figure 16:
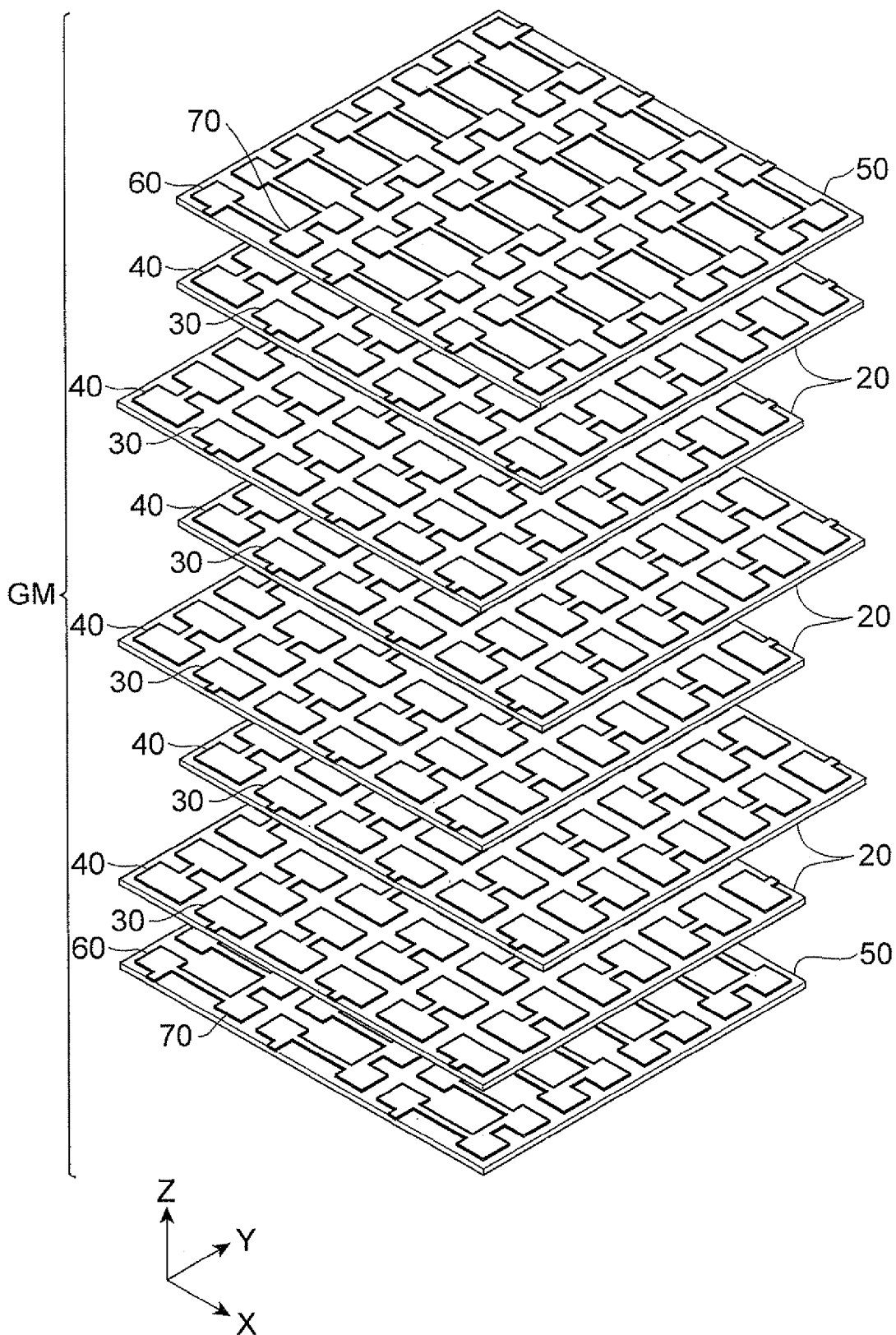
FIG. 16 is a perspective view showing an order of laminating ceramic green sheets in a laminating step.

The subsequent laminating step is to laminate a plurality of ceramic green sheets 20, 50, together with ceramic green sheets without any internal electrode patterns (not shown), in a third direction (Z-direction in FIG. 16), as shown in FIG. 16.

Figure 17:
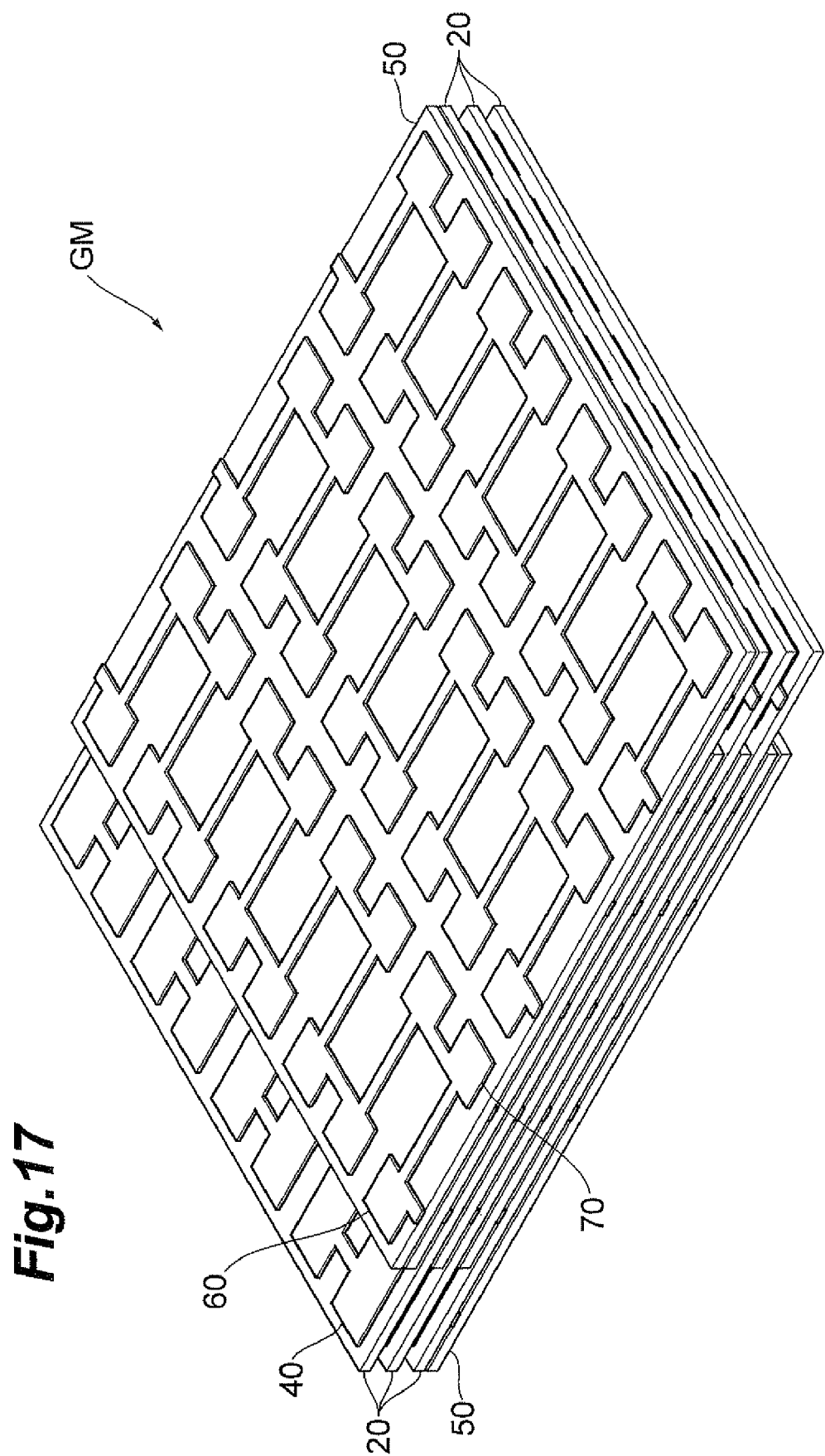
FIG. 17 is a perspective view showing a ceramic green sheet laminate body.

This process provides the ceramic green sheet laminate body GM shown in FIG. 17. At this time, the ceramic green sheets 20, 50 are laminated in such a manner that the ceramic green sheets 20 deviate from each other and the ceramic green sheets 50 deviate from each other by a length of one internal electrode pattern between two adjacent sheets in the first direction. Furthermore, the ceramic green sheets 20, 50 are laminated so that the positions of the internal electrode patterns 30 coincide with the positions of the internal electrode patterns 40 and so that the positions of the internal electrode patterns 60 coincide with the positions of the internal electrode patterns 70. Namely, the ceramic green sheets 20, 50 are laminated so that the portions 31, 41, 67, 77 corresponding to the main electrode portions 13A, 13B, 13G, 13H in the internal electrode patterns 30, 40, 60, 70 overlap with each other when viewed from the third direction.

Figure 18:
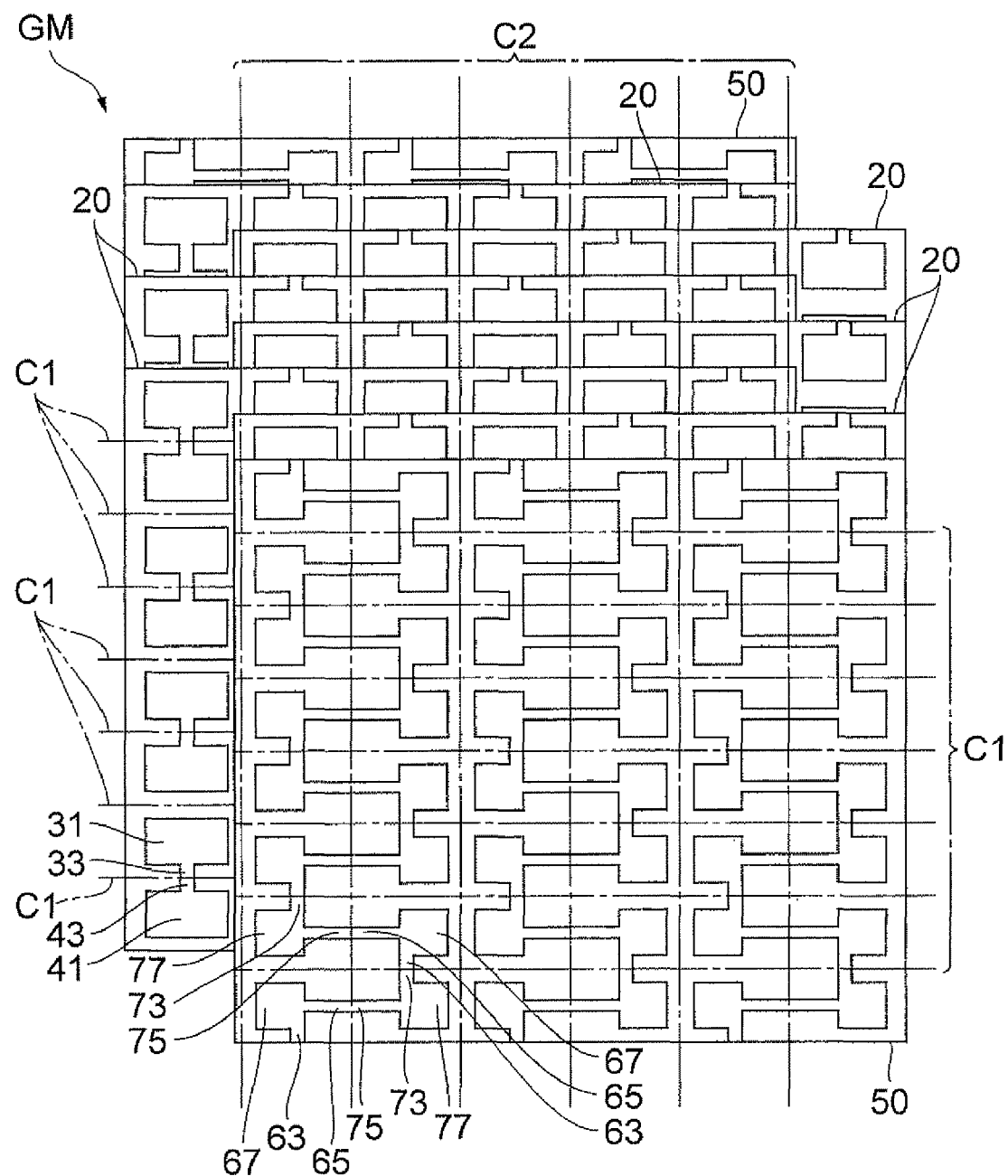
FIG. 18 is a plan view showing the ceramic green sheet laminate body in a decomposed state for explaining a cutting step.
Figure 19:
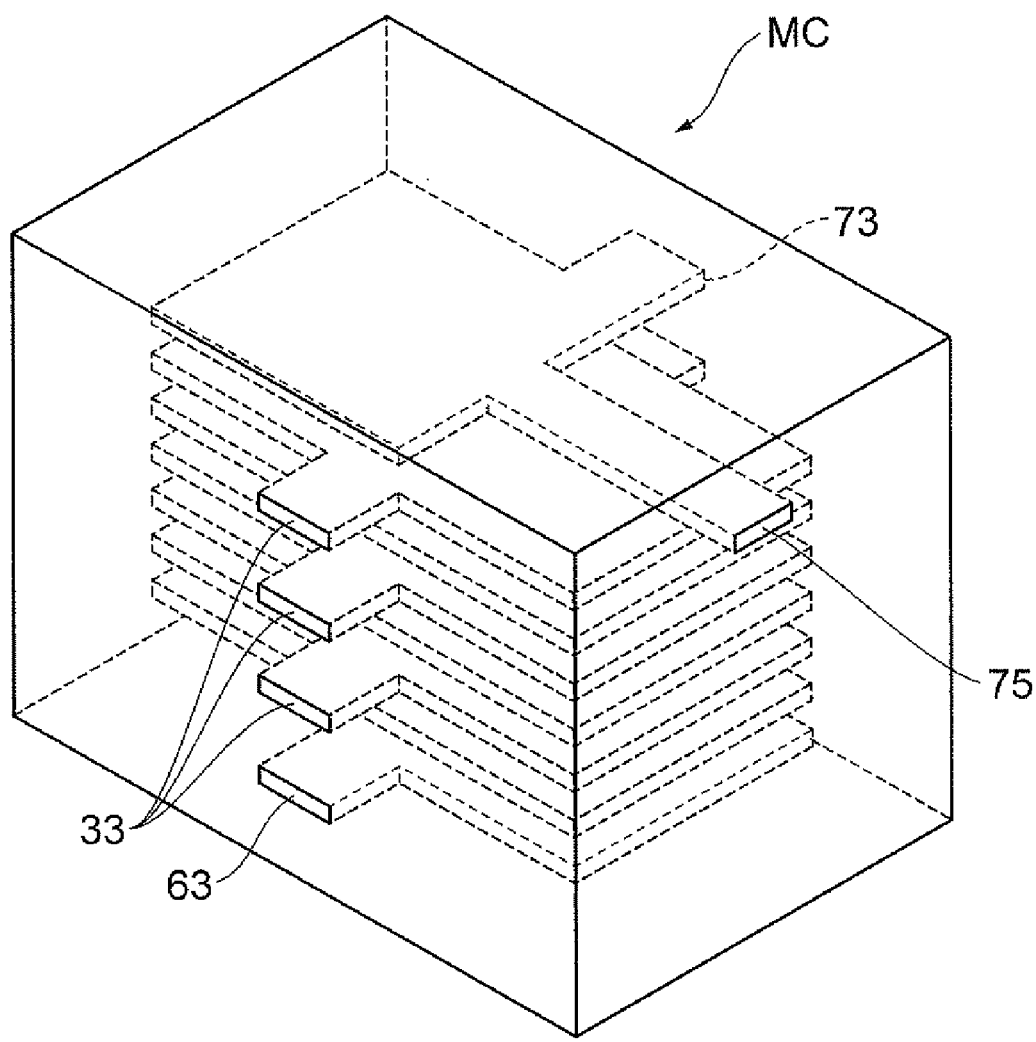
FIG. 19 is a perspective view showing a laminate chip.

The subsequent cutting step is, as shown in FIG. 18, to cut the ceramic green sheet laminate body GM along intended cutting lines C1, C2. This process provides laminate chips MC of individual multilayer capacitor units shown in FIG. 19. FIG. 18 is a plan view showing the ceramic green sheet laminate body GM in a decomposed state, for explaining the cutting step.

When the ceramic green sheet laminate body GM is cut along the intended cutting lines C1, the portions 33, 43 corresponding to the lead portions 14A, 14B and the portions 63, 73 corresponding to the lead portions 14C, 14E each are exposed in the cut faces. When the ceramic green sheet laminate body GM is cut along the intended cutting lines C2, the portions 65, 75 corresponding to the lead portions 14D, 14F each are exposed in the cut faces. Therefore, the portions 33, 43, 63, 73, 65, 75 corresponding to the respective lead portions 14A, 14B, 14C, 14E, 14D, 14F are exposed in the side faces in each laminate chip MC.

The aforementioned multilayer capacitors are finally obtained through the subsequent firing step and external conductor forming step. The firing step and external conductor forming step are the same as the firing step S4 and external conductor forming step S5 in the first embodiment described above, and the description thereof is thus omitted herein.

As described above, the production method of the second embodiment also simplifies the production steps of multilayer capacitor 1, reduces the production cost, and permits the multilayer capacitor 1 with the element body 2 including the capacitance section 11 and the ESR control section 12 to be produced with a good yield, as the production method of the first embodiment does.

Third Embodiment

Figure 21:
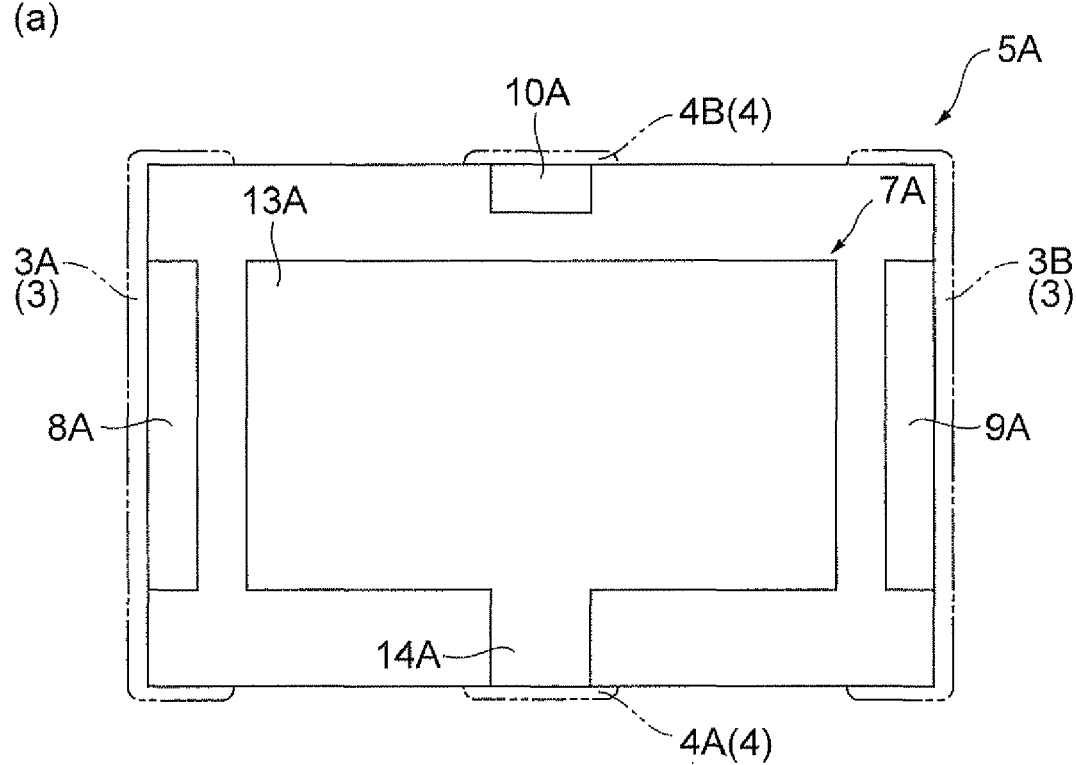
FIG. 21 is a plan view showing composite layers in a capacitance section.
Figure 21:
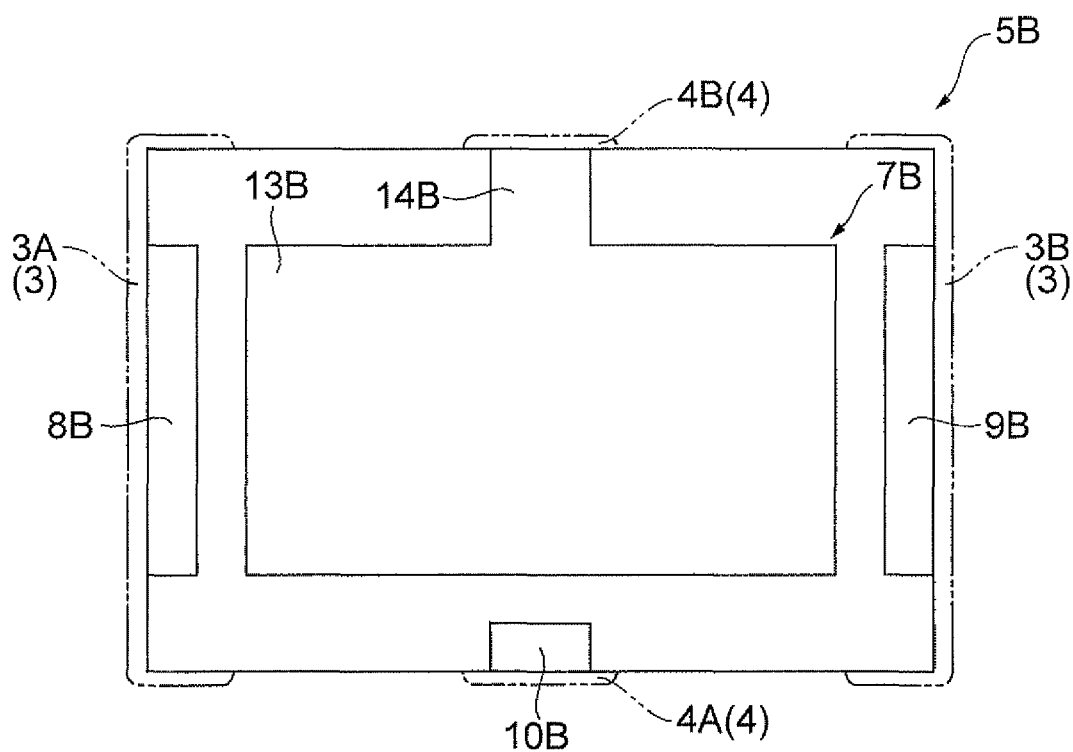
Figure 22:
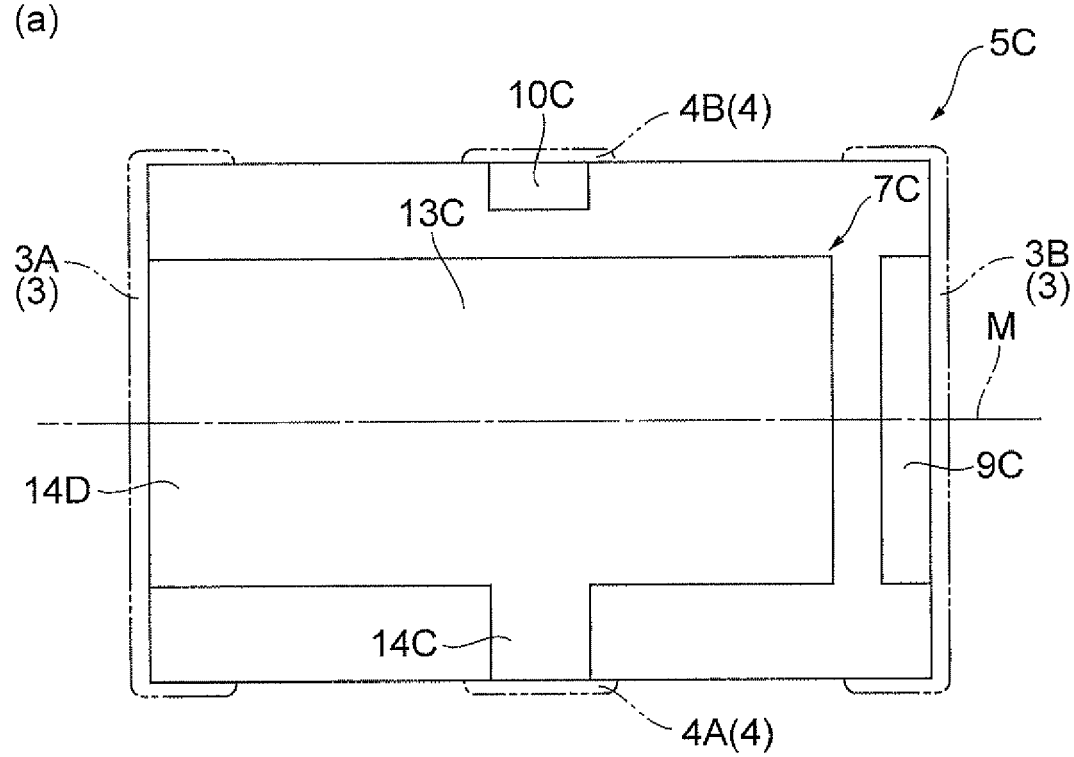
FIG. 22 is a plan view showing composite layers in an ESR control section.
Figure 22:
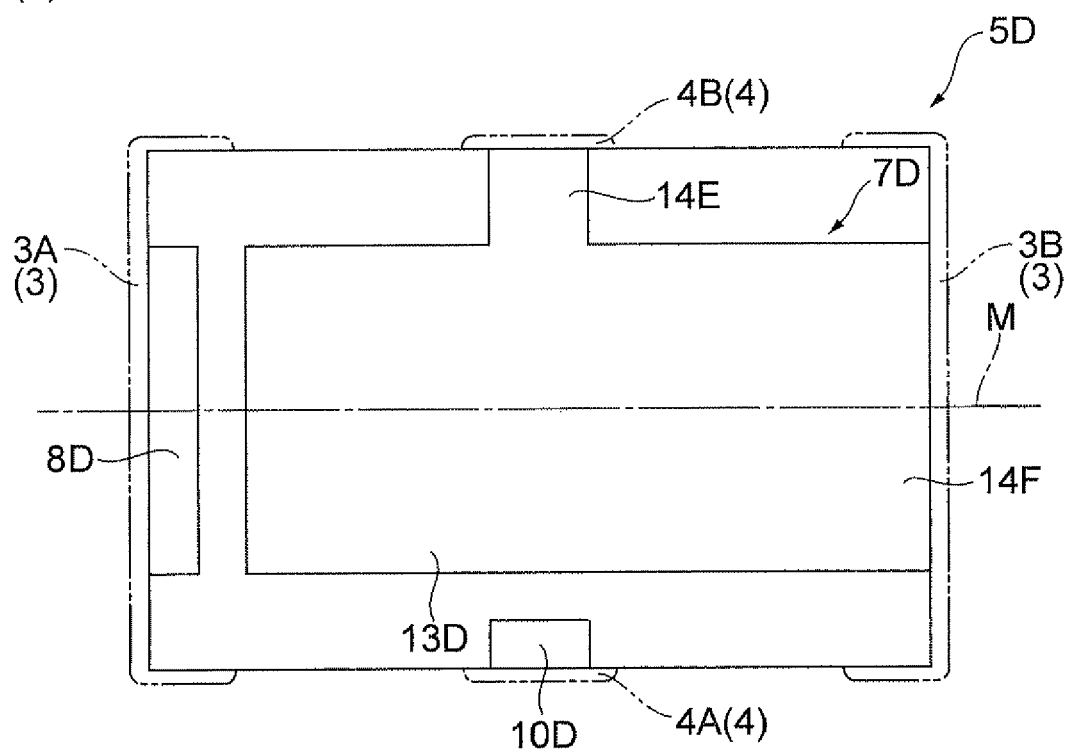

The below will describe a configuration of a multilayer capacitor produced by a production method of multilayer capacitor according to the third embodiment, with reference to FIGS. 20 to 22. The multilayer capacitor of the third embodiment is different in provision of dummy electrodes from the aforementioned multilayer capacitor 1 of the first embodiment.

Although not shown, the multilayer capacitor of the third embodiment is provided with the element body 2, external electrodes 3A, 3B, and connection conductors 4A, 4B as the multilayer capacitor 1 is. The element body 2, as shown in FIG. 20, is composed of a plurality of composite layers 5 with internal electrodes 7 of different patterns on dielectric layers 6, and the dielectric layers 6 laid as outermost layers of the composite layers 5 and functioning as protecting layers. The element body 2, as shown in FIG. 20, has the capacitance section 11 and the ESR control section 12.

Figure 20:
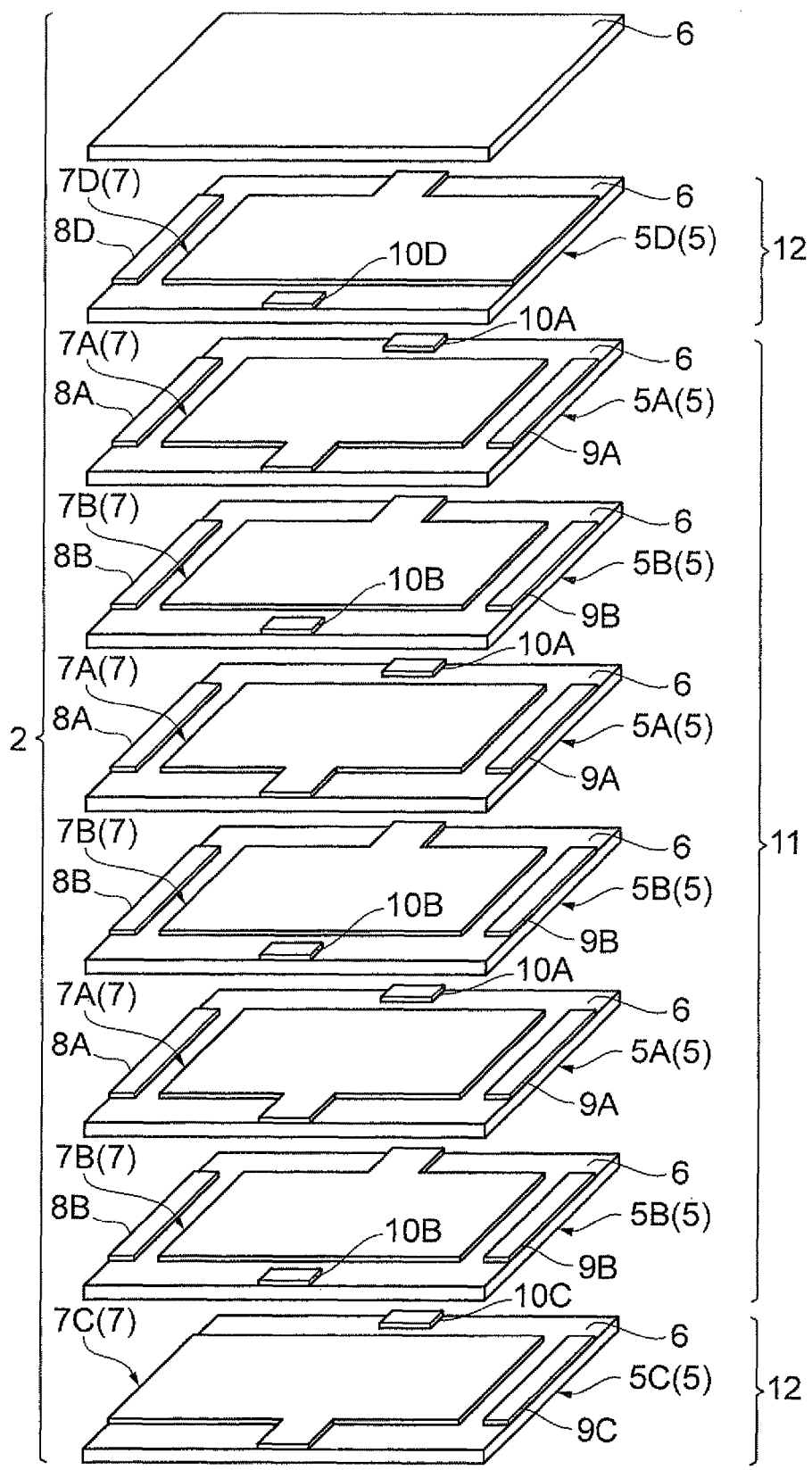
FIG. 20 is a drawing showing a layer configuration of a multilayer capacitor according to the third embodiment.

The capacitance section 11, as shown in FIG. 20, is formed in a structure in which two types of composite layers 5A, 5B different in the shape of the internal electrode are alternately laminated in multiple layers. Each composite layer 5A, as shown in FIG. 21(a), includes dummy electrodes 8A, 9A, 10A, in addition to the internal electrode 7A. The dummy electrodes 8A, 9A, 10A are provided with a space from the internal electrode 7A and are separated. The dummy electrode 8A is exposed at one end thereof in the side face 2a of the element body 2 to be connected to the external electrode 3A. The dummy electrode 9A is exposed at one end thereof in the side face 2b of the element body 2 to be connected to the external electrode 3B. The dummy electrode 10A is exposed at one end thereof in the side face 2d of the element body 2 to be connected to the connection conductor 4B. The width of the dummy electrodes 8A, 9A (width in the transverse direction of the element body 2) is set to be approximately equal to the width of the lead portions 14D, 14F. The width of the dummy electrode 10A is set to be approximately equal to the width of the lead portion 14B.

The composite layer 5B, as shown in FIG. 21(b), includes dummy electrodes 8B, 9B, 10B, in addition to the internal electrode 7B. The dummy electrodes 8B, 9B, 10B are provided with a space from the internal electrode 7B and are separated. The dummy electrode 8B is exposed at one end thereof in the side face 2a of the element body 2 to be connected to the external electrode 3A. The dummy electrode 9B is exposed at one end thereof in the side face 2b of the element body 2 to be connected to the external electrode 3B. The dummy electrode 10B is exposed at one end thereof in the side face 2c of the element body 2 to be connected to the connection conductor 4A. The width of the dummy electrodes 8B, 9B (width in the transverse direction of the element body 2) is also set to be approximately equal to the width of the lead portions 14D, 14F. The width of the dummy electrode 10B is set to be approximately equal to the width of the lead portion 14A.

The ESR control section 12, as shown in FIG. 20, is composed of two composite layers 5C, 5D different in the shape of the internal electrode. The composite layer 5C, as shown in FIG. 22(a), includes dummy electrodes 9C, 10C, in addition to the internal electrode 7C. The dummy electrodes 9C, 10C are provided with a space from the internal electrode 7C and are separated. The dummy electrode 9C is exposed at one end thereof in the side face 2b of the element body 2 to be connected to the external electrode 3B. The dummy electrode 10C is exposed at one end thereof in the side face 2d of the element body 2 to be connected to the connection conductor 4B. The width of the dummy electrode 9C (width in the transverse direction of the element body 2) is set to be approximately equal to the width of the lead portion 14F. The width of the dummy electrode 10C is set to be approximately equal to the width of the lead portion 14B.

The composite layer 5D, as shown in FIG. 22(b), includes dummy electrodes 8D, 10D, in addition to the internal electrode 7D. The dummy electrodes 8D, 10D are provided with a space from the internal electrode 7D and are separated. The dummy electrode 8D is exposed at one end thereof in the side face 2a of the element body 2 to be connected to the external electrode 3A. The dummy electrode 10D is exposed at one end thereof in the side face 2c of the element body 2 to be connected to the connection conductor 4A. The width of the dummy electrode 8D (width in the transverse direction of the element body 2) is set to be approximately equal to the width of the lead portion 14D. The width of the dummy electrode 10D is set to be approximately equal to the width of the lead portion 14A.

In the element body 2, when viewed from the lamination direction, the dummy electrodes 8A, 8B, 8D overlap with the lead portion 14D, the dummy electrodes 9A, 9B, 9C with the lead portion 14F, the dummy electrodes 10A, 10C with the lead portions 14B, and the dummy electrodes 10B, 10D with the lead portions 14A.

The multilayer capacitor having the configuration as described above can also achieve a higher ESR than in the conventional configuration where the internal electrodes 7 are connected in parallel to the external electrodes 3, as the aforementioned multilayer capacitor 1 can.

The following will describe a production method of the multilayer capacitor having the above-described configuration, with reference to FIGS. 23 to 28.

The production method of multilayer capacitor according to the third embodiment includes respective steps of the ceramic green sheet preparing step, laminating step, cutting step, firing step, and external conductor forming step as in the first and second embodiments.

Figure 23:
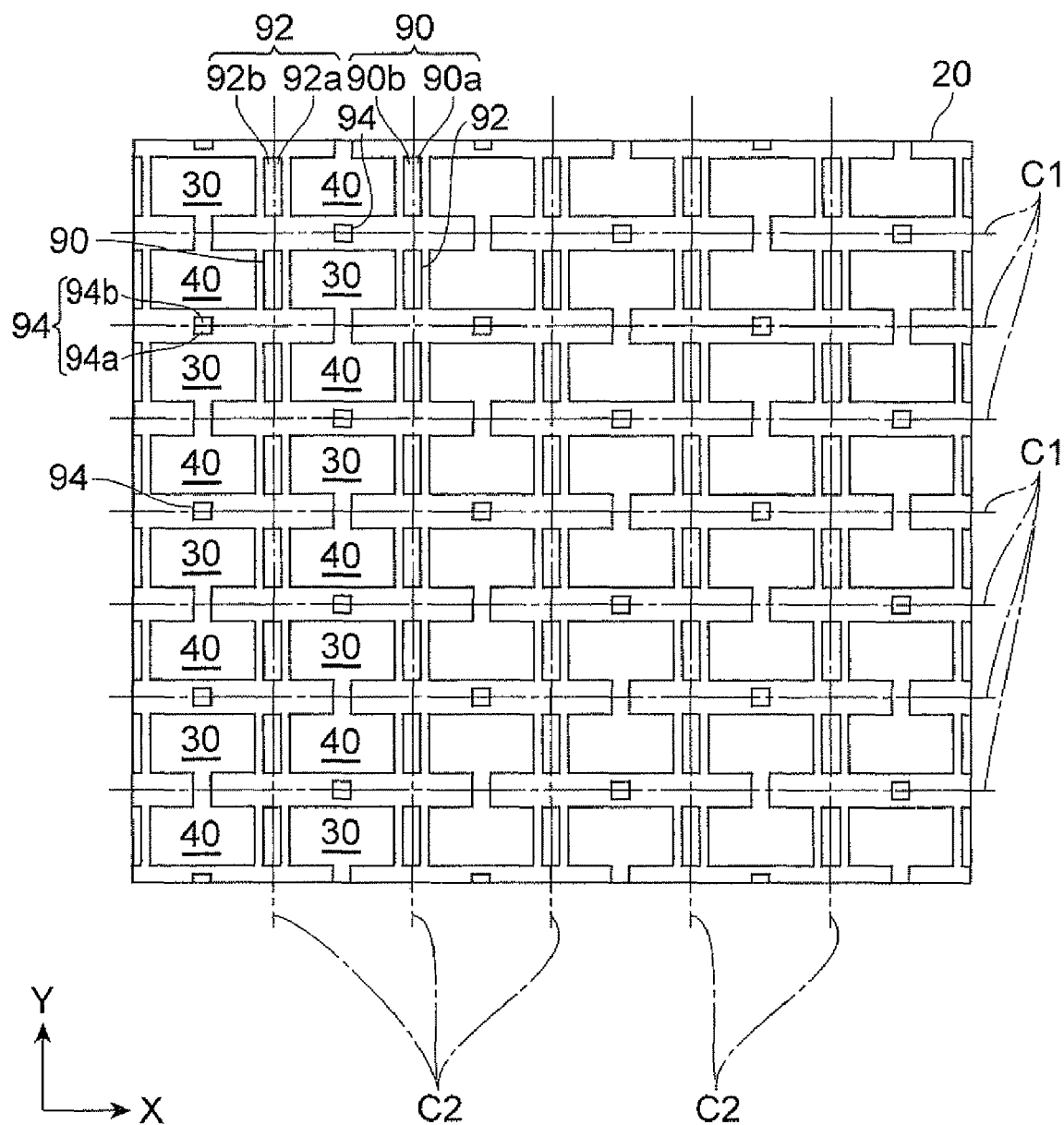
FIG. 23 is a plan view showing a ceramic green sheet.

The ceramic green sheet preparing step includes preparing a plurality of ceramic green sheets 20 shown in FIG. 23. FIG. 23 is a plan view showing a ceramic green sheet.

The ceramic green sheet 20 has dummy electrode patterns 90 corresponding to the dummy electrodes 8A, 9B, dummy electrode patterns 92 corresponding to the dummy electrodes 8B, 9A, and dummy electrode patterns 94 corresponding to the dummy electrodes 10A, 10B, in addition to the internal electrode patterns 30 and internal electrode patterns 40, the electrode patterns being formed on the green sheet 20. Each dummy electrode pattern 90 includes a portion 90a corresponding to the dummy electrode 8A and a portion 90b corresponding to the dummy electrode 9B. Each dummy electrode pattern 92 includes a portion 92a corresponding to the dummy electrode 8B and a portion 92b corresponding to the dummy electrode 9A. Each dummy electrode pattern 94 includes a portion 94a corresponding to the dummy electrode 10A and a portion 94b corresponding to the dummy electrode 10B.

The dummy electrode patterns 90 and the dummy electrode patterns 92 are formed so as to be alternately located between internal electrode pattern 30 and internal electrode pattern 40 in a first direction (X-direction in FIG. 23). The dummy electrode patterns 90 are also formed so that the portion 90a corresponding to the dummy electrode 8A and the portion 90b corresponding to the dummy electrode 9B are continuous across an intended cutting line C2. The dummy electrode patterns 92 are also formed so that the portion 92a corresponding to the dummy electrode 8B and the portion 92b corresponding to the dummy electrode 9A are continuous across an intended cutting line C2. The dummy electrode patterns 90 are arranged in juxtaposition along a direction in which the intended cutting line C2 extends. The dummy electrode patterns 92 are arranged in juxtaposition along a direction in which the intended cutting line C2 extends.

The dummy electrode patterns 94 are formed so as to be located between internal electrode pattern 30 and internal electrode pattern 40 in a second direction (Y-direction in FIG. 23). The dummy electrode patterns 94 are also formed so that the portion 94a corresponding to the dummy electrode 10A and the portion 94b corresponding to the dummy electrode 10B are continuous across an intended cutting line C1.

Figure 24:
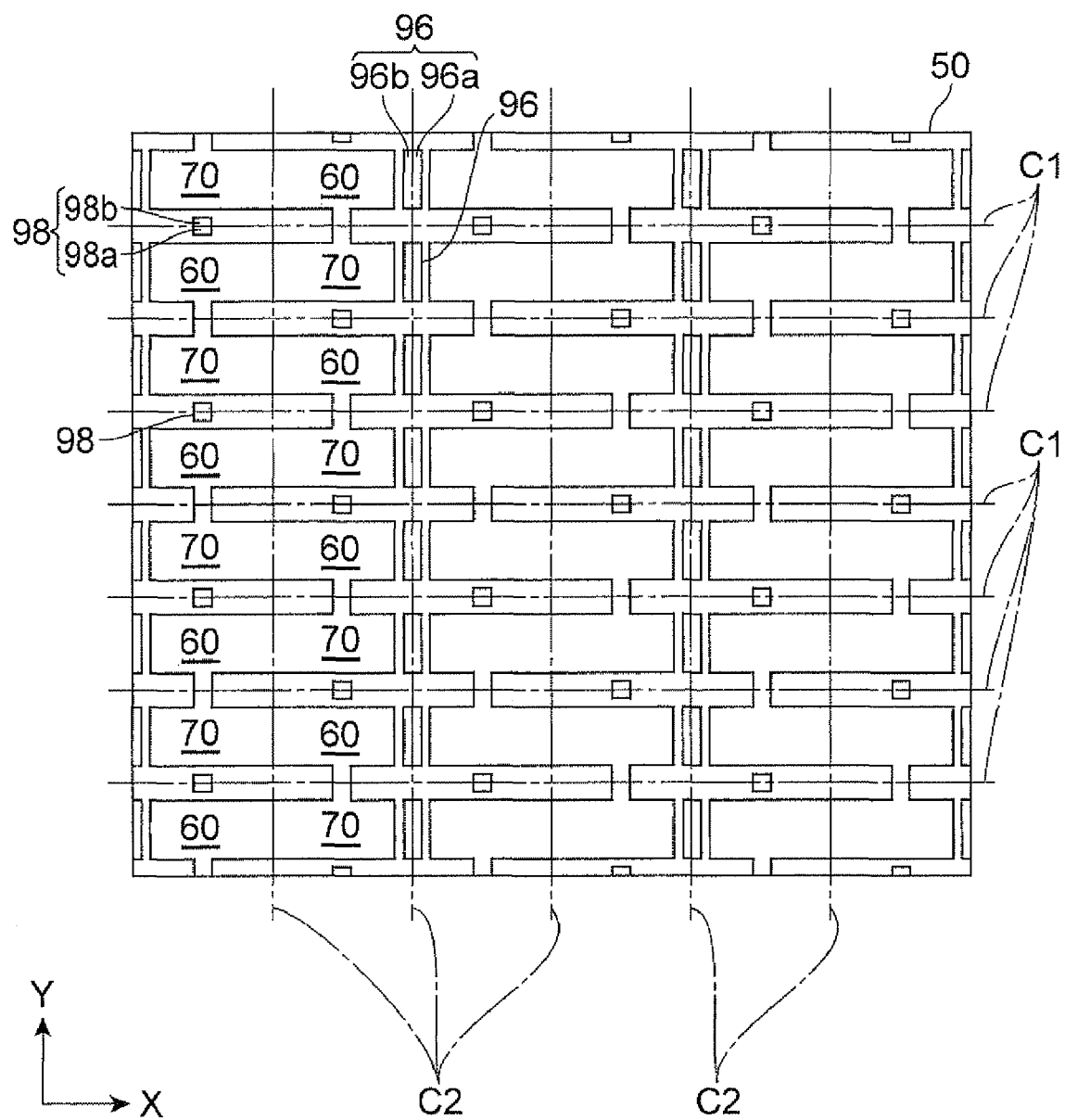
FIG. 24 is a plan view showing a ceramic green sheet.

The ceramic green sheet preparing step also includes preparing a plurality of ceramic green sheets 50 shown in FIG. 24. FIG. 24 is a plan view showing a ceramic green sheet.

The ceramic green sheet 50 has dummy electrode patterns 96 corresponding to the dummy electrodes 8D, 9C and dummy electrode patterns 98 corresponding to the dummy electrodes 10C, 10D, in addition to the internal electrode patterns 60 and internal electrode patterns 70, the electrode patterns being formed on the green sheet 50. Each dummy electrode pattern 96 includes a portion 96a corresponding to the dummy electrode 8D and a portion 96b corresponding to the dummy electrode 9C. Each dummy electrode pattern 98 includes a portion 98a corresponding to the dummy electrode 10C and a portion 98b corresponding to the dummy electrode 10D.

The dummy electrode patterns 96 are formed so as to be alternately located between internal electrode pattern 60 and internal electrode pattern 70 in a first direction (X-direction in FIG. 24). The dummy electrode patterns 96 are also formed so that the portion 96a corresponding to the dummy electrode 8D and the portion 96b corresponding to the dummy electrode 9C are continuous across an intended cutting line C2. The dummy electrode patterns 96 are arranged in juxtaposition along a direction in which the intended cutting line C2 extends.

The dummy electrode patterns 98 are formed so as to be located between internal electrode pattern 60 and internal electrode pattern 70 in a second direction (Y-direction in FIG. 24). The dummy electrode patterns 98 are also formed so that the portion 98a corresponding to the dummy electrode 10C and the portion 98b corresponding to the dummy electrode 10D are continuous across an intended cutting line C1.

Figure 25:
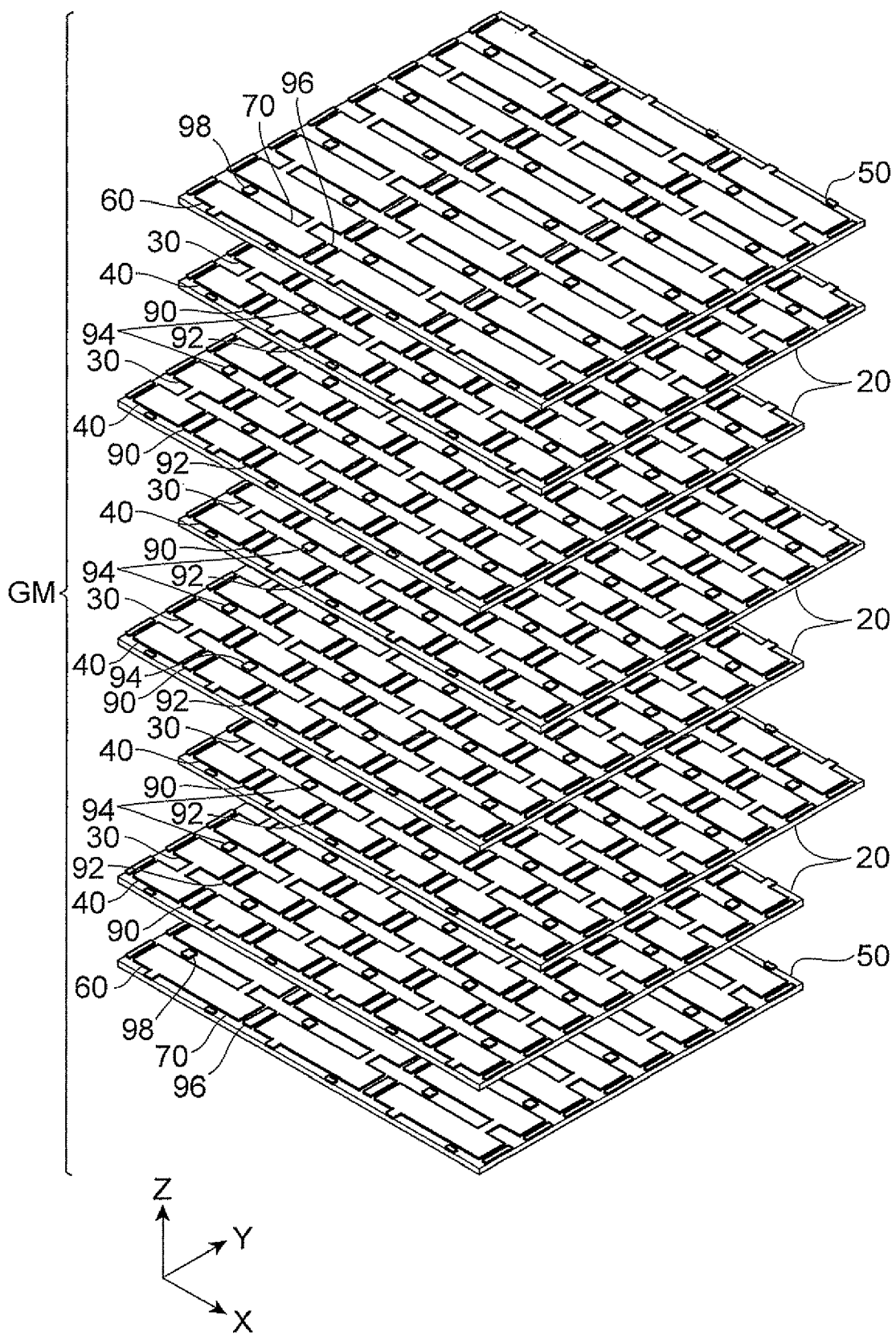
FIG. 25 is a perspective view showing an order of laminating ceramic green sheets in a laminating step.
Figure 26:
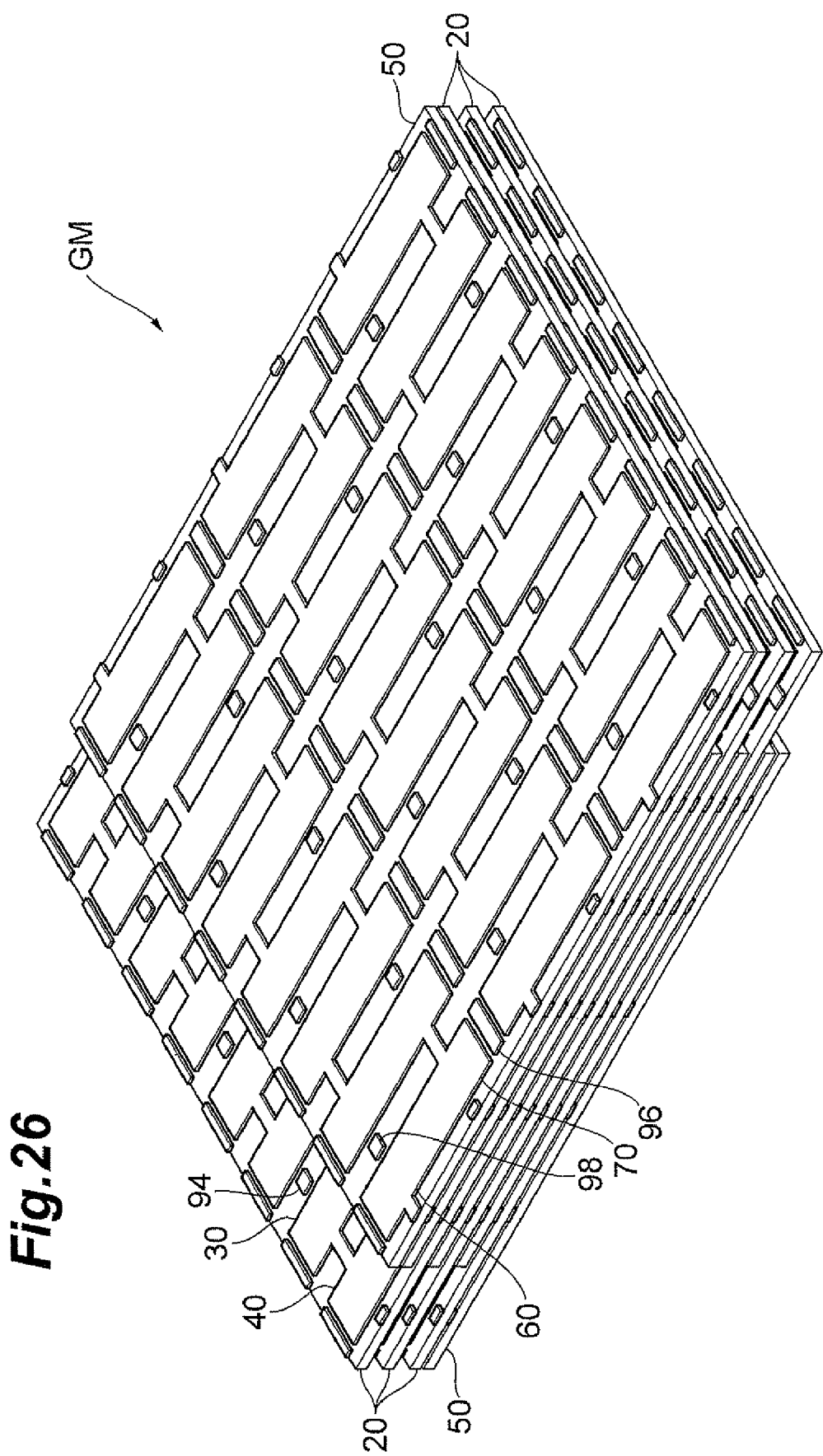
FIG. 26 is a perspective view showing a ceramic green sheet laminate body.

The subsequent laminating step is, as shown in FIG. 25, to laminate a plurality of ceramic green sheets 20, 50, together with ceramic green sheets without any internal electrode patterns (not shown), in a third direction (Z-direction in FIG. 25). This process provides a ceramic green sheet laminate body GM shown in FIG. 26.

Figure 27:
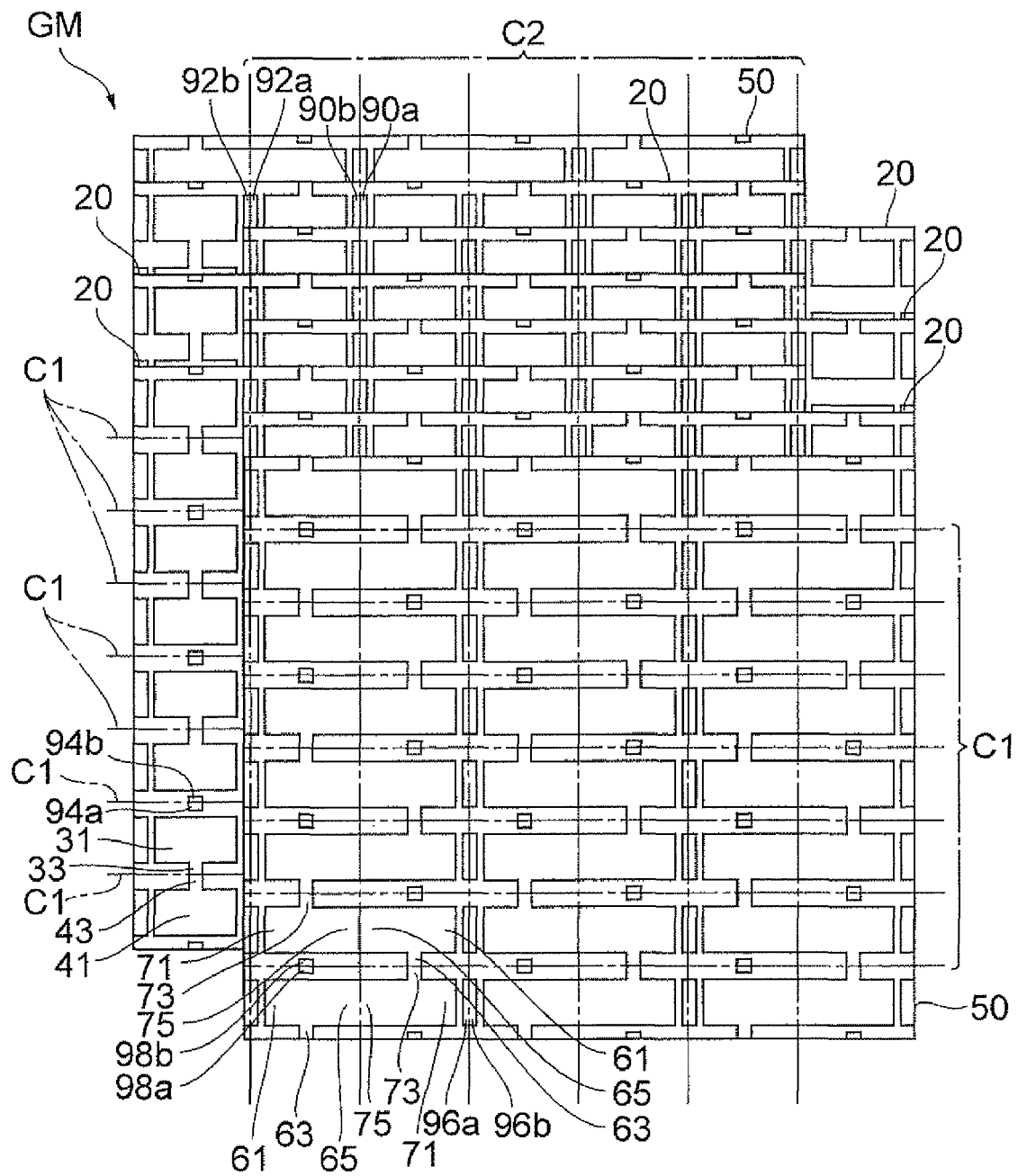
FIG. 27 is a plan view showing the ceramic green sheet laminate body in a decomposed state for explaining a cutting step.
Figure 28:
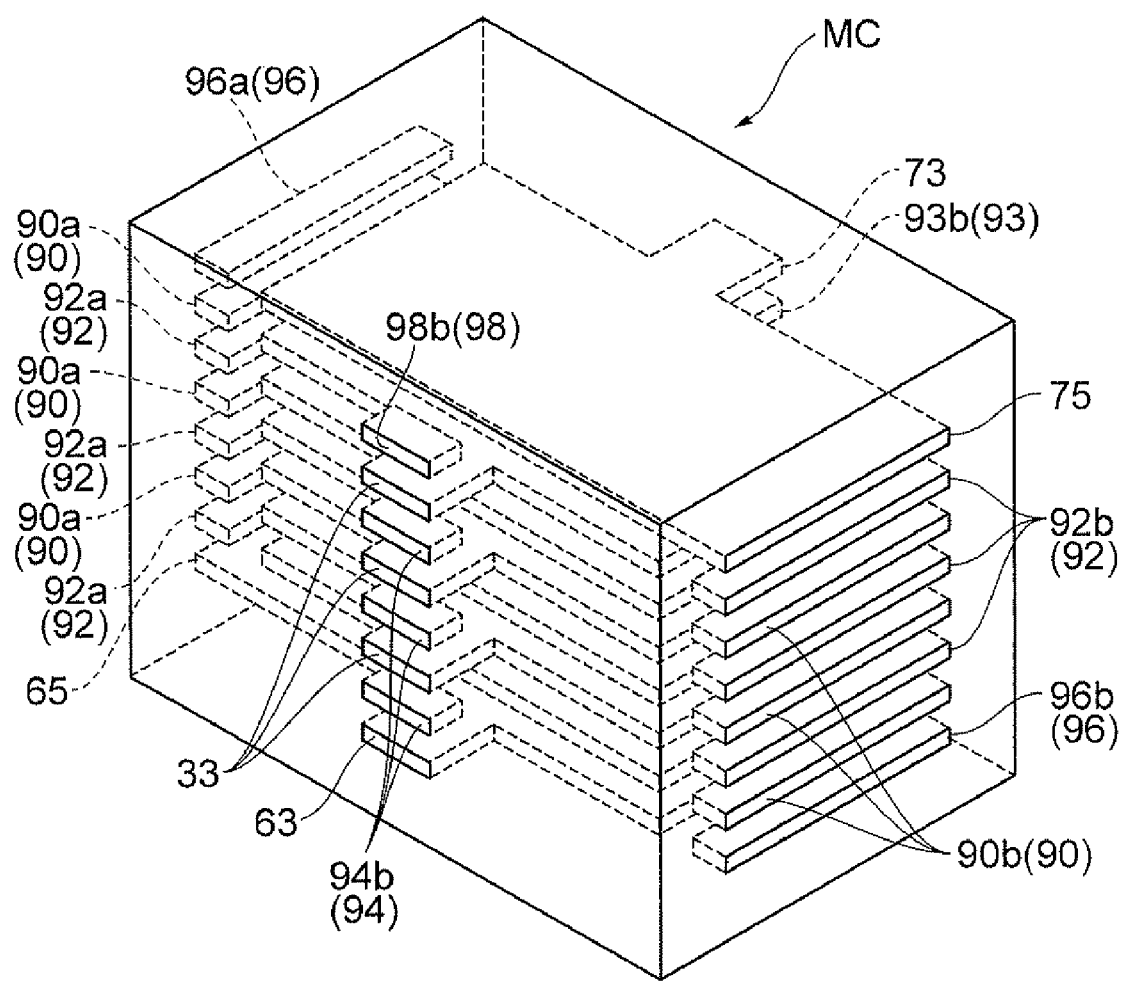
FIG. 28 is a perspective view showing a laminate chip.

The subsequent cutting step is, as shown in FIG. 27, to cut the ceramic green sheet laminate body GM along intended cutting lines C1, C2. This process provides laminate chips MC of individual multilayer capacitor units shown in FIG. 28. FIG. 27 is a plan view showing the ceramic green sheet laminate body GM in a decomposed state, for explaining the cutting step.

When the ceramic green sheet laminate body GM is cut along the intended cutting lines C1, the portions 33, 43 corresponding to the lead portions 14A, 14B, the portions 63, 73 corresponding to the lead portions 14C, 14E, and the portions 94a, 94b, 98a, 98b corresponding to the dummy electrodes 10A, 10B, 10C, 10D each are exposed in the cut faces. When the ceramic green sheet laminate body GM is cut along the intended cutting lines C2, the portions 65, 75 corresponding to the lead portions 14D, 14F, the portions 90a, 92a, 96a corresponding to the dummy electrodes 8A, 8B, 8D, and the portions 92b, 90b, 96b corresponding to the dummy electrodes 9A, 9B, 9C each are exposed in the cut faces. In each laminate chip MC, therefore, the portions 33, 43, 63, 73, 65, 75, 90a, 92a, 96a, 92b, 90b, 96b, 94a, 94b, 98a, 98b corresponding to the respective lead portions 14A, 14B, 14C, 14E, 14D, 14F and dummy electrodes 8A, 8B, 8D, 9A, 9B, 9C, 10A, 10B, 10C, 10D are exposed in the side faces thereof.

The aforementioned multilayer capacitors are finally obtained through the subsequent firing step and external conductor forming step. The firing step and external conductor forming step are the same as the firing step S4 and external conductor forming step S5 in the aforementioned first embodiment and the description thereof is thus omitted herein.

As described above, the production method of the third embodiment simplifies the production steps of multilayer capacitor 1, reduces the production cost, and permits the multilayer capacitor 1 with the element body 2 including the capacitance section 11 and the ESR control section 12 to be produced with a good yield, as the production methods of the first and second embodiments do.

In the production method of the third embodiment, the portion 90a corresponding to the dummy electrode 8A and the portion 90b corresponding to the dummy electrode 9B are continuous across the intended cutting line C2, in each dummy electrode pattern 90 formed on the ceramic green sheet 20. In each dummy electrode pattern 92, the portion 92a corresponding to the dummy electrode 8B and the portion 92b corresponding to the dummy electrode 9A are continuous across the intended cutting line C2. In each dummy electrode pattern 94, the portion 94a corresponding to the dummy electrode 10A and the portion 94b corresponding to the dummy electrode 10B are continuous across the intended cutting line C1. In each dummy electrode pattern 96 formed on the ceramic green sheet 50, the portion 96a corresponding to the dummy electrode 8D and the portion 96b corresponding to the dummy electrode 9C are also continuous across the intended cutting line C2. In each dummy electrode pattern 98, the portion 98a corresponding to the dummy electrode 10C and the portion 98b corresponding to the dummy electrode 10D are also continuous across the intended cutting line C1. In each laminate chip MC, therefore, the dummy electrode patterns 90-98 (90a, 92a, 96a, 92b, 90b, 96b, 94a, 94b, 98a, 98b) are always exposed in the side faces of cut faces, whereby the element body 2 can be obtained in the structure wherein the dummy electrodes 8A, 8B, 8D, 9A, 9B, 9C, 10A, 10B, 10C, 10D are also exposed in the side faces 2a-2d. The dummy electrodes 8A, 8B, 8D, 9A, 9B, 9C, 10A, 10B, 10C, 10D are provided for increasing contact areas with the external electrodes 3A, 3B and connection conductors 4A, 4B on the occasion of forming the external electrodes 3A, 3B and connection conductors 4A, 4B on the element body 2 and thereby increasing the connection strength between the element body 2 and the external electrodes 3A, 3B and connection conductors 4A, 4B. When the dummy electrode patterns 90-98 are formed on the ceramic green sheets 20, 50, the dummy electrode patterns 90-98 function as level difference absorbing layers to restrain occurrence of a level difference due to the thickness of the internal electrode patterns 30, 40, 60, 70, thereby preventing each laminate chip MC (element body 2) from being deformed.

Fourth Embodiment

Figure 30:
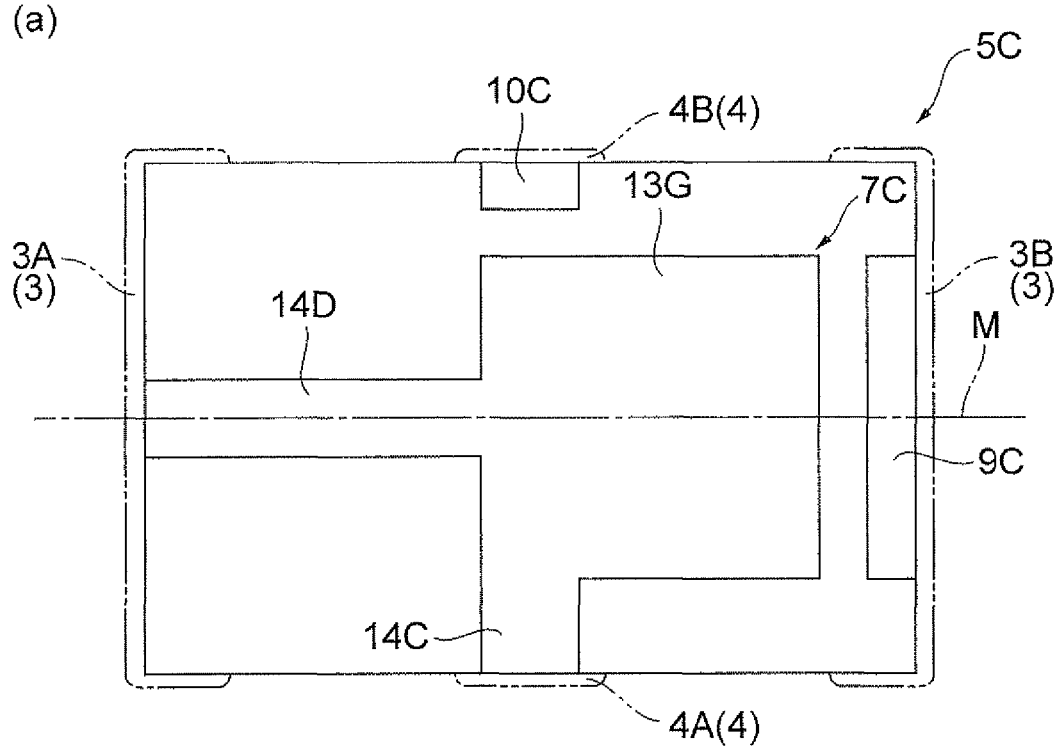
FIG. 30 is a plan view showing composite layers in an ESR control section.
Figure 30:
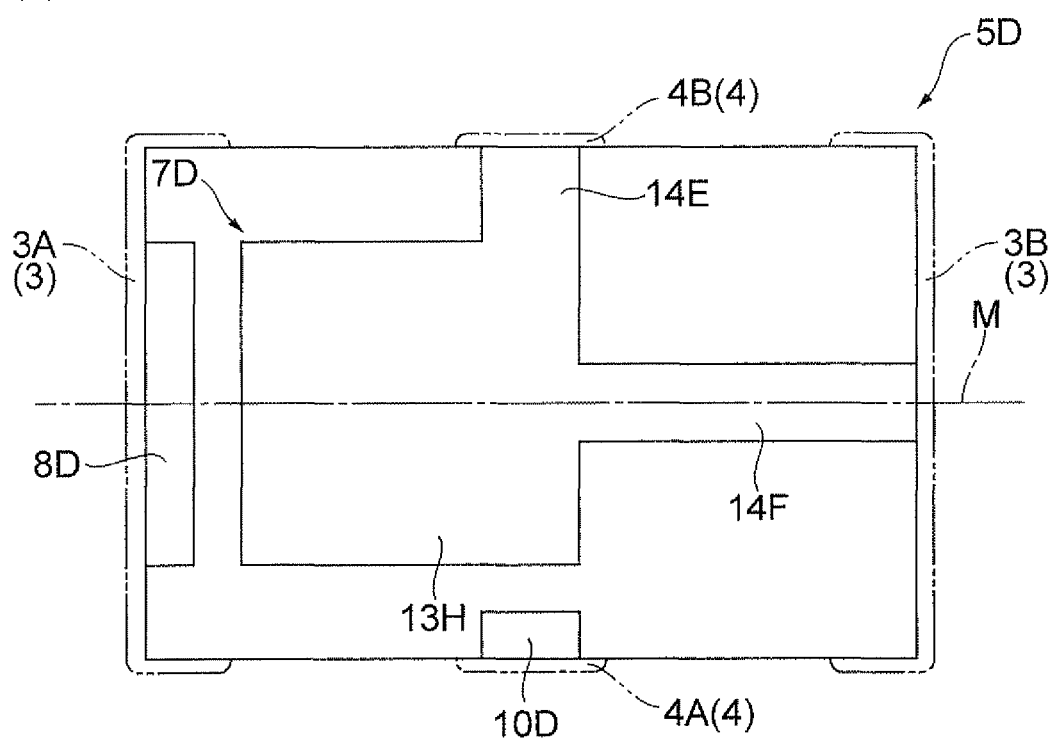
Figure 31:
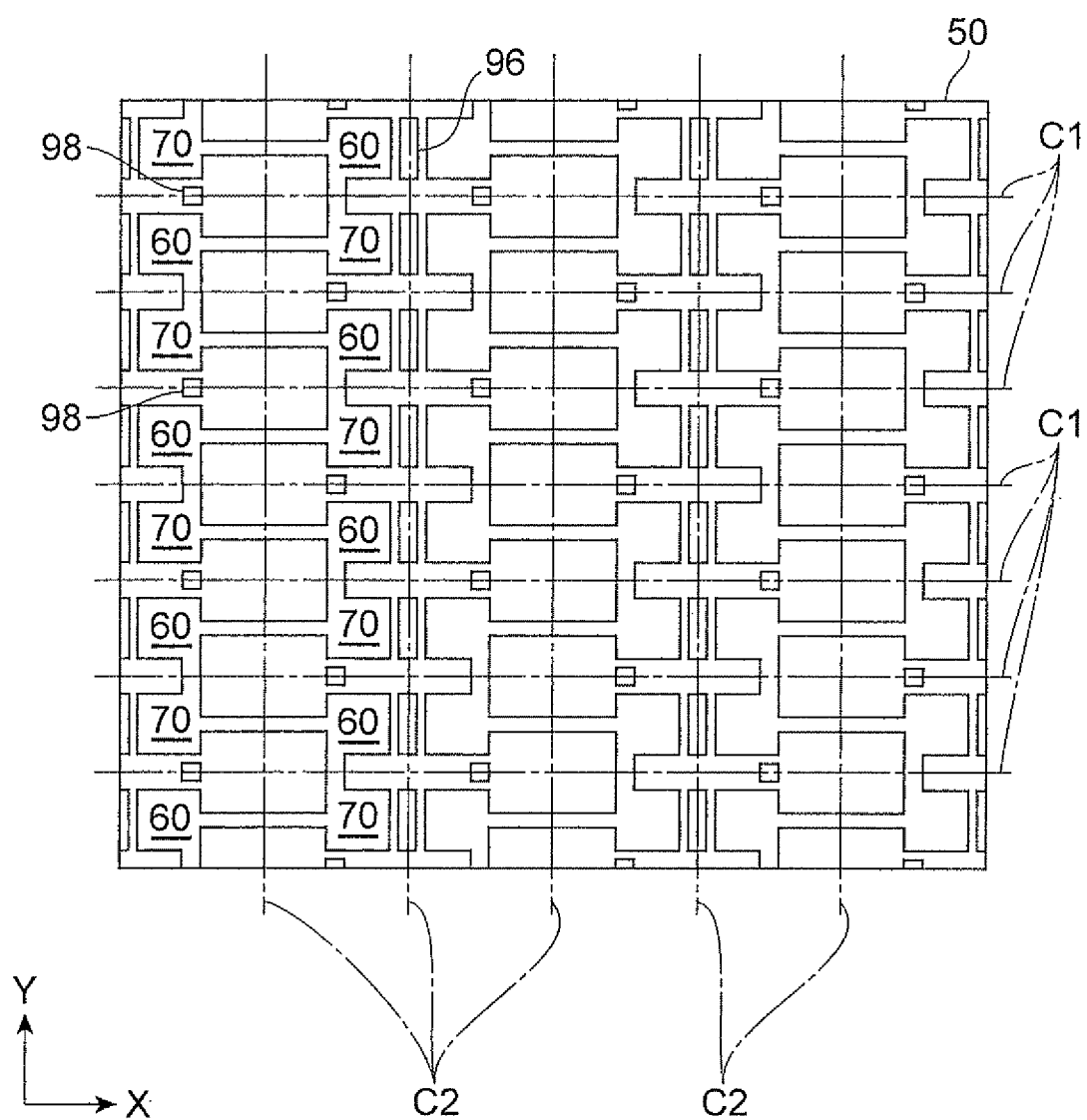
FIG. 31 is a plan view showing a ceramic green sheet.

The below will describe a configuration of a multilayer capacitor produced by a production method of multilayer capacitor according to the fourth embodiment, with reference to FIGS. 29 to 31. The multilayer capacitor of the fourth embodiment is different in provision of dummy electrodes from the multilayer capacitor of the second embodiment.

Although not shown, the multilayer capacitor of the fourth embodiment is provided with the element body 2, external electrodes 3A, 3B, and connection conductors 4A, 4B as the aforementioned multilayer capacitor 1 is. The element body 2, as shown in FIG. 29, is composed of a plurality of composite layers 5 with internal electrodes 7 of different patterns on dielectric layers 6, and the dielectric layers 6 laid as outermost layers of the composite layers 5 and functioning as protecting layers. The element body 2, as shown in FIG. 29, has the capacitance section 11 and the ESR control section 12.

Figure 29:
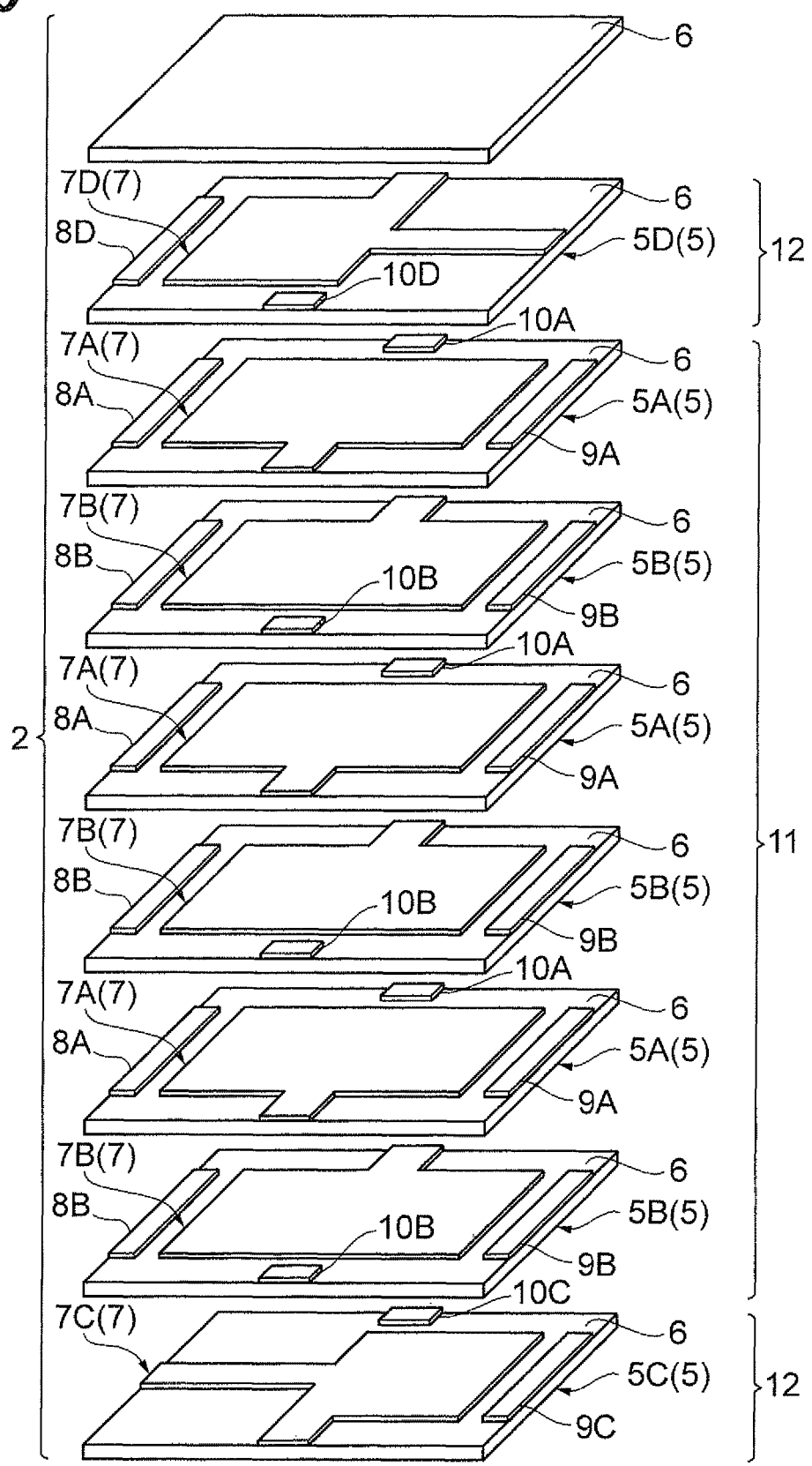
FIG. 29 is a drawing showing a layer configuration of a multilayer capacitor according to the fourth embodiment.

The capacitance section 11, as shown in FIG. 29, is formed in a structure in which two types of composite layers 5A, 5B different in the shape of the internal electrode are alternately laminated in multiple layers. Each composite layer 5A includes dummy electrodes 8A, 9A, 10A, in addition to the internal electrode 7A. Each composite layer 5B includes dummy electrodes 8B, 9B, 10B, in addition to the internal electrode 7B.

The ESR control section 12, as shown in FIG. 29, is composed of two composite layers 5C, 5D different in the shape of the internal electrode. The composite layer 5C, as shown in FIG. 30(a), includes dummy electrodes 9C, 10C, in addition to the internal electrode 7C. The composite layer 5D, as shown in FIG. 30(b), includes dummy electrodes 8D, 10D, in addition to the internal electrode 7D.

The multilayer capacitor having the configuration as described above can also achieve a higher ESR than in the conventional configuration where the internal electrodes 7 are connected in parallel to the external electrodes 3, as the aforementioned multilayer capacitor 1 can.

The following will describe a production method of the multilayer capacitor having the above-described configuration, with reference to FIGS. 31 to 35.

The production method of multilayer capacitor according to the fourth embodiment includes respective steps of the ceramic green sheet preparing step, laminating step, cutting step, firing step, and external conductor forming step as in the first to third embodiments.

The ceramic green sheet preparing step includes preparing a plurality of ceramic green sheets 20 shown in FIG. 23. Each ceramic green sheet 20 has internal electrode patterns 36, internal electrode patterns 40, dummy electrode patterns 90, dummy electrode patterns 92, and dummy electrode patterns 94 formed thereon. The ceramic green sheet preparing step also includes preparing a plurality of ceramic green sheets 50 shown in FIG. 31. Each ceramic green sheet 50 has internal electrode patterns 60, internal electrode patterns 70, dummy electrode patterns 96, and dummy electrode patterns 98 formed thereon. FIG. 31 is a plan view showing a ceramic green sheet.

Figure 32:
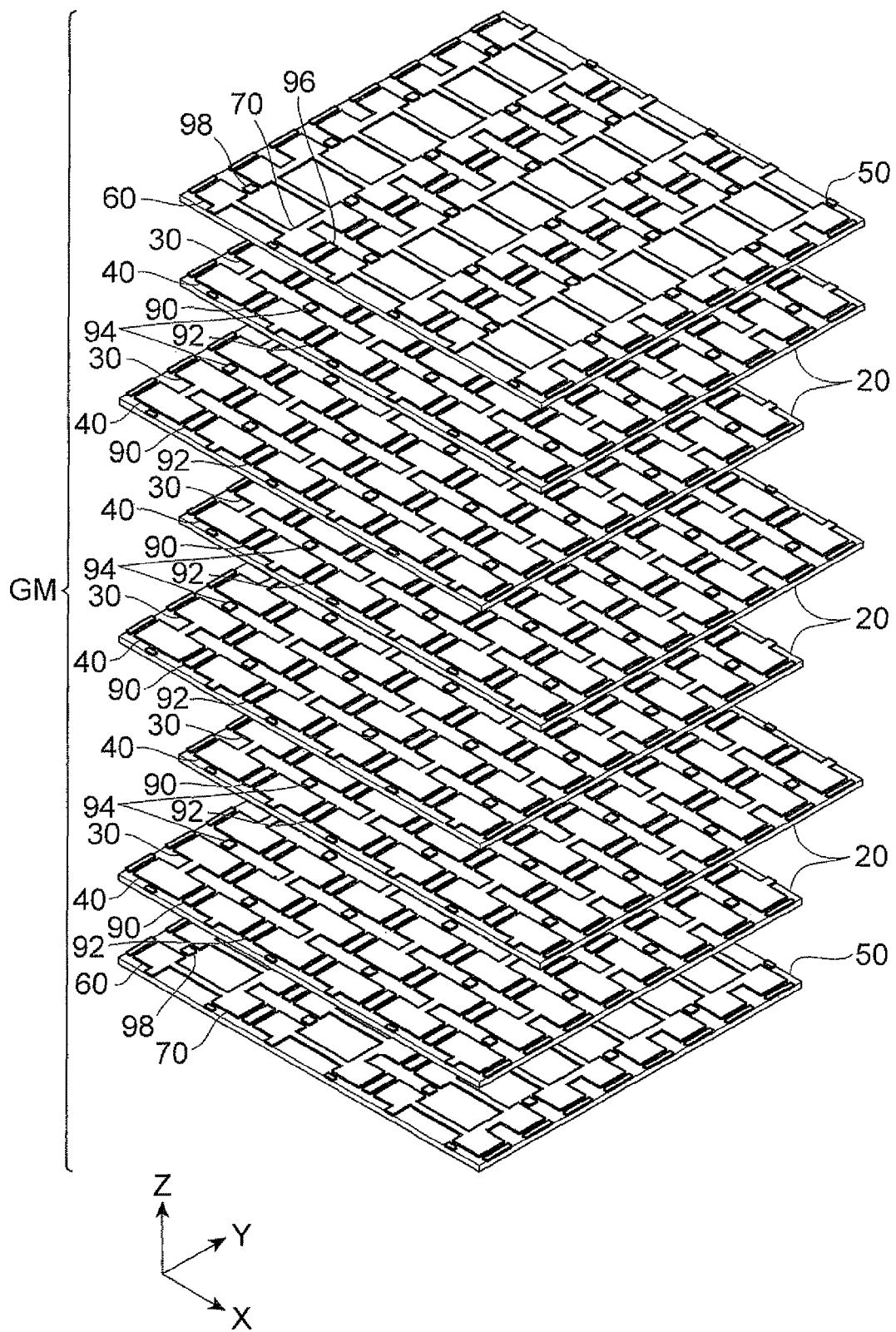
FIG. 32 is a perspective view showing an order of laminating ceramic green sheets in a laminating step.
Figure 33:
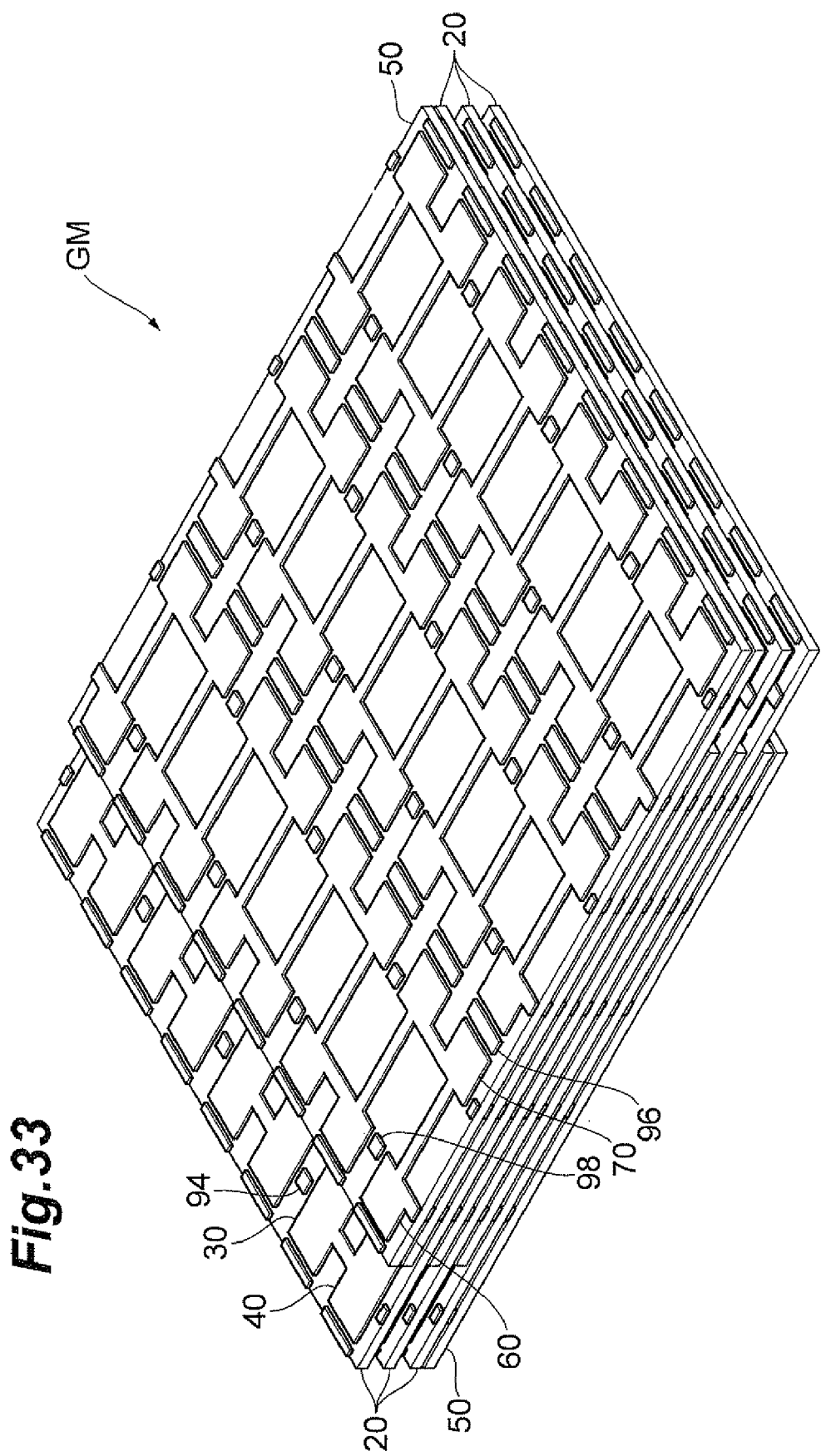
FIG. 33 is a perspective view showing a ceramic green sheet laminate body.

The subsequent laminating step is, as shown in FIG. 32, to laminate a plurality of ceramic green sheets 20, 50, together with ceramic green sheets without any internal electrode patterns (not shown), in a third direction (Z-direction in FIG. 32). This process provides a ceramic green sheet laminate body GM shown in FIG. 33.

Figure 34:
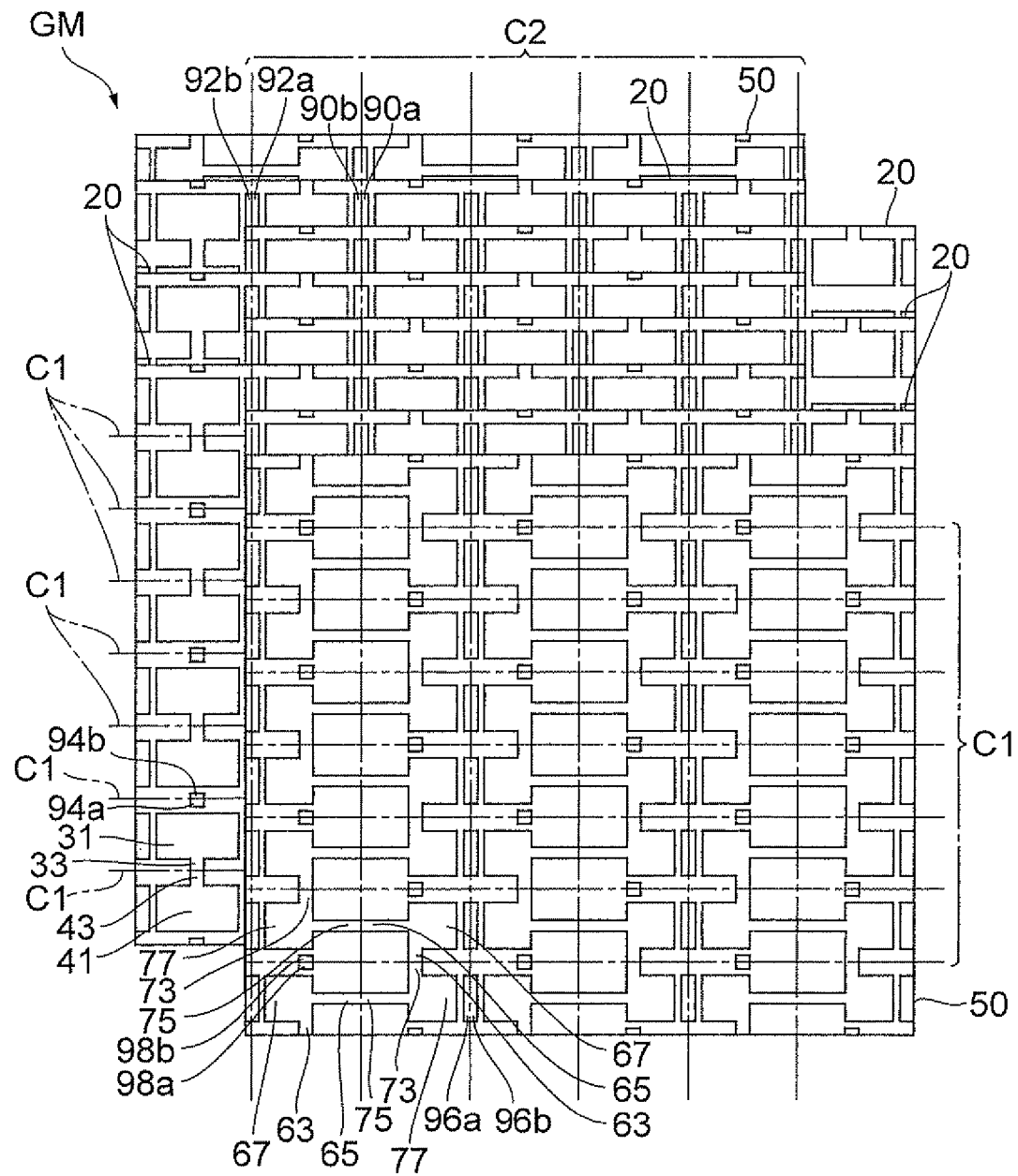
FIG. 34 is a plan view showing the ceramic green sheet laminate body in a decomposed state for explaining a cutting step.
Figure 35:
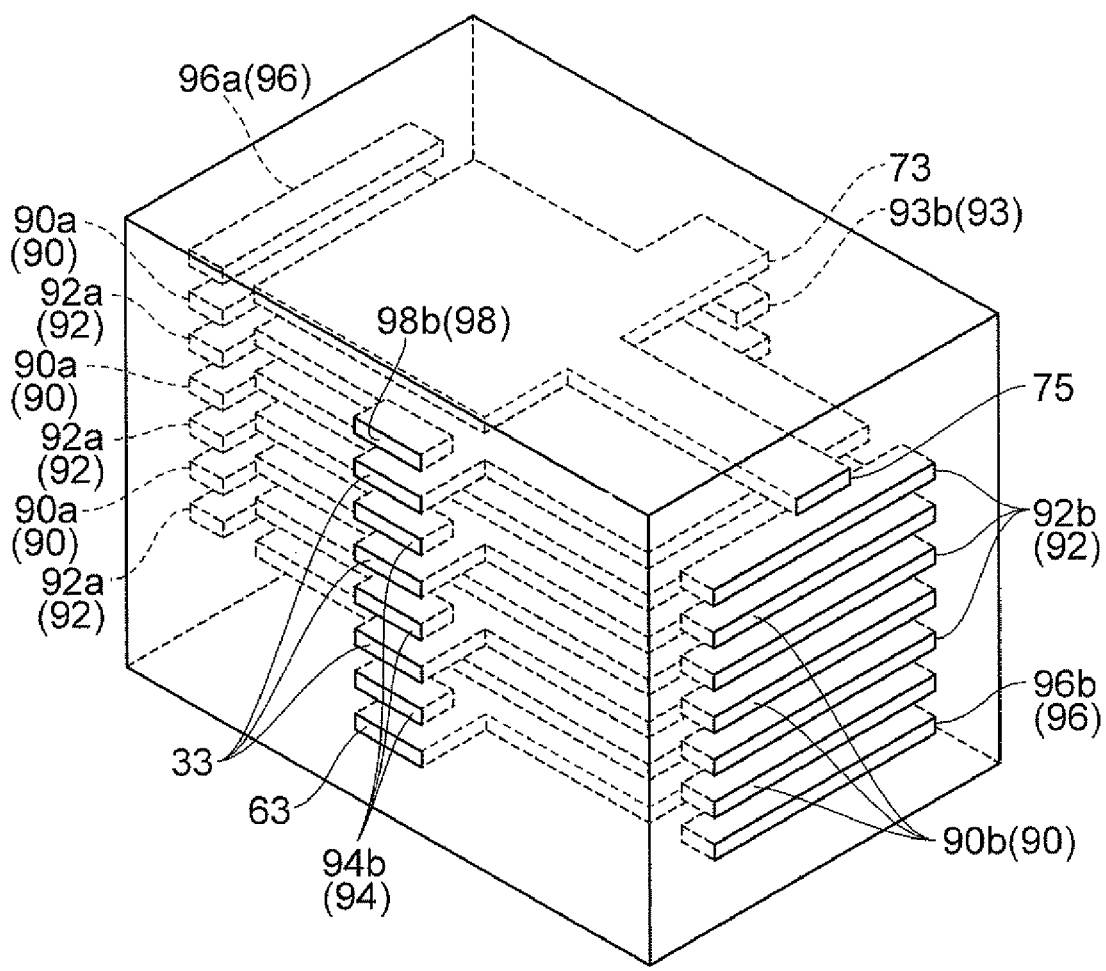
FIG. 35 is a perspective view showing a laminate chip.

The subsequent cutting step is, as shown in FIG. 34, to cut the ceramic green sheet laminate body GM along intended cutting lines C1, C2. This process provides laminate chips MC of individual multilayer capacitor units shown in FIG. 35. FIG. 34 is a plan view showing the ceramic green sheet laminate body GM in a decomposed state, for explaining the cutting step.

The aforementioned multilayer capacitors are finally obtained through the subsequent firing step and external conductor forming step. The firing step and external conductor forming step are the same as the firing step S4 and external conductor forming step S5 in the aforementioned first embodiment and the description thereof is thus omitted herein.

As described above, the production method of the fourth embodiment simplifies the production steps of multilayer capacitor 1, reduces the production cost, and permits the multilayer capacitor 1 with the element body 2 including the capacitance section 11 and the ESR control section 12 to be produced with a good yield, as the production methods of the first to third embodiments do.

Figure 36:
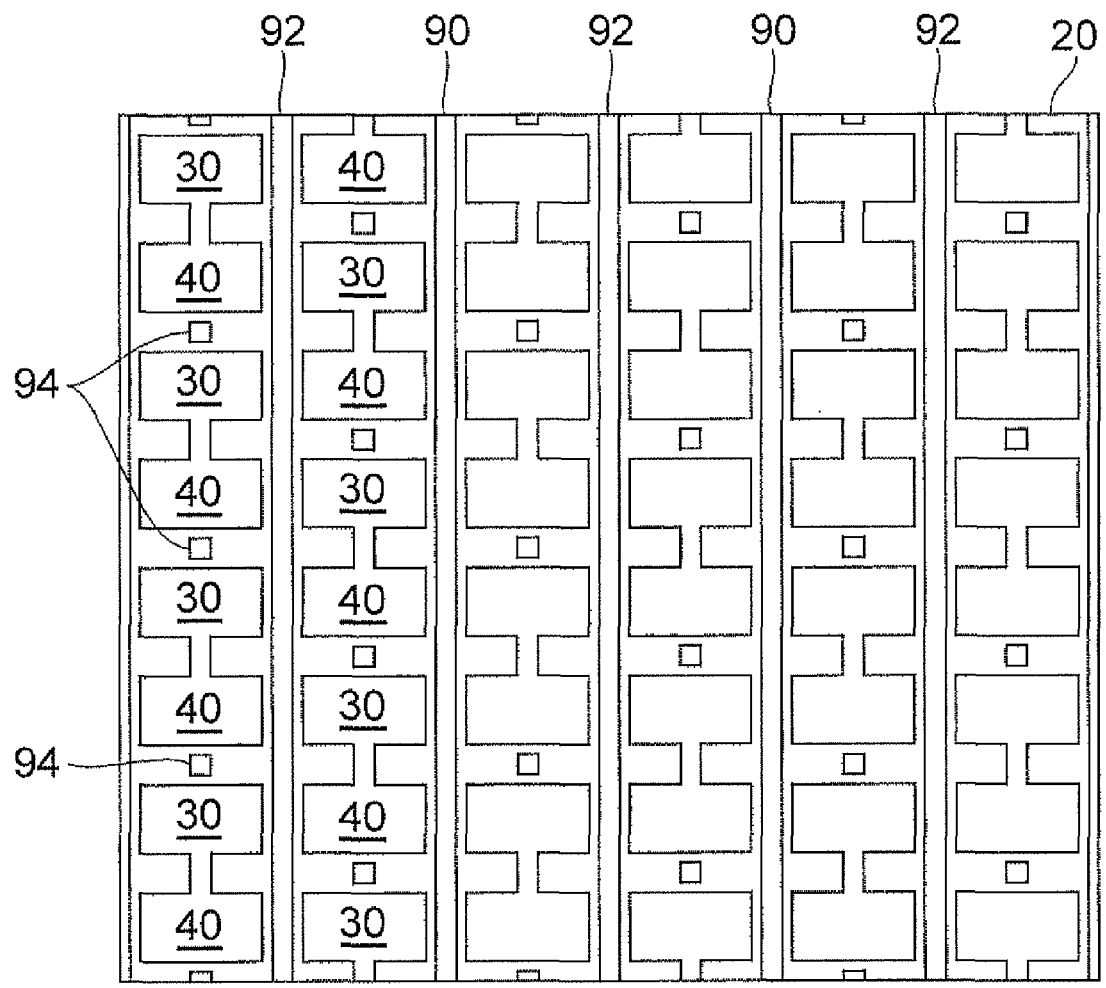
FIG. 36 is a plan view showing a modification example of a ceramic green sheet.
Figure 37:
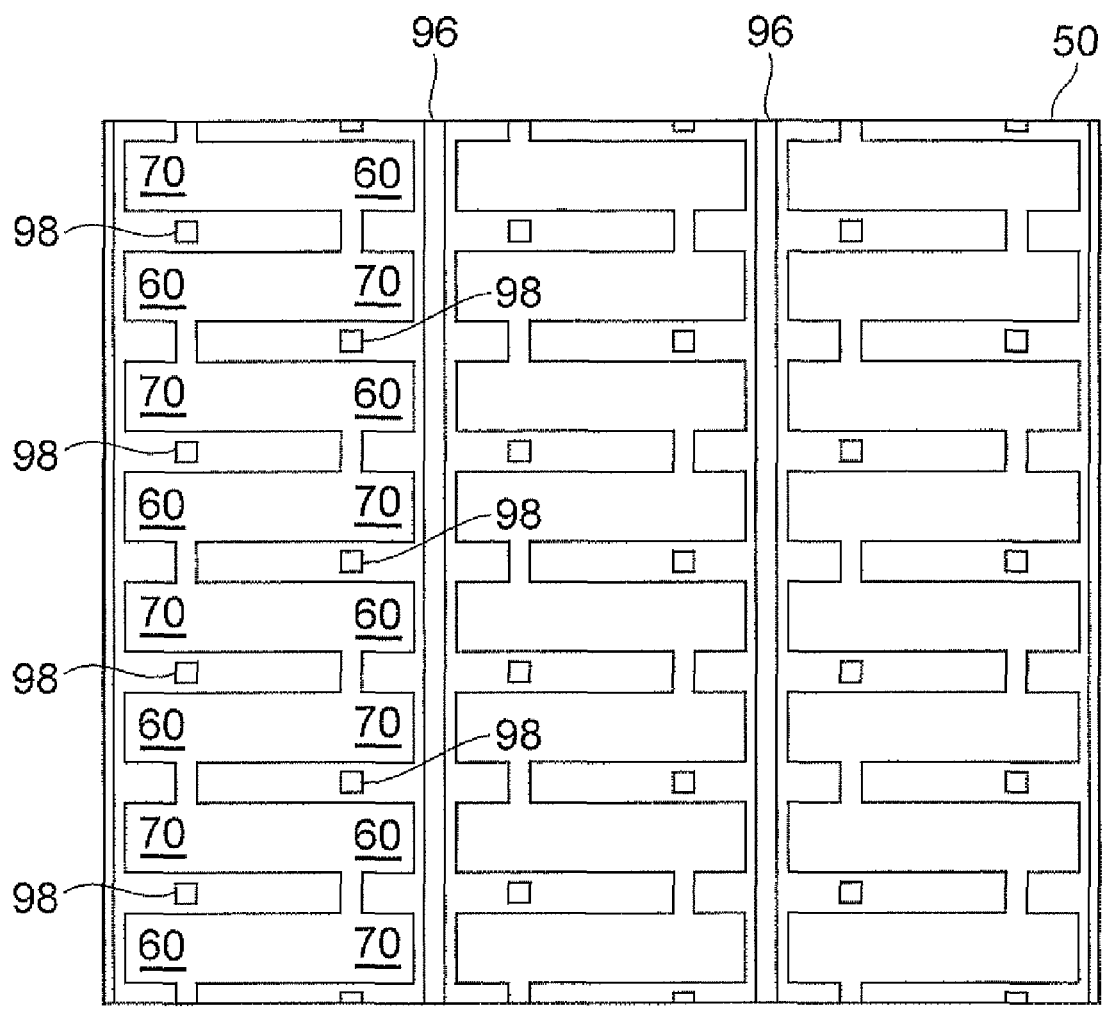
FIG. 37 is a plan view showing a modification example of a ceramic green sheet.
Figure 38:
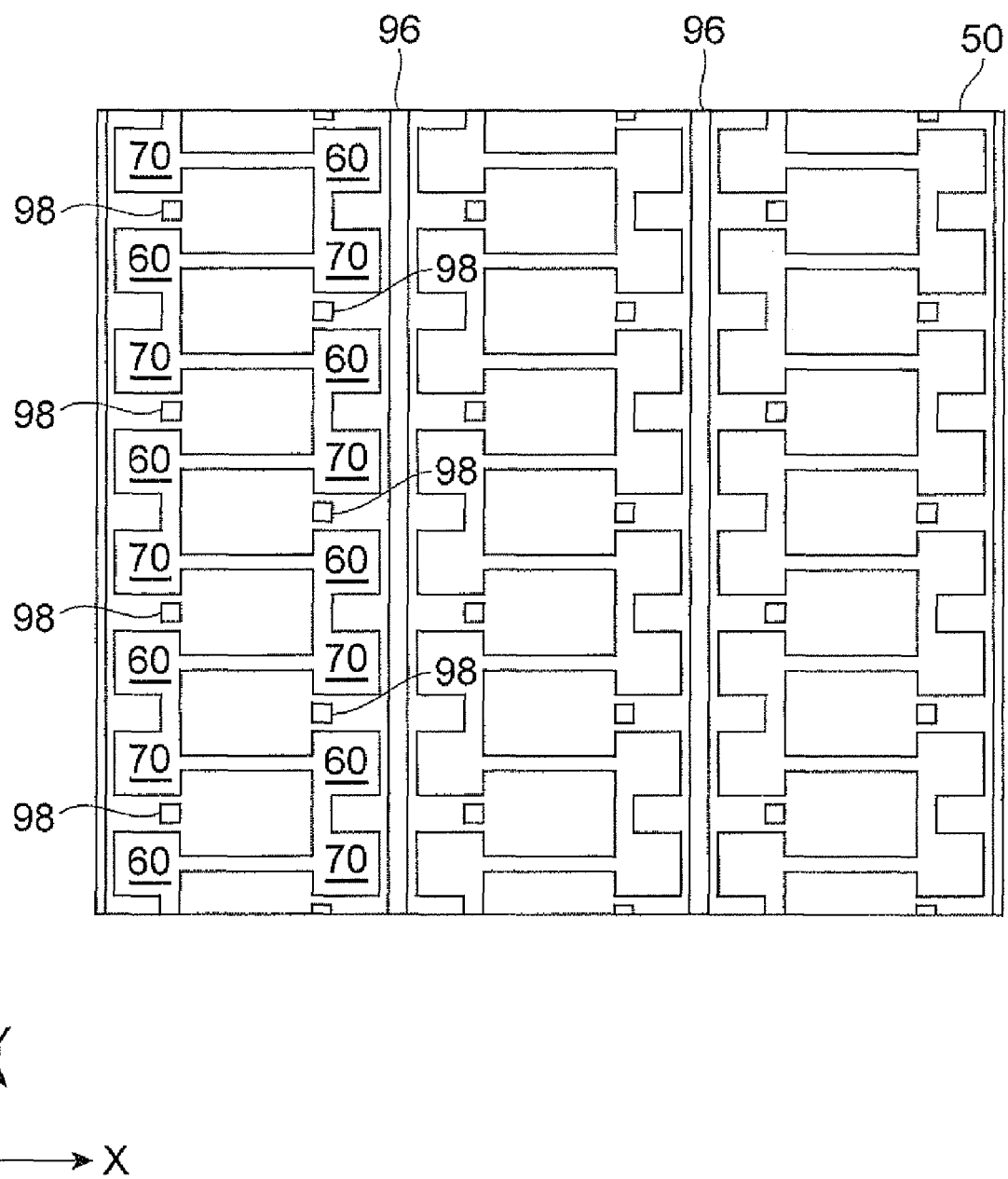
FIG. 38 is a plan view showing a modification example of a ceramic green sheet.

The dummy electrode patterns 90, 92 may be continuously formed in the extending direction of the intended cutting lines C2, as shown in FIG. 36. The dummy electrode patterns 96 may also be continuously formed in the extending direction of the intended cutting lines C2, as shown in FIGS. 37 and 38.

Fifth Embodiment

A configuration of a multilayer capacitor produced by a production method of multilayer capacitor according to the fifth embodiment is the same as the configuration of the multilayer capacitor 1 in the first embodiment. The description about the configuration of the multilayer capacitor in the fifth embodiment is omitted herein accordingly.

Figure 39:
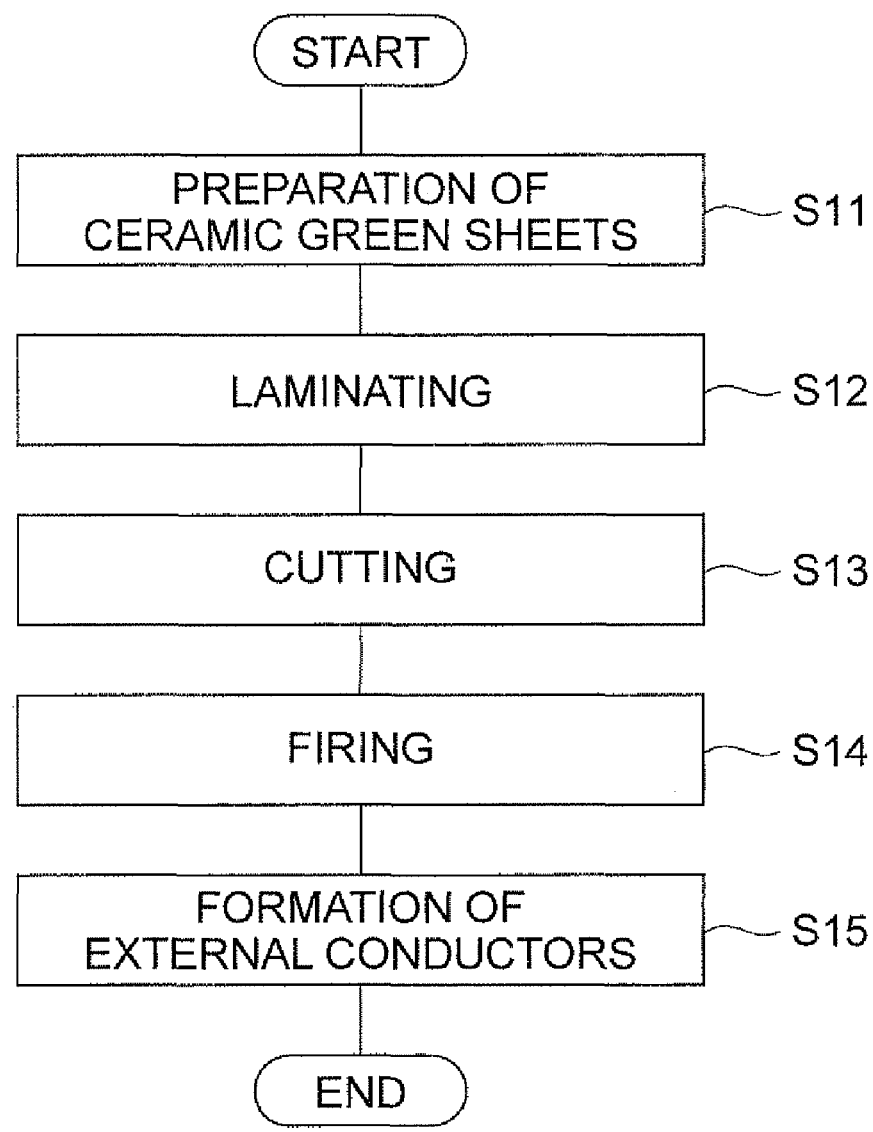
FIG. 39 is a flowchart showing a procedure of a production method of multilayer capacitor according to the fifth embodiment.

The below will describe the production method of multilayer capacitor according to the fifth embodiment, with reference to FIGS. 39 to 44. FIG. 39 shows a procedure of the production method of multilayer capacitor according to the fifth embodiment. The production method of multilayer capacitor according to the fifth embodiment, as shown in FIG. 39, includes respective steps of ceramic green sheet preparing step S11, laminating step S12, cutting step S13, firing step S14, and external conductor forming step S15.

Figure 40:
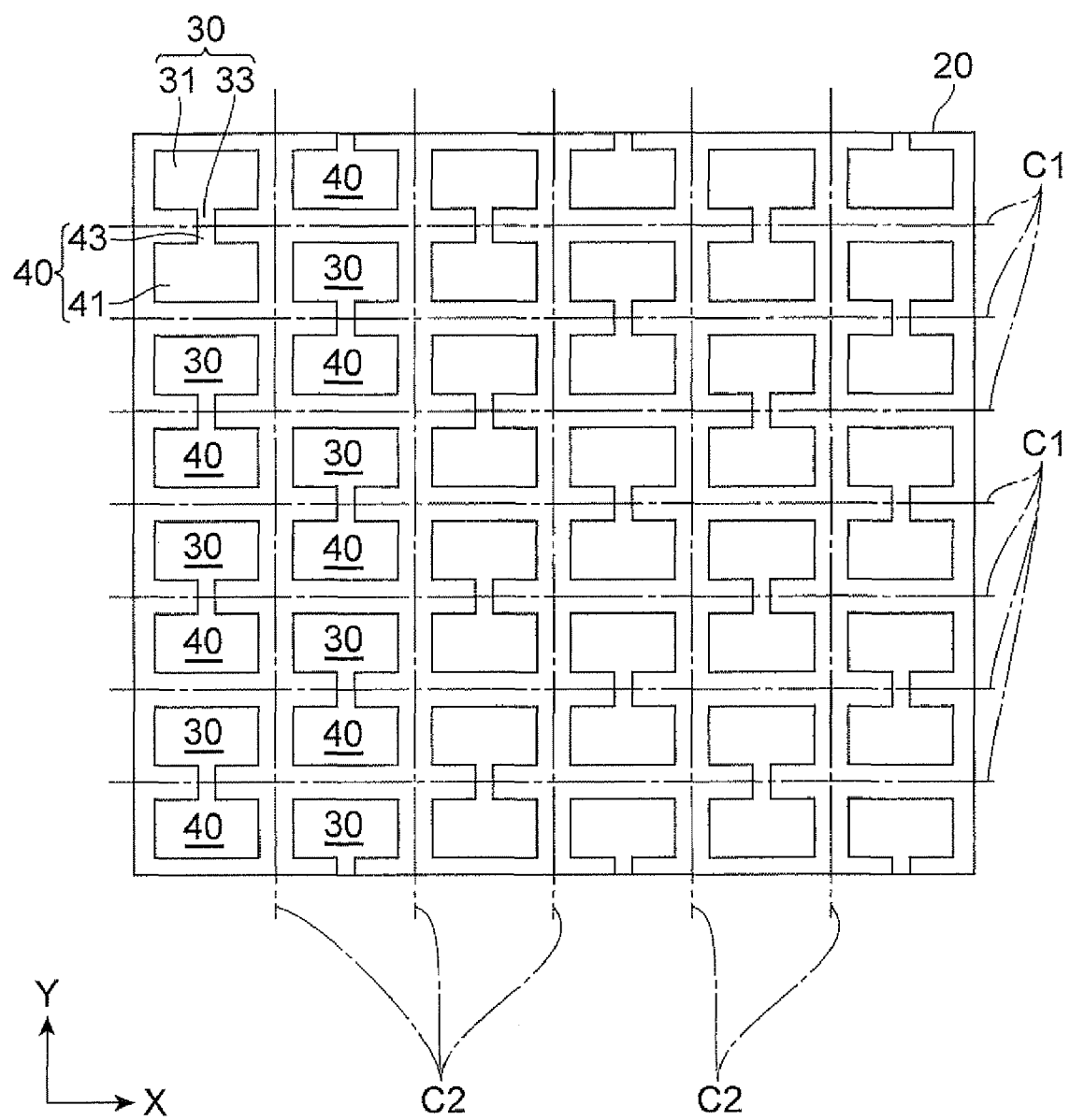
FIG. 40 is a plan view showing a ceramic green sheet.

The ceramic green sheet preparing step S11 includes preparing a plurality of ceramic green sheets 20 shown in FIG. 40. FIG. 40 is a plan view showing a ceramic green sheet.

The ceramic green sheet 20 is of a rectangular shape and a plurality of internal electrode patterns are formed on the top surface thereof. The plurality of internal electrode patterns consist of internal electrode patterns 30 corresponding to the internal electrodes 7A and internal electrode patterns 40 corresponding to the internal electrodes 7B. Each internal electrode pattern 30 has a portion 31 corresponding to the main electrode portion 13A, and a portion 33 corresponding to the lead portion 14A. Each internal electrode pattern 40 has a portion 41 corresponding to the main electrode portion 13B, and a portion 43 corresponding to the lead portion 14B.

The internal electrode patterns 30 and the internal electrode patterns 40 are alternately arranged in a first direction (X-direction in FIG. 40) and in a second direction (Y-direction in FIG. 40) and are formed so that the portion 33 corresponding to the lead portion 14A and the portion 43 corresponding to the lead portion 14B are continuous across an intended cutting line C1. The internal electrode pattern 30 and the internal electrode pattern 40 adjacent in the second direction are continuous through their respective portions 33, 43 corresponding to the lead portions 14A, 14B. The first direction is a direction parallel to one side of the ceramic green sheet 20 and the second direction a direction parallel to one side of the ceramic green sheet 20 and perpendicular to the first direction.

Figure 41:
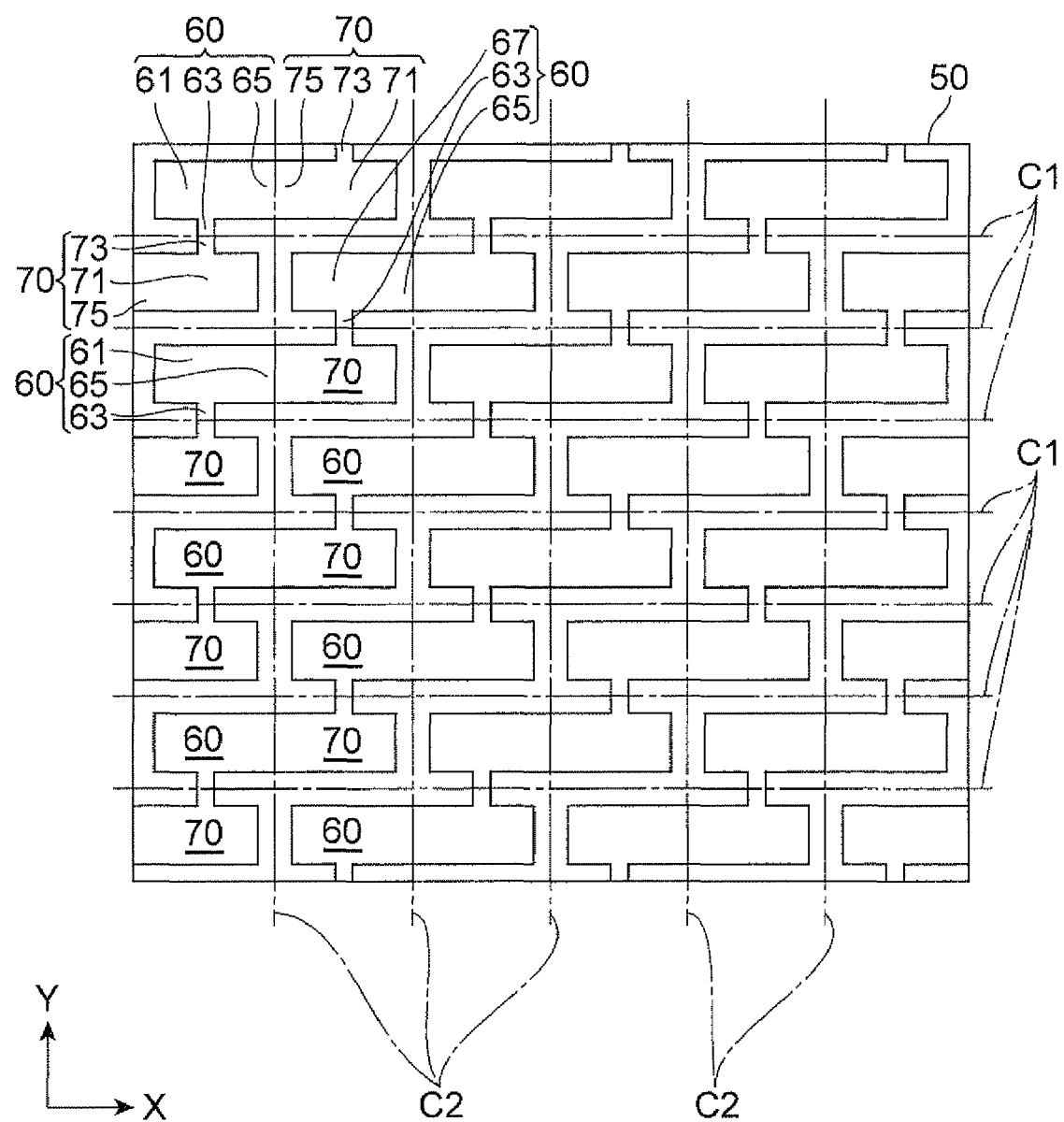
FIG. 41 is a plan view showing a ceramic green sheet.

The ceramic green sheet preparing step S11 also includes preparing a plurality of ceramic green sheets 50 shown in FIG. 41. FIG. 41 is a plan view showing a ceramic green sheet.

The ceramic green sheet 50 is of a rectangular shape and a plurality of internal electrode patterns are formed on a top surface thereof. The plurality of internal electrode patterns consist of internal electrode patterns 60 corresponding to the internal electrodes 7C, and internal electrode patterns 70 corresponding to the internal electrodes 7D. Each internal electrode pattern 60 has a portion 61 corresponding to the main electrode portion 13C, a portion 63 corresponding to the lead portion 14C, and a portion 65 corresponding to the lead portion 14D. Each internal electrode pattern 70 has a portion 71 corresponding to the main electrode portion 13D, a portion 73 corresponding to the lead portion 14E, and a portion 75 corresponding to the lead portion 14F.

The internal electrode patterns 60 and the internal electrode patterns 70 are formed so as to be alternately arranged in a first direction (X-direction in FIG. 41) and in a second direction (Y-direction in FIG. 41). The internal electrode patterns 60 and the internal electrode patterns 70 are also formed so that the portion 63 corresponding to the lead portion 14C and the portion 73 corresponding to the lead portion 14E are continuous across an intended cutting line C1, so that the portion 65 corresponding to the lead portion 14D and the portion 75 corresponding to the lead portion 14F are continuous across an intended cutting line C2, and so that the internal electrode patterns 60, 70 are alternately connected in a direction intersecting with the first and second directions. The internal electrode pattern 60 and internal electrode pattern 70 adjacent in the second direction are continuous through their respective portions 63, 73 corresponding to the lead portions 14C, 14E. The internal electrode pattern 60 and internal electrode pattern 70 adjacent in the first direction are continuous through their respective portions 65, 75 corresponding to the lead portions 14D, 14F. The internal electrode patterns 60 and internal electrode patterns 70 extend in the aforementioned direction intersecting with the first and second directions while being connected in a zigzag shape. The first direction is a direction parallel to one side of the ceramic green sheet 50 and the second direction a direction parallel to one side of the ceramic green sheet 50 and perpendicular to the first direction.

The ceramic green sheets 20, 50 are obtained in the same manner as in the first embodiment. The internal electrode patterns 30, 40, 60, 70 are also formed in the same manner as in the first embodiment.

Figure 42:
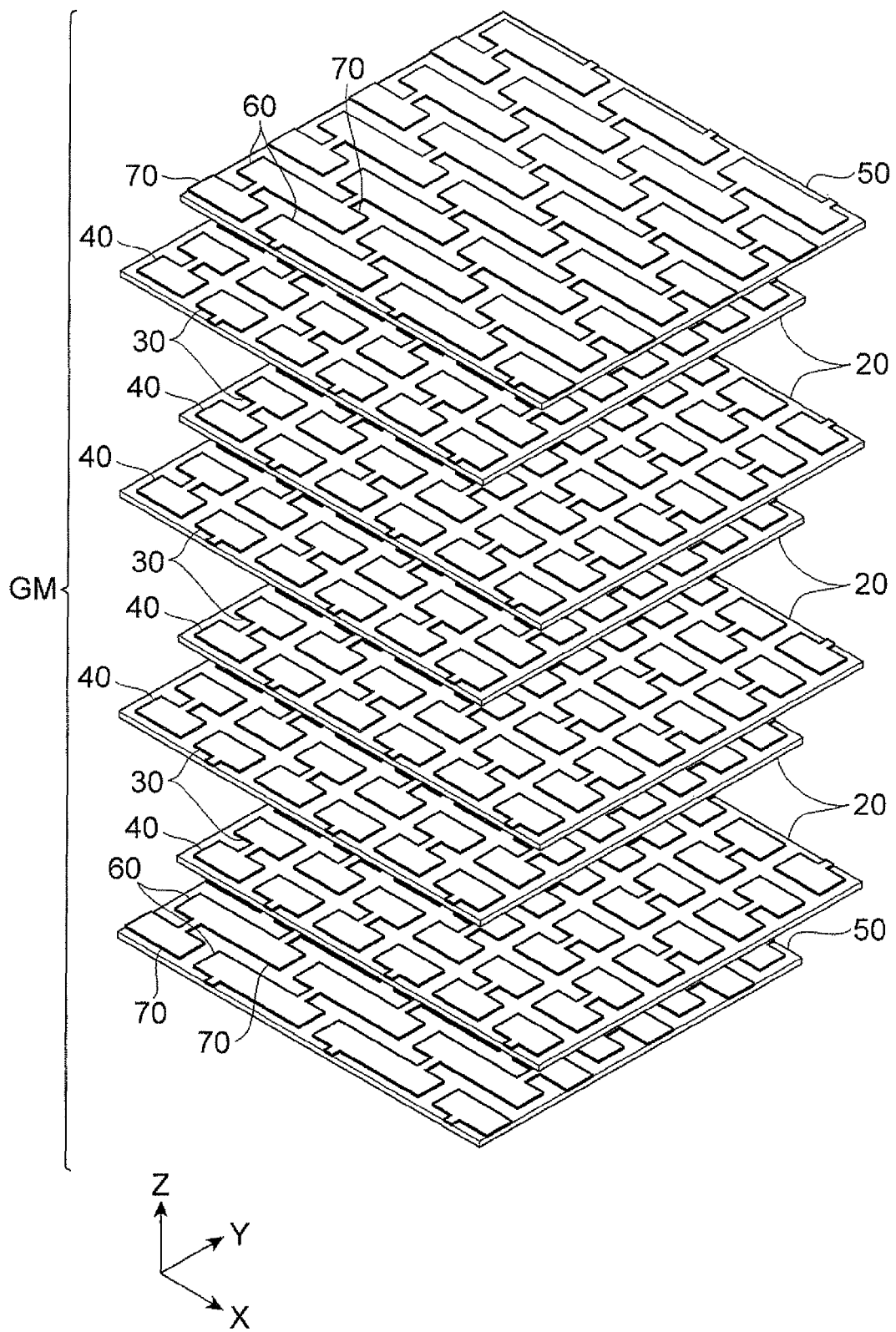
FIG. 42 is a perspective view showing an order of laminating ceramic green sheets in a laminating step.
Figure 43:
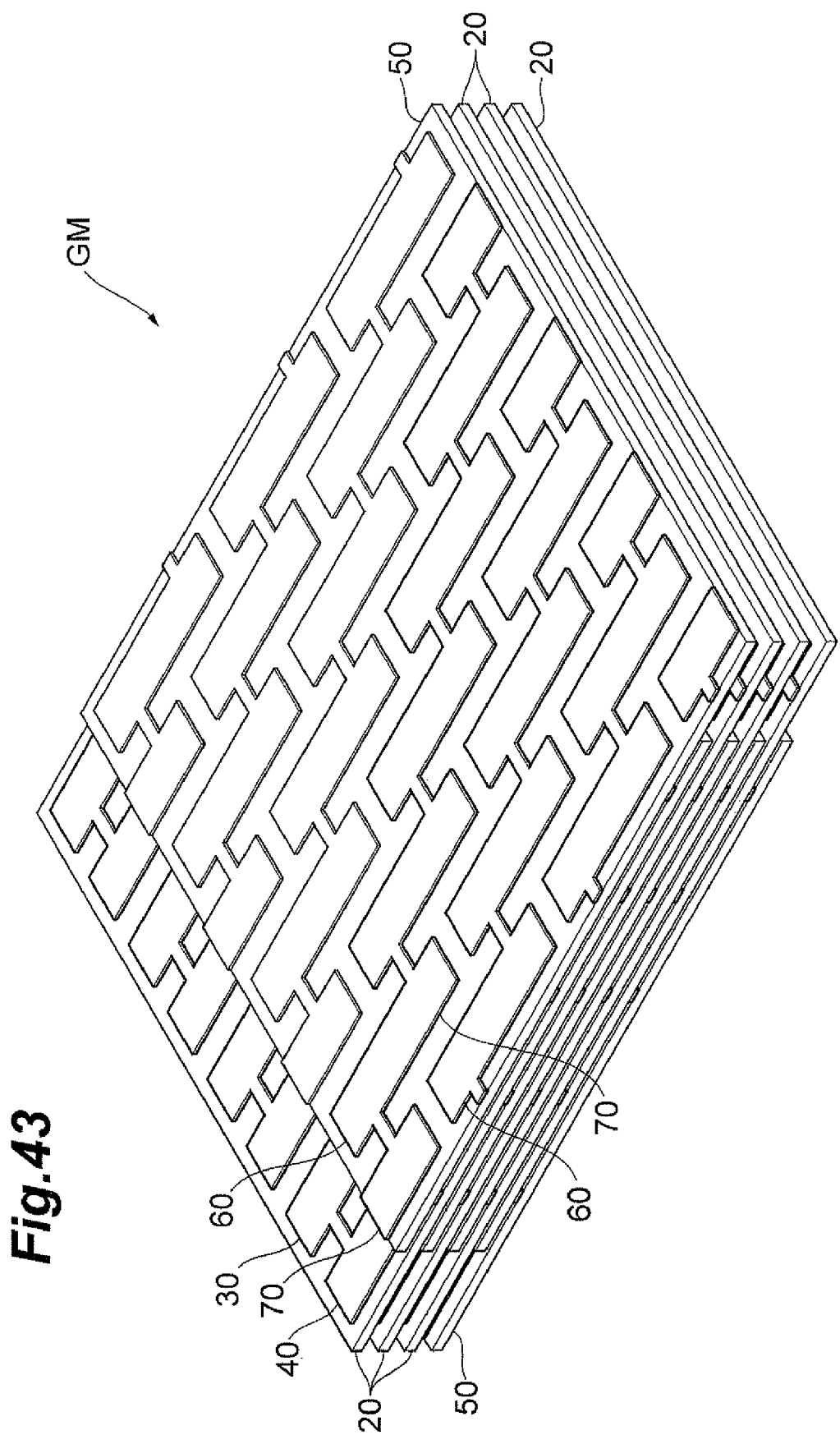
FIG. 43 is a perspective view showing a ceramic green sheet laminate body.

The subsequent laminating step S12 is, as shown in FIG. 42, to laminate a plurality of ceramic green sheets 20, 50, together with ceramic green sheets without any internal electrode patterns (not shown), in a third direction (Z-direction in FIG. 42) perpendicular to the first and second directions. This process provides a ceramic green sheet laminate body GM shown in FIG. 43. At this time, the ceramic green sheets 20, 50 are laminated in such a manner that the ceramic green sheets 20 deviate from each other and the ceramic green sheets 50 deviate from each other by a length of one internal electrode pattern between two adjacent sheets in the first direction. Furthermore, the ceramic green sheets 20, 50 are also laminated so that the positions of the internal electrode patterns 30 coincide with the positions of the internal electrode patterns 40 and so that the positions of the internal electrode patterns 60 coincide with the positions of the internal electrode patterns 70. Namely, the ceramic green sheets 20, 50 are laminated in such a manner that the portions 31, 41, 61, 71 corresponding to the main electrode portions 13A, 13B, 13C, 13D in the internal electrode patterns 30, 40, 60, 70 wholly overlap with each other when viewed from the third direction. The ceramic green sheets without any internal electrode patterns constitute outermost layers of the ceramic green sheet laminate body GM. The ceramic green sheets 20, 50 may be laminated in such a manner that the ceramic green sheets 20 deviate from each other and the ceramic green sheets 50 deviate from each other by a length of one internal electrode pattern between two adjacent sheets in the second direction.

Figure 44:
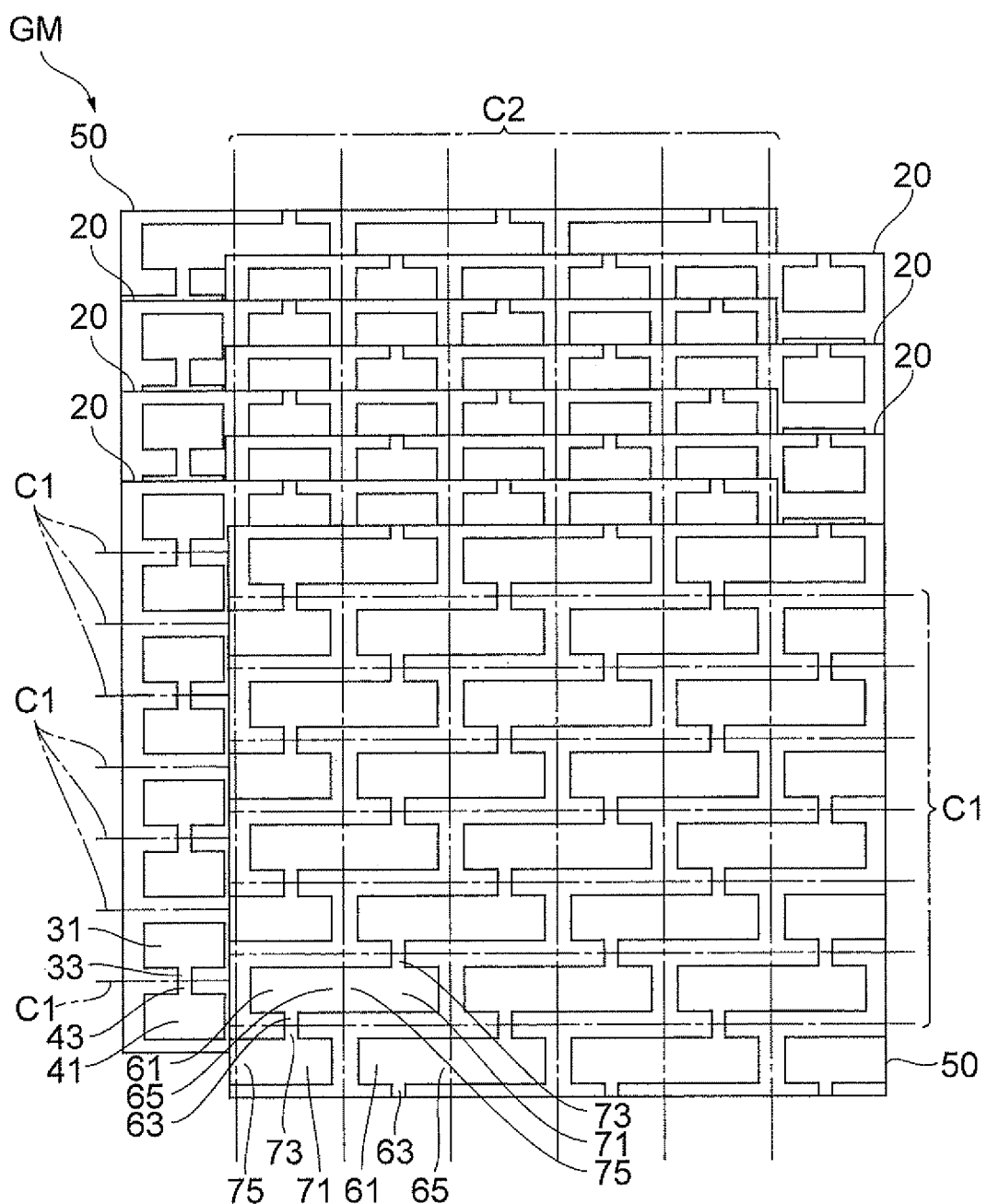
FIG. 44 is a plan view showing the ceramic green sheet laminate body in a decomposed state for explaining a cutting step.

The subsequent cutting step S13 is, as shown in FIG. 44, to cut the ceramic green sheet laminate body GM along intended cutting lines C1, C2. This process provides laminate chips MC of individual multilayer capacitor units shown in FIG. 12. FIG. 44 is a plan view showing the ceramic green sheet laminate body GM in a decomposed state, for explaining the cutting step S13. The intended cutting lines C1 and the intended cutting lines C2 are perpendicular to each other.

When the ceramic green sheet laminate body GM is cut along the intended cutting lines C1, the continuous portions 33, 43 corresponding to the lead portions 14A, 14B are cut in the middle, whereby the portions 33, 43 corresponding to the lead portions 14A, 14B are exposed in respective cut faces.

Similarly, the continuous portions 63, 73 corresponding to the lead portions 14C, 14E are cut in the middle, whereby the portions 63, 73 corresponding to the lead portions 14C, 14E are exposed in respective cut faces. When the ceramic green sheet laminate body GM is cut along the intended cutting lines C2, the continuous portions 65, 75 corresponding to the lead portions 14D, 14F are cut in the middle, whereby the portions 65, 75 corresponding to the lead portions 14D, 14F are exposed in respective cut faces. In each laminate chip MC, therefore, the portions 33, 43, 63, 73, 65, 75 corresponding to the respective lead portions 14A, 14B, 14C, 14E, 14D, 14F are exposed in the side faces thereof.

The subsequent firing step S14 is to heat the laminate chips MC to carry out drying, debindering, and firing. This process provides the element bodies 2 of multilayer capacitors 1.

The subsequent external conductor forming step S15 is to form the external electrodes 3A, 3B and the connection conductors 4A, 4B on the exterior surface of each element body 2. This process finally provides the aforementioned multilayer capacitors 1. The external electrodes 3A, 3B and connection conductors 4A, 43 are formed in the same manner as in the first embodiment.

As described above, the production method of the fifth embodiment involves simply preparing only two types of ceramic green sheets, the ceramic green sheets 20 for capacitance section with the internal electrode patterns 30, 40, and the ceramic green sheets 50 for ESR control section with the internal electrode patterns 60, 70, as the ceramic green sheets with the internal electrode patterns, which simplifies the production steps of multilayer capacitor 1 and reduces the production cost.

In the production method of the fifth embodiment, the portions 33, 43 corresponding to the lead portions 14A, 14B are continuous across the intended cutting line C1, in the internal electrode patterns 30, 40 formed on the ceramic green sheets 20. In the internal electrode patterns 60, 70 formed on the ceramic green sheets 50, the portions 63, 73 corresponding to the lead portions 14C, 14E are also continuous across the intended cutting line C1 and the portions 65, 75 corresponding the lead portions 14D, 14F are continuous across the intended cutting line C2. For this reason, even if there is a deviation on the occasion of laminating the ceramic green sheets 20, 50 or on the occasion of cutting the ceramic green sheet laminate body GM, the portions 33, 43, 63, 73, 65, 75 corresponding to the lead portions 14A, 14B, 14C, 14E, 14D, 14F in the internal electrode patterns 30, 40, 60, 70 will always be exposed in the side faces of cut faces in each laminate chip MC obtained. Therefore, the multilayer capacitors 1 each provided with the element body 2 including the capacitance section 11 and the ESR control section 12 can be produced with a good yield, while suppressing occurrence of defective products in which the internal electrodes 7A, 7B, 7C, 7D fail to be exposed in the side faces 2a, 2b, 2c, 2d of the element body 2.

Sixth Embodiment

A configuration of a multilayer capacitor produced by a production method of multilayer capacitor according to the sixth embodiment is the same as the configuration of the multilayer capacitor in the second embodiment. Therefore, the description about the configuration of the multilayer capacitor in the sixth embodiment is omitted herein.

The below will describe the production method of multilayer capacitor according to the sixth embodiment, with reference to FIGS. 45 to 48. The production method of multilayer capacitor according to the sixth embodiment includes respective steps of the ceramic green sheet preparing step, laminating step, cutting step, firing step, and external conductor forming step as in the fifth embodiment.

Figure 45:
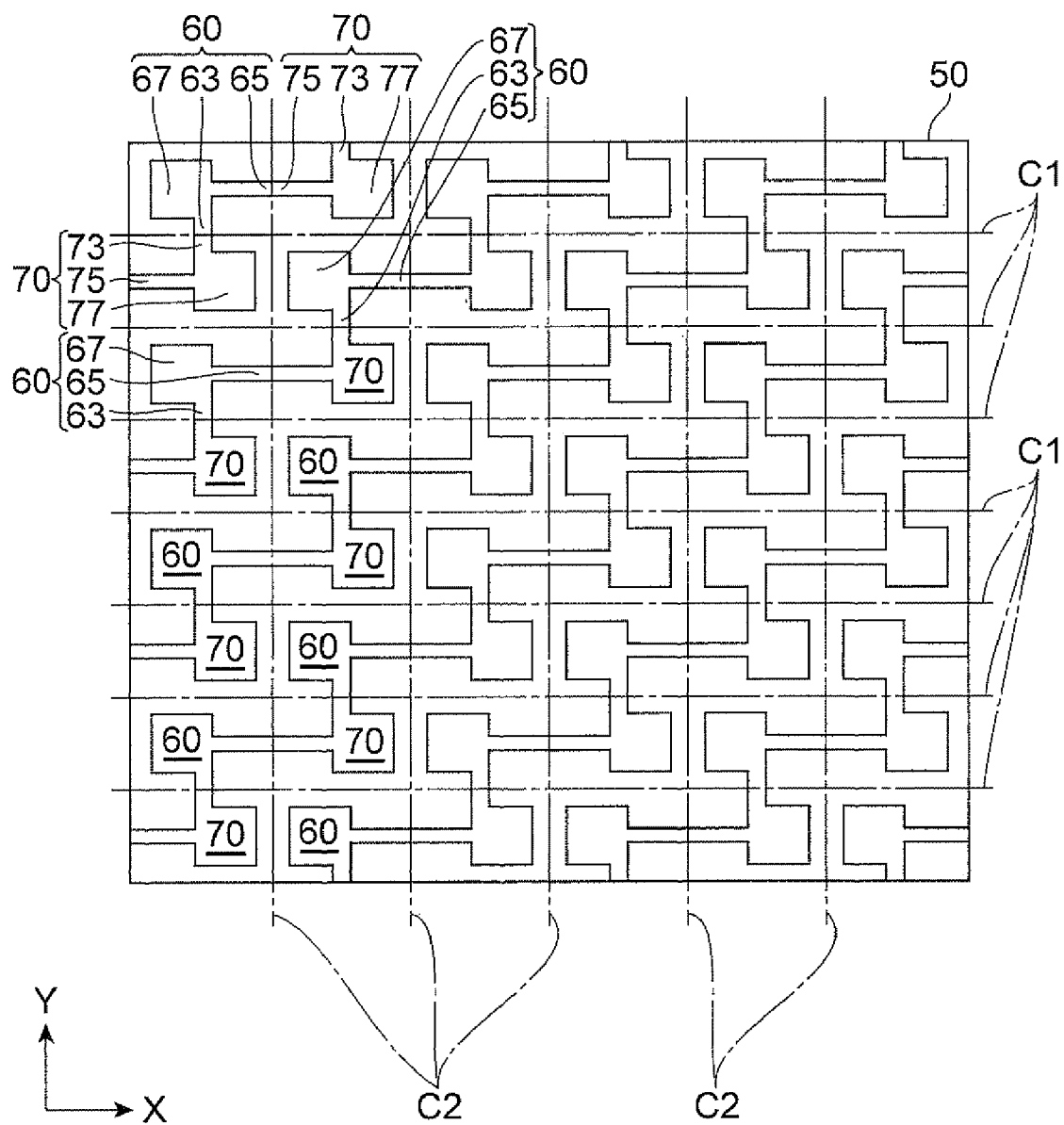
FIG. 45 is a plan view showing a ceramic green sheet in the sixth embodiment.

The ceramic green sheet preparing step includes preparing a plurality of ceramic green sheets 20 shown in FIG. 40. The ceramic green sheet preparing step also includes preparing a plurality of ceramic green sheets 50 shown in FIG. 45. FIG. 45 is a plan view showing a ceramic green sheet.

The ceramic green sheet 50 has internal electrode patterns 60 corresponding to the internal electrodes 7C, and internal electrode patterns 70 corresponding to the internal electrodes 7D, formed thereon. Each internal electrode pattern 60 has a portion 67 corresponding to the main electrode portion 13G, a portion 63 corresponding to the lead portion 14C, and a portion 65 corresponding to the lead portion 14D. Each internal electrode pattern 70 has a portion 77 corresponding to the main electrode portion 13H, a portion 73 corresponding to the lead portion 14E, and a portion 75 corresponding to the lead portion 14F.

The internal electrode patterns 60 and the internal electrode patterns 70 are formed so as to be alternately arranged in a first direction (X-direction in FIG. 45) and in a second direction (Y-direction in FIG. 45). The internal electrode patterns 60 and the internal electrode patterns 70 are formed so that the portion 63 corresponding to the lead portion 14C and the portion 73 corresponding to the lead portion 14E are continuous across an intended cutting line C1, so that the portion 65 corresponding to the lead portion 14D and the portion 75 corresponding to the lead portion 14F are continuous across an intended cutting line C2, and so that the internal electrode patterns 60, 70 are alternately connected in one direction intersecting with the first and second directions. The internal electrode pattern 60 and internal electrode pattern 70 adjacent in the second direction are continuous through their respective portions 63, 73 corresponding to the lead portions 14C, 14E. The internal electrode pattern 60 and internal electrode pattern 70 adjacent in the first direction are continuous through their respective portions 65, 75 corresponding to the lead portions 14D, 14F. The internal electrode patterns 60 and the internal electrode patterns 70 extend in the aforementioned direction intersecting with the first and second directions while being connected in a zigzag shape.

Figure 46:
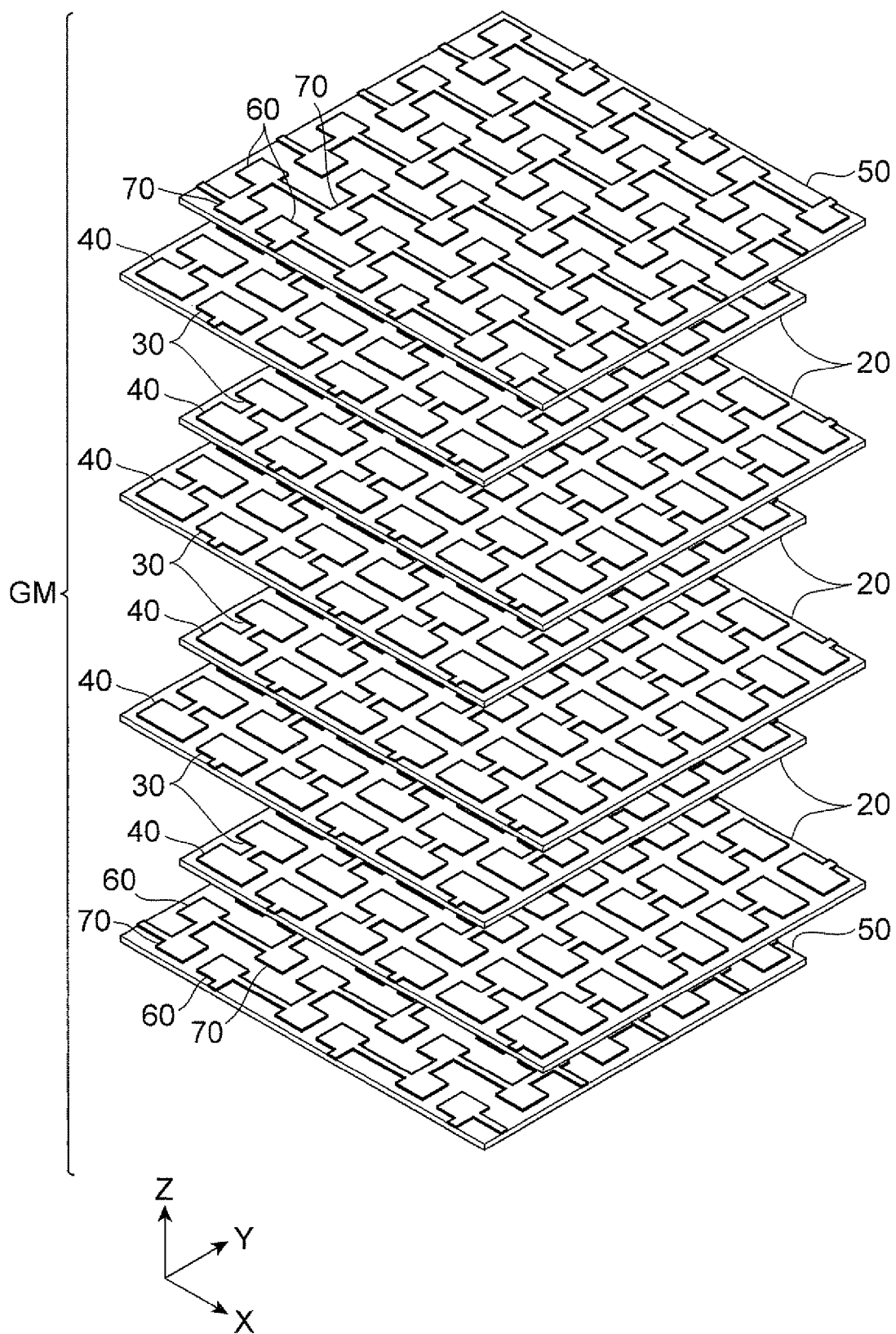
FIG. 46 is a perspective view showing an order of laminating ceramic green sheets in a laminating step.
Figure 47:
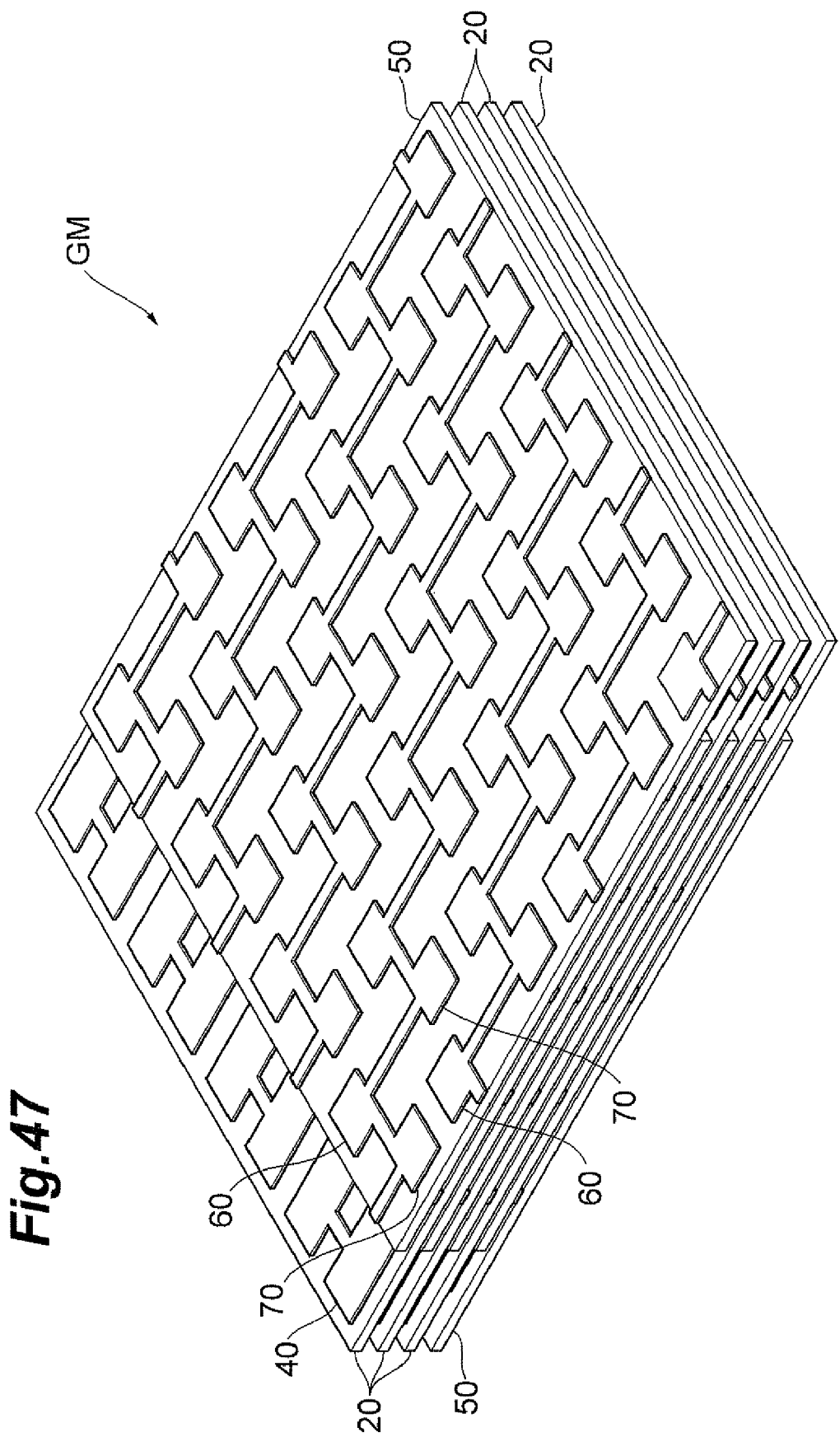
FIG. 47 is a perspective view showing a ceramic green sheet laminate body.

The subsequent laminating step is to laminate a plurality of ceramic green sheets 20, 50, together with ceramic green sheets without any internal electrode patterns (not shown), in a third direction (Z-direction in FIG. 46), as shown in FIG. 46. This process provides a ceramic green sheet laminate body GM shown in FIG. 47. At this time, the ceramic green sheets 20, 50 are laminated in such a manner that the ceramic green sheets 20 deviate from each other and the ceramic green sheets 50 deviate from each other by a length of one internal electrode pattern between two adjacent sheets in the first direction. Furthermore, the ceramic green sheets 20, 50 are laminated so that the positions of the internal electrode patterns 30 coincide with the positions of the internal electrode patterns 40 and so that the positions of the internal electrode patterns 60 coincide with the positions of the internal electrode patterns 70. Namely, the ceramic green sheets 20, 50 are laminated so that the portions 31, 41, 67, 77 corresponding to the main electrode portions 13A, 13B, 13G, 13H in the internal electrode patterns 30, 40, 60, 70 overlap with each other when viewed from the third direction. In this case, the ceramic green sheets 20, 50 may also be laminated in such a manner that the ceramic green sheets 20 deviate from each other and the ceramic green sheets 50 deviate from each other by a length of one internal electrode pattern between two adjacent sheets in the second direction.

Figure 48:
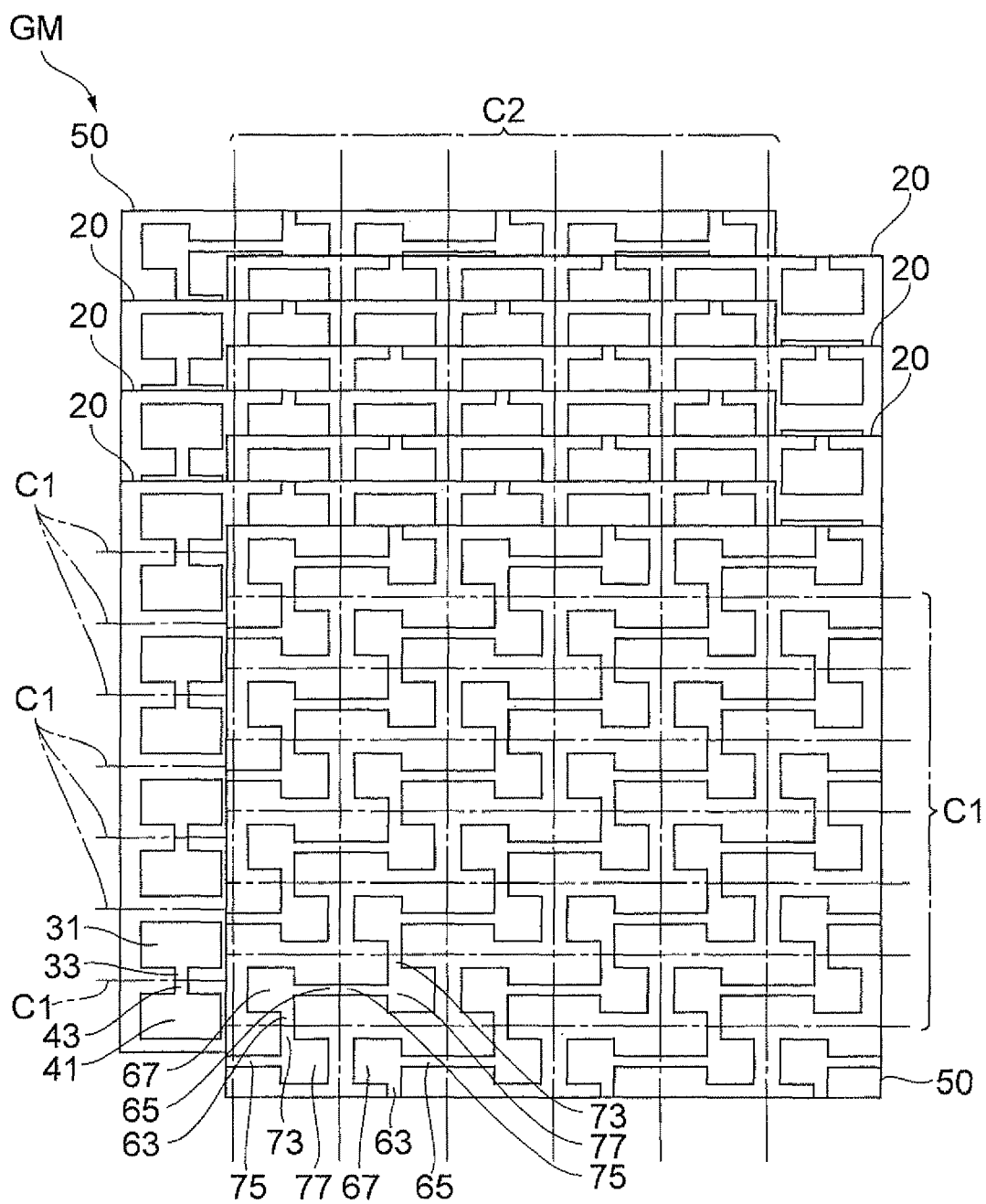
FIG. 48 is a plan view showing the ceramic green sheet laminate body in a decomposed state for explaining a cutting step.

The subsequent cutting step is, as shown in FIG. 48, to cut the ceramic green sheet laminate body GM along intended cutting lines C1, C2. This process provides laminate chips MC of individual multilayer capacitor units shown in FIG. 19. FIG. 48 is a plan view showing the ceramic green sheet laminate body GM in a decomposed state, for explaining the cutting step.

When the ceramic green sheet laminate body GM is cut along the intended cutting lines C1, the portions 33, 43 corresponding to the lead portions 14A, 14B and the portions 63, 73 corresponding to the lead portions 14C, 14E each are exposed in the cut faces. When the ceramic green sheet laminate body GM is cut along the intended cutting lines C2, the portions 65, 75 corresponding to the lead portions 14D, 14F each are exposed in the cut faces. Therefore, the portions 33, 43, 63, 73, 65, 75 corresponding to the respective lead portions 14A, 14B, 14C, 14E, 14D, 14F are exposed in the side faces in each laminate chip MC.

The aforementioned multilayer capacitors are finally obtained through the subsequent firing step and external conductor forming step. The firing step and external conductor forming step are the same as the firing step S14 and external conductor forming step S15 in the aforementioned fifth embodiment, and the description thereof is thus omitted herein.

As described above, the production method of the sixth embodiment also simplifies the production steps of multilayer capacitor 1, reduces the production cost, and permits the multilayer capacitor 1 with the element body 2 including the capacitance section 11 and the ESR control section 12 to be produced with a good yield, as the production method of the fifth embodiment does.

Seventh Embodiment

A configuration of a multilayer capacitor produced by a production method of multilayer capacitor according to the seventh embodiment is the same as the configuration of the multilayer capacitor in the third embodiment. Therefore, the description about the configuration of the multilayer capacitor in the seventh embodiment is omitted herein.

The below will describe the production method of multilayer capacitor according to the seventh embodiment, with reference to FIGS. 49 to 53. The production method of multilayer capacitor according to the seventh embodiment includes respective steps of the ceramic green sheet preparing step, laminating step, cutting step, firing step, and external conductor forming step as in the fifth and sixth embodiments.

Figure 49:
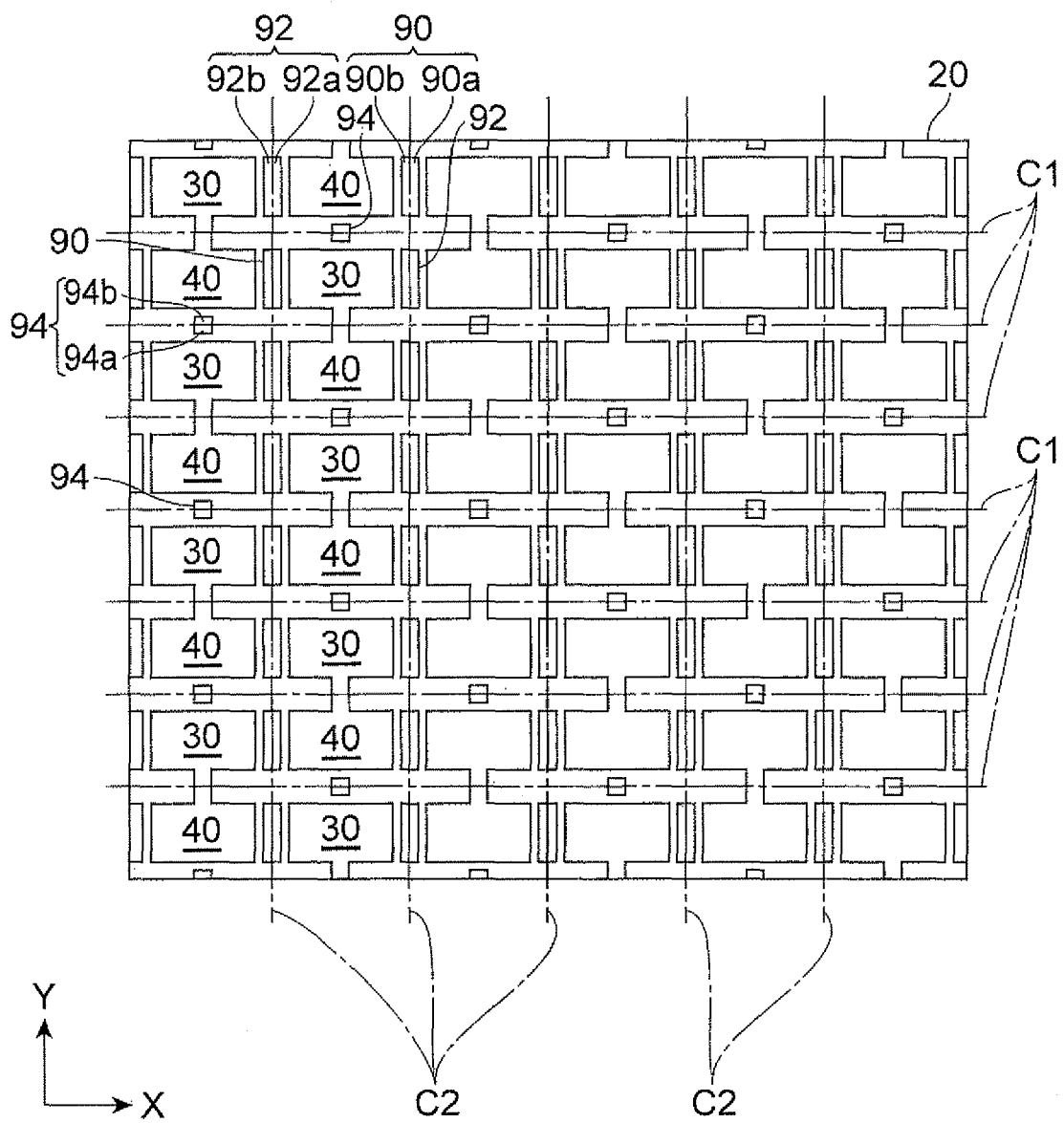
FIG. 49 is a plan view showing a ceramic green sheet in the seventh embodiment.

The ceramic green sheet preparing step includes preparing a plurality of ceramic green sheets 20 shown in FIG. 49. FIG. 49 is a plan view showing a ceramic green sheet.

The ceramic green sheet 20 has dummy electrode patterns 90 corresponding to the dummy electrodes 8A, 9B, dummy electrode patterns 92 corresponding to the dummy electrodes 8B, 9A, and dummy electrode patterns 94 corresponding to the dummy electrodes 10A, 10B, in addition to the internal electrode patterns 30 and internal electrode patterns 40, the electrode patterns being formed on the green sheet 20. Each dummy electrode pattern 90 includes a portion 90a corresponding to the dummy electrode 8A and a portion 90b corresponding to the dummy electrode 9B. Each dummy electrode pattern 92 includes a portion 92a corresponding to the dummy electrode 8B and a portion 92b corresponding to the dummy electrode 9A. Each dummy electrode pattern 94 includes a portion 94a corresponding to the dummy electrode 10A and a portion 94b corresponding to the dummy electrode 10B.

The dummy electrode patterns 90 and the dummy electrode patterns 92 are formed so as to be alternately located between internal electrode pattern 30 and internal electrode pattern 40 in a first direction (X-direction in FIG. 49). The dummy electrode patterns 90 are also formed so that the portion 90a corresponding to the dummy electrode 8A and the portion 90b corresponding to the dummy electrode 9B are continuous across an intended cutting line C2. The dummy electrode patterns 92 are also formed so that the portion 92a corresponding to the dummy electrode 8B and the portion 92b corresponding to the dummy electrode 9A are continuous across an intended cutting line C2. The dummy electrode patterns 90 are arranged in juxtaposition along a direction in which the intended cutting line C2 extends. The dummy electrode patterns 92 are arranged in juxtaposition along a direction in which the intended cutting line C2 extends.

The dummy electrode patterns 94 are formed so as to be located between internal electrode pattern 30 and internal electrode pattern 40 in a second direction (Y-direction in FIG. 49). The dummy electrode patterns 94 are also formed so that the portion 94a corresponding to the dummy electrode 10A and the portion 94b corresponding to the dummy electrode 10B are continuous across an intended cutting line C1.

Figure 50:
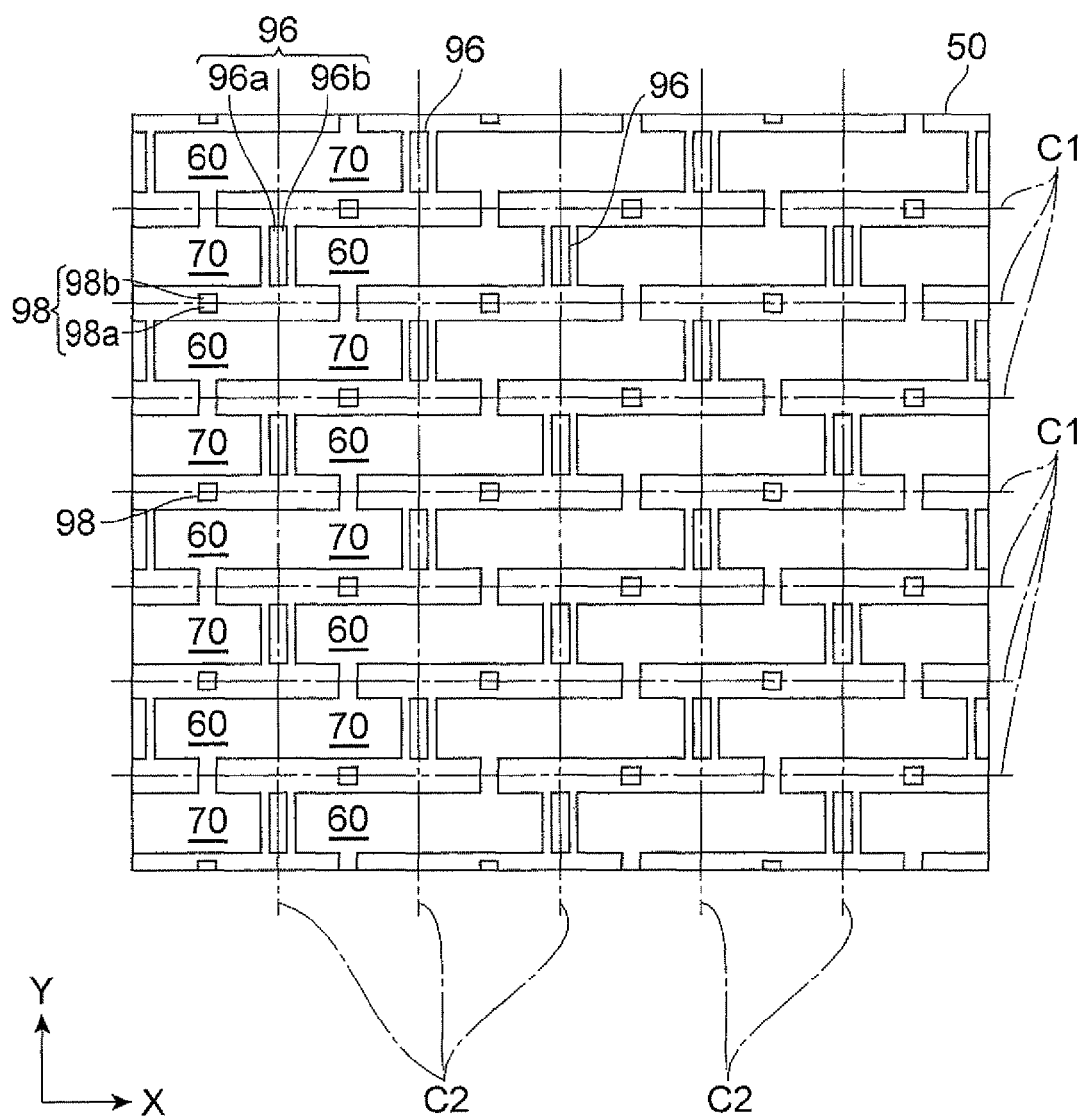
FIG. 50 is a plan view showing a ceramic green sheet.

The ceramic green sheet preparing step also includes preparing a plurality of ceramic green sheets 50 shown in FIG. 50. FIG. 50 is a plan view showing a ceramic green sheet.

The ceramic green sheet 50 has dummy electrode patterns 96 corresponding to the dummy electrodes 8D, 9C and dummy electrode patterns 98 corresponding to the dummy electrodes 10C, 10D, in addition to the internal electrode patterns 60 and internal electrode patterns 70, the electrode patterns being formed on the green sheet 50. Each dummy electrode pattern 96 includes a portion 96a corresponding to the dummy electrode 8D and a portion 96b corresponding to the dummy electrode 9C. Each dummy electrode pattern 98 includes a portion 98a corresponding to the dummy electrode 10C and a portion 98b corresponding to the dummy electrode 10D.

The dummy electrode patterns 96 are formed so as to be alternately located between internal electrode pattern 60 and internal electrode pattern 70 in a first direction (X-direction in FIG. 50). The dummy electrode patterns 96 are also formed so that the portion 96a corresponding to the dummy electrode 8D and the portion 96b corresponding to the dummy electrode 9C are continuous across an intended cutting line C2. The dummy electrode patterns 96 are arranged in juxtaposition along a direction in which the intended cutting line C2 extends.

The dummy electrode patterns 98 are formed so as to be located between internal electrode pattern 60 and internal electrode pattern 70 in a second direction (Y-direction in FIG. 50). The dummy electrode patterns 98 are also formed so that the portion 98a corresponding to the dummy electrode 10C and the portion 98b corresponding to the dummy electrode 10D are continuous across an intended cutting line C1.

Figure 51:
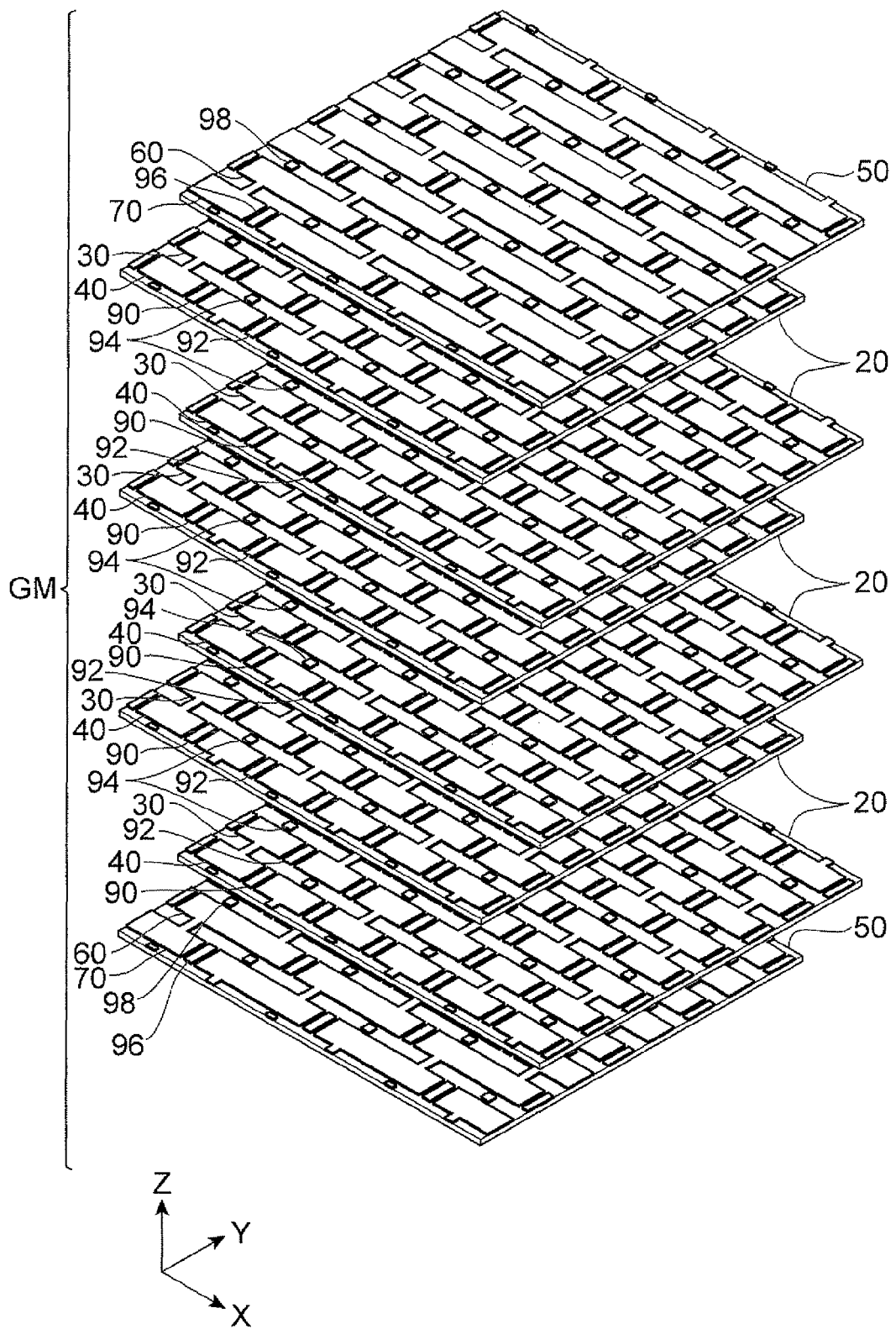
FIG. 51 is a perspective view showing an order of laminating ceramic green sheets in a laminating step.
Figure 52:
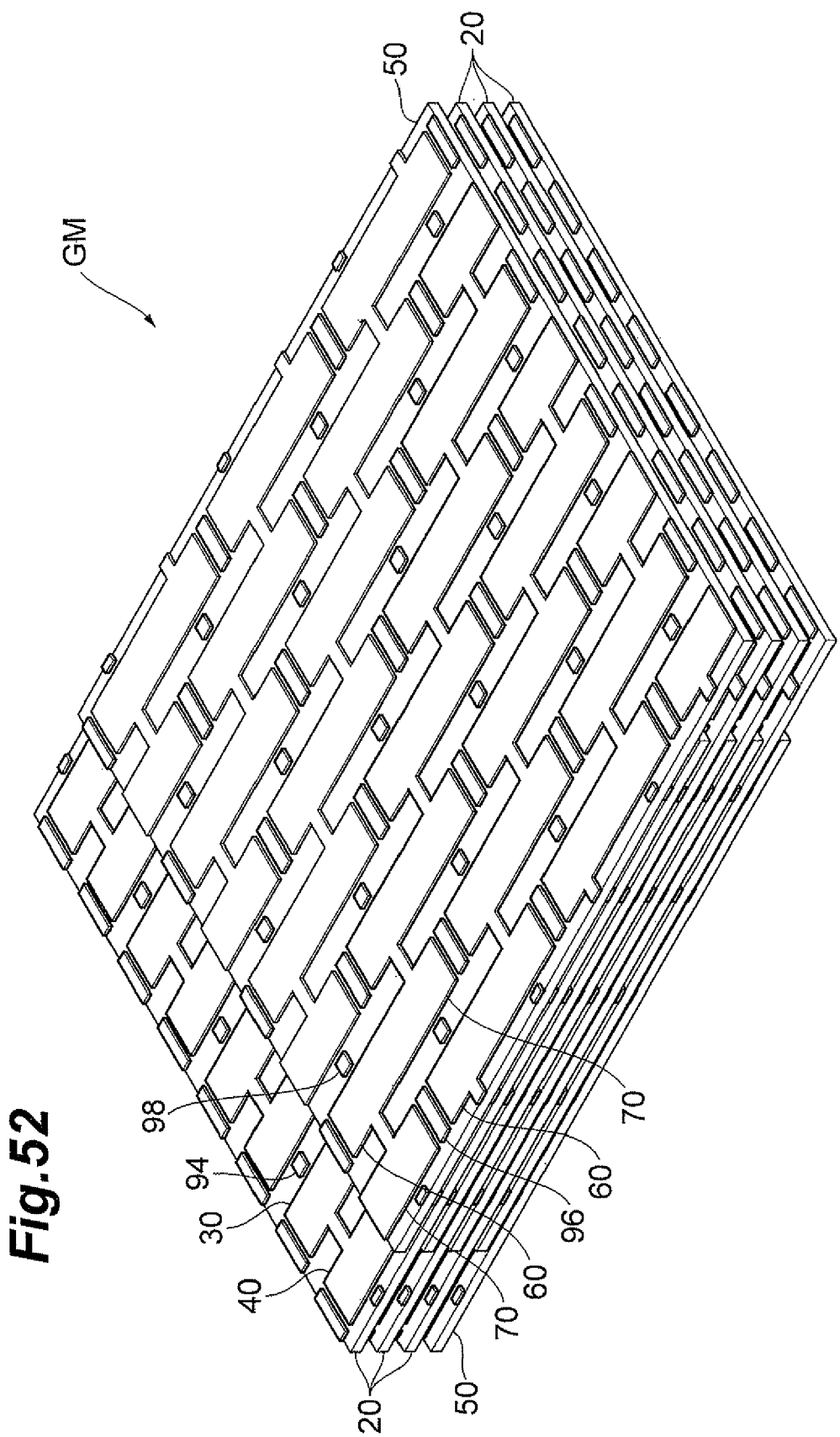
FIG. 52 is a perspective view showing a ceramic green sheet laminate body.

The subsequent laminating step is, as shown in FIG. 51, to laminate a plurality of ceramic green sheets 20, 50, together with ceramic green sheets without any internal electrode patterns (not shown), in a third direction (Z-direction in FIG. 51). This process provides a ceramic green sheet laminate body GM shown in FIG. 52.

Figure 53:
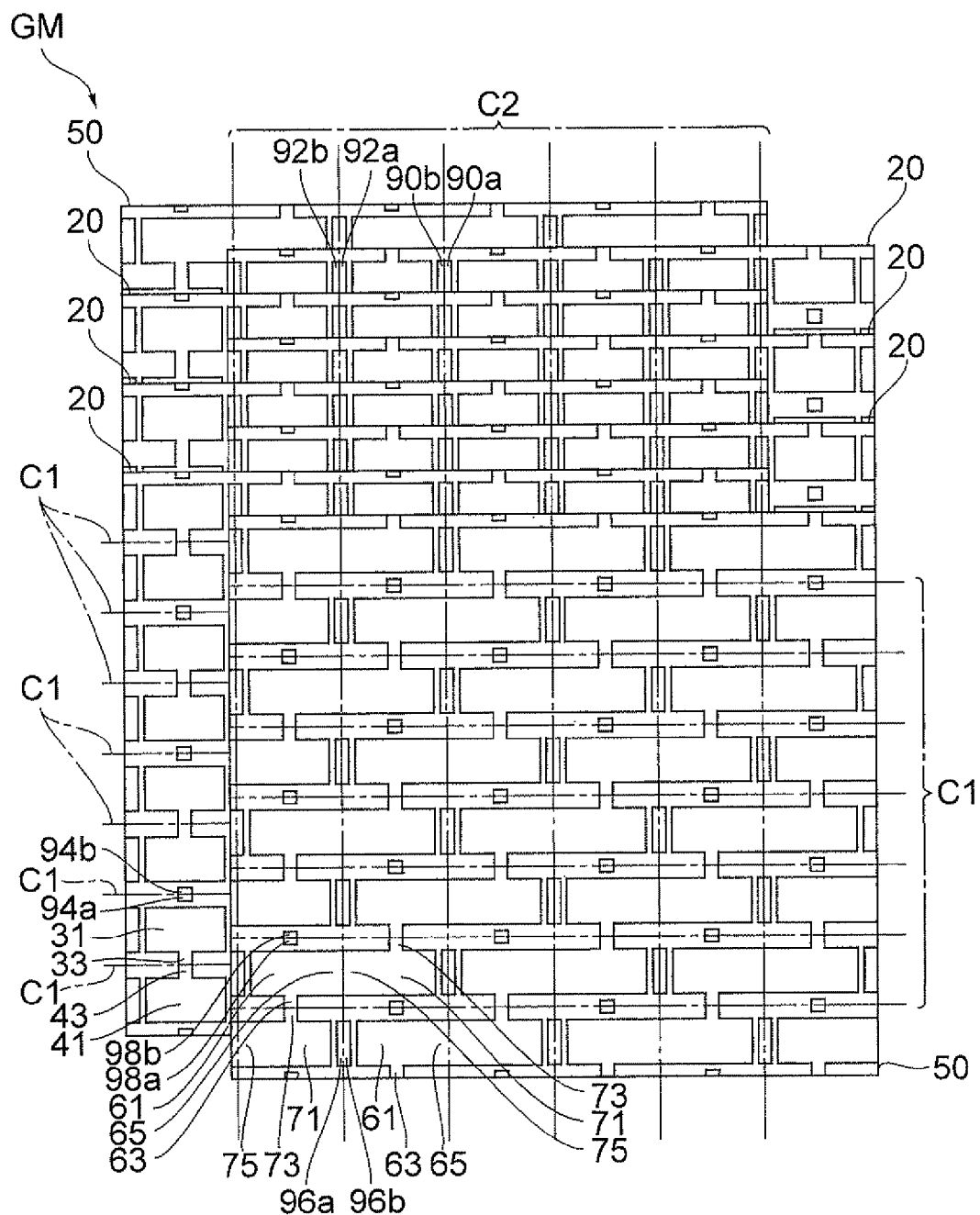
FIG. 53 is a plan view showing the ceramic green sheet laminate body in a decomposed state for explaining a cutting step.

The subsequent cutting step is, as shown in FIG. 53, to cut the ceramic green sheet laminate body GM along intended cutting lines C1, C2. This process provides laminate chips MC of individual multilayer capacitor units shown in FIG. 28.

FIG. 53 is a plan view showing the ceramic green sheet laminate body GM in a decomposed state, for explaining the cutting step.

When the ceramic green sheet laminate body GM is cut along the intended cutting lines C1, the portions 33, 43 corresponding to the lead portions 14A, 14B, the portions 63, 73 corresponding to the lead portions 14C, 14E, and the portions 94a, 94b, 98a, 98b corresponding to the dummy electrodes 10A, 10B, 10C, 10D each are exposed in the cut faces. When the ceramic green sheet laminate body GM is cut along the intended cutting lines C2, the portions 65, 75 corresponding to the lead portions 14D, 14F, the portions 90a, 92a, 96a corresponding to the dummy electrodes 8A, 8B, 8D, and the portions 92b, 90b, 96b corresponding to the dummy electrodes 9A, 9B, 9C each are exposed in the cut faces. In each laminate chip MC, therefore, the portions 33, 43, 63, 73, 65, 75, 90a, 92a, 96a, 92b, 90b, 96b, 94a, 94b, 98a, 98b corresponding to the respective lead portions 14A, 14B, 14C, 14E, 14D, 14F and dummy electrodes 8A, 8B, 8D, 9A, 9B, 9C, 10A, 10B, 10C, 10D are exposed in the side faces thereof.

The aforementioned multilayer capacitors are finally obtained through the subsequent firing step and external conductor forming step. The firing step and external conductor forming step are the same as the firing step S14 and external conductor forming step S15 in the aforementioned fifth embodiment and the description thereof is thus omitted herein.

As described above, the production method of the seventh embodiment simplifies the production steps of multilayer capacitor 1, reduces the production cost, and permits the multilayer capacitor 1 with the element body 2 including the capacitance section 11 and ESR control section 12 to be produced with a good yield, as the production methods of the fifth and sixth embodiments do.

In the production method of the seventh embodiment, the portion 90a corresponding to the dummy electrode 8A and the portion 90b corresponding to the dummy electrode 9B are continuous across the intended cutting line C2, in each dummy electrode pattern 90 formed on the ceramic green sheet 20. In each dummy electrode pattern 92, the portion 92a corresponding to the dummy electrode 8B and the portion 92b corresponding to the dummy electrode 9A are continuous across the intended cutting line C2. In each dummy electrode pattern 94, the portion 94a corresponding to the dummy electrode 10A and the portion 94b corresponding to the dummy electrode 10B are continuous across the intended cutting line C1. In each dummy electrode pattern 96 formed on the ceramic green sheet 50, the portion 96a corresponding to the dummy electrode 8D and the portion 96b corresponding to the dummy electrode 9C are also continuous across the intended cutting line C2. In each dummy electrode pattern 98, the portion 98a corresponding to the dummy electrode 10C and the portion 98b corresponding to the dummy electrode 10D are also continuous across the intended cutting line C1. In each laminate chip MC, therefore, the dummy electrode patterns 90-98 (90a, 92a, 96a, 92b, 90b, 96b, 94a, 94b, 98a, 98b) are always exposed in the side faces of cut faces, whereby the element body 2 can be obtained in the structure wherein the dummy electrodes 8A, 8B, 8D, 9A, 9B, 9C, 10A, 10B, 10C, 10D are also exposed in the side faces 2a-2d. The dummy electrodes 8A, 8B, 8D, 9A, 9B, 9C, 10A, 10B, 10C, 10D are provided for increasing contact areas with the external electrodes 3A, 3B and connection conductors 4A, 4B on the occasion of forming the external electrodes 3A, 3B and connection conductors 4A, 4B on the element body 2 and thereby increasing the connection strength between the element body 2 and the external electrodes 3A, 3B and connection conductors 4A, 4B. When the dummy electrode patterns 90-98 are formed on the ceramic green sheets 20, 50, the dummy electrode patterns 90-98 function as level difference absorbing layers to restrain occurrence of a level difference due to the thickness of the internal electrode patterns 30, 40, 60, 70, thereby preventing each laminate chip MC (element body 2) from being deformed.

Eighth Embodiment

A configuration of a multilayer capacitor produced by a production method of multilayer capacitor according to the eighth embodiment is the same as the configuration of the multilayer capacitor in the fourth embodiment. Therefore, the description about the configuration of the multilayer capacitor in the eighth embodiment is omitted herein.

The below will describe the production method of multilayer capacitor according to the eighth embodiment, with reference to FIGS. 54 to 57. The production method of multilayer capacitor according to the eighth embodiment includes respective steps of the ceramic green sheet preparing step, laminating step, cutting step, firing step, and external conductor forming step as in the fifth to seventh embodiments.

Figure 54:
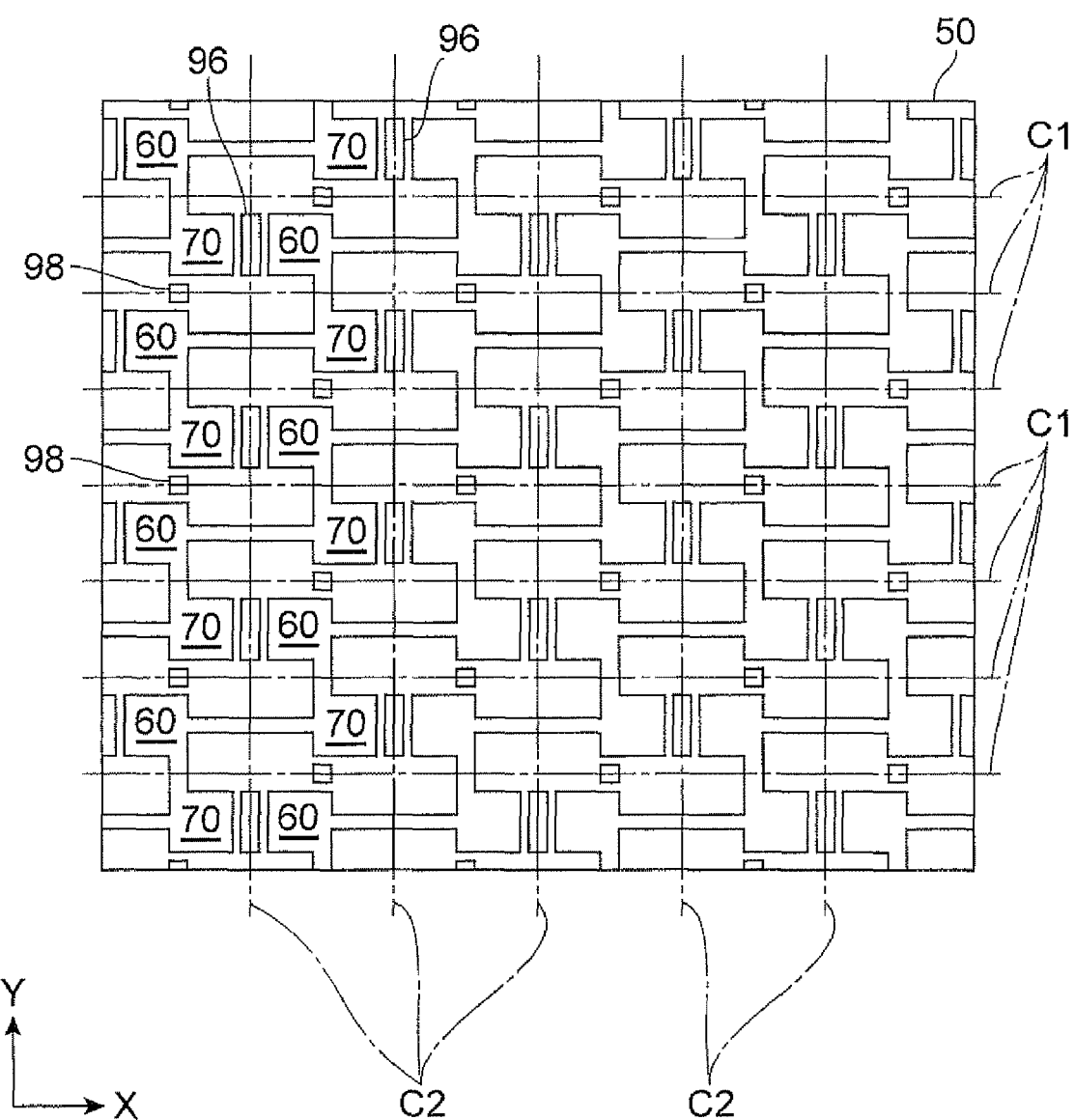
FIG. 54 is a plan view showing a ceramic green sheet in the eighth embodiment.

The ceramic green sheet preparing step includes preparing a plurality of ceramic green sheets 20 shown in FIG. 49. Each ceramic green sheet 20 has internal electrode patterns 30, internal electrode patterns 40, dummy electrode patterns 90, dummy electrode patterns 92, and dummy electrode patterns 94 formed thereon. The ceramic green sheet preparing step also includes preparing a plurality of ceramic green sheets 50 shown in FIG. 54. Each ceramic green sheet 50 has internal electrode patterns 60, internal electrode patterns 70, dummy electrode patterns 96, and dummy electrode patterns 98 formed thereon. FIG. 54 is a plan view showing a ceramic green sheet.

Figure 55:
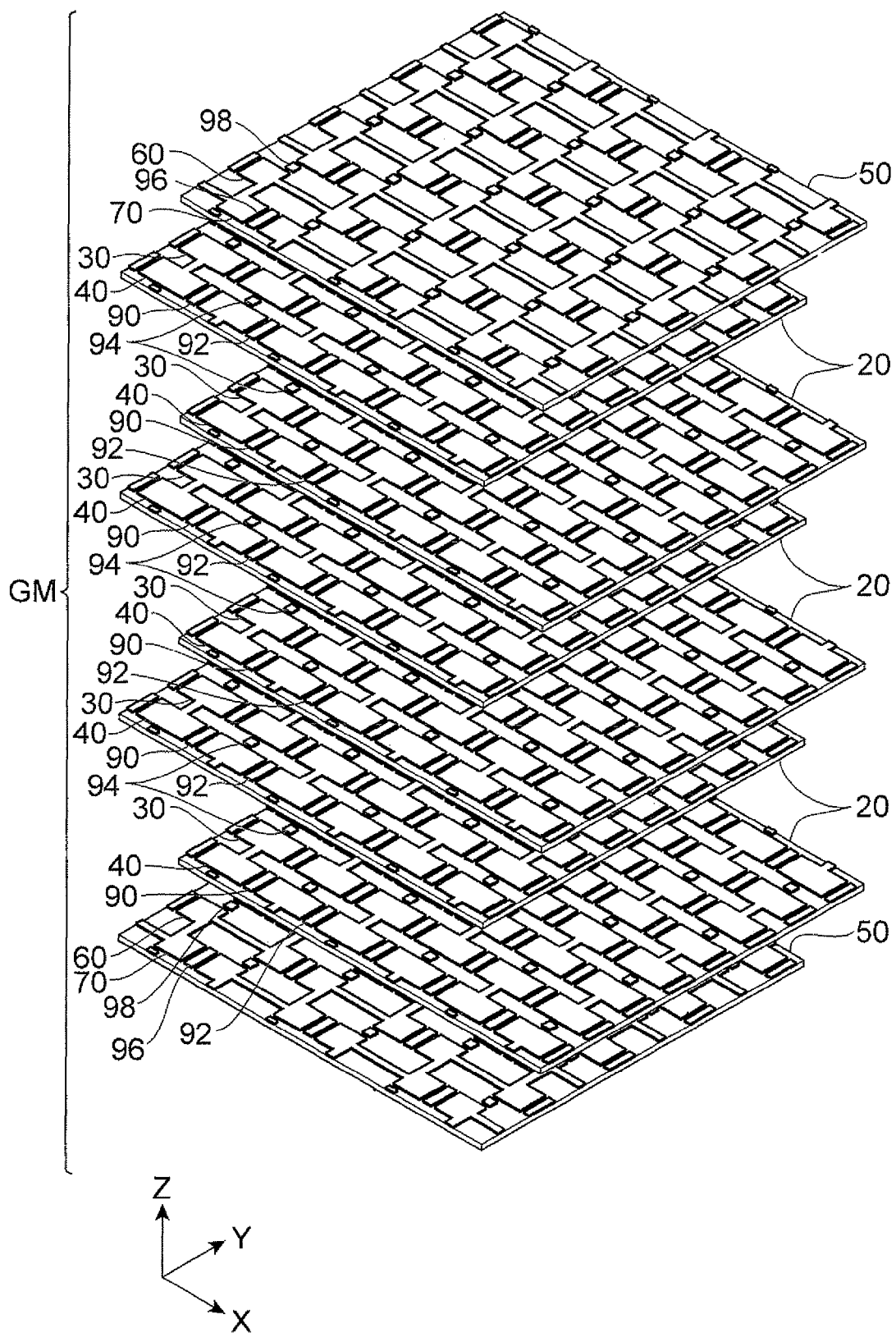
FIG. 55 is a perspective view showing an order of laminating ceramic green sheets in a laminating step.
Figure 56:
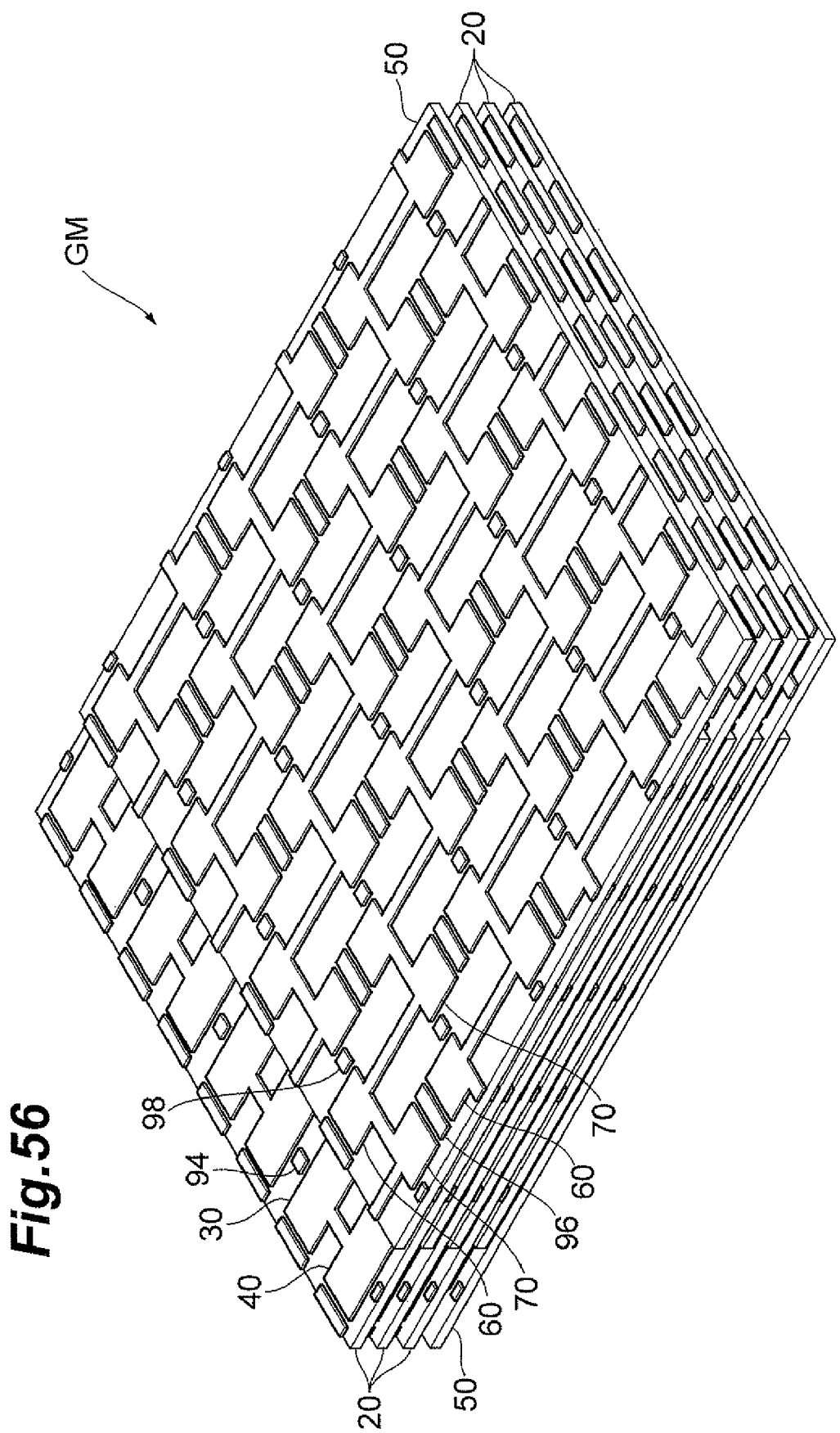
FIG. 56 is a perspective view showing a ceramic green sheet laminate body.

The subsequent laminating step is, as shown in FIG. 55, to laminate a plurality of ceramic green sheets 20, 50, together with ceramic green sheets without any internal electrode patterns (not shown), in a third direction (Z-direction in FIG. 55). This process provides a ceramic green sheet laminate body GM shown in FIG. 56.

Figure 57:
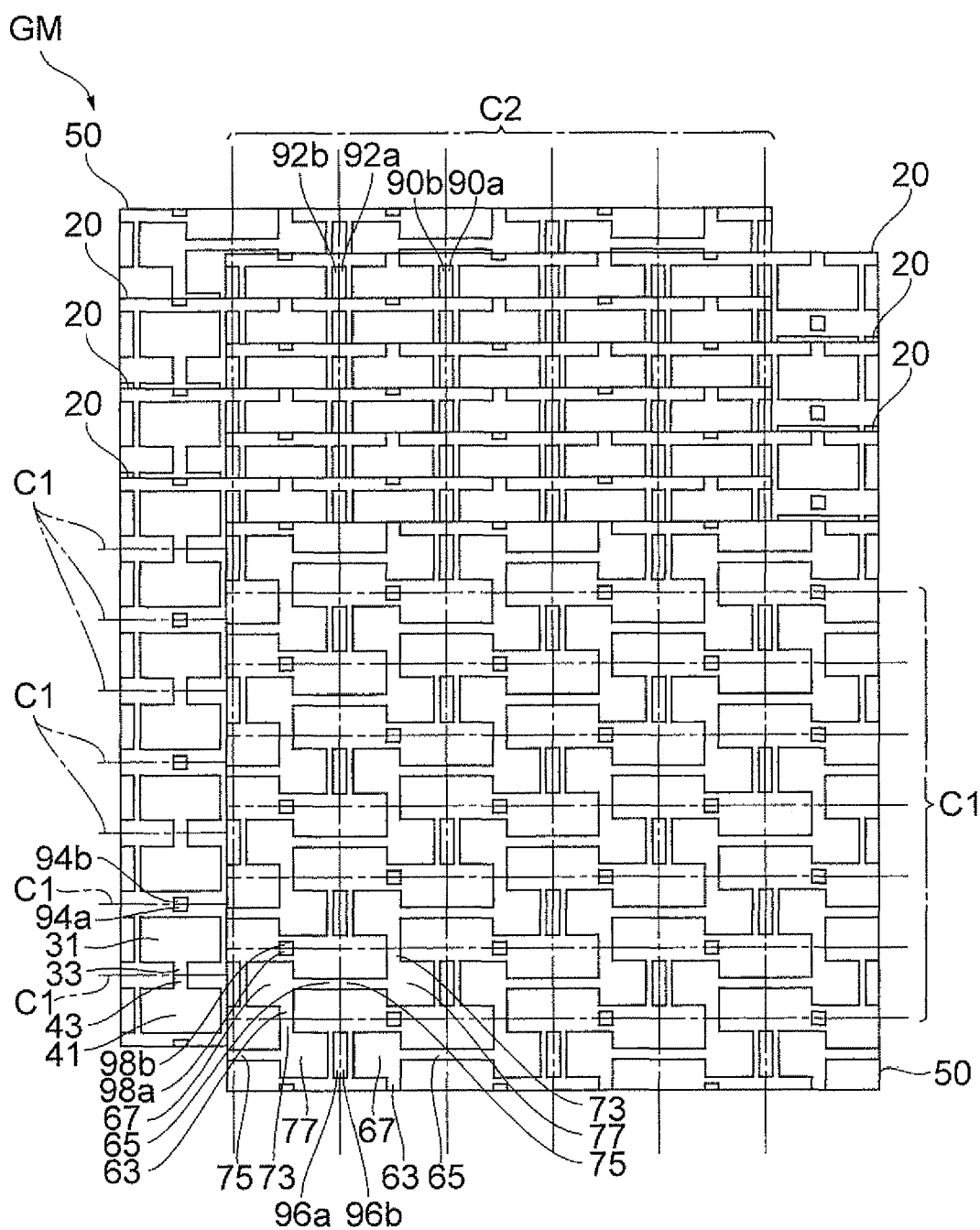
FIG. 57 is a plan view showing the ceramic green sheet laminate body in a decomposed state for explaining a cutting step.

The subsequent cutting step is, as shown in FIG. 57, to cut the ceramic green sheet laminate body GM along intended cutting lines C1, C2. This process provides laminate chips MC of individual multilayer capacitor units shown in FIG. 35. FIG. 57 is a plan view showing the ceramic green sheet laminate body GM in a decomposed state, for explaining the cutting step.

The aforementioned multilayer capacitors are finally obtained through the subsequent firing step and external conductor forming step. The firing step and external conductor forming step are the same as the firing step S14 and external conductor forming step S15 in the aforementioned fifth embodiment and the description thereof is thus omitted herein.

As described above, the production method of the eighth embodiment simplifies the production steps of multilayer capacitor 1, reduces the production cost, and permits the multilayer capacitor 1 with the element body 2 including the capacitance section 11 and ESR control section 12 to be produced with a good yield, as the production methods of the fifth to seventh embodiments do.

The dummy electrode patterns 90, 92 may be continuously formed in the extending direction of the intended cutting lines C2, as shown in FIG. 36.

Ninth Embodiment

A configuration of a multilayer capacitor produced by a production method of multilayer capacitor according to the ninth embodiment is the same as the configuration of the multilayer capacitor 1 in the first embodiment. The description about the configuration of the multilayer capacitor in the ninth embodiment is omitted herein accordingly.

Figure 58:
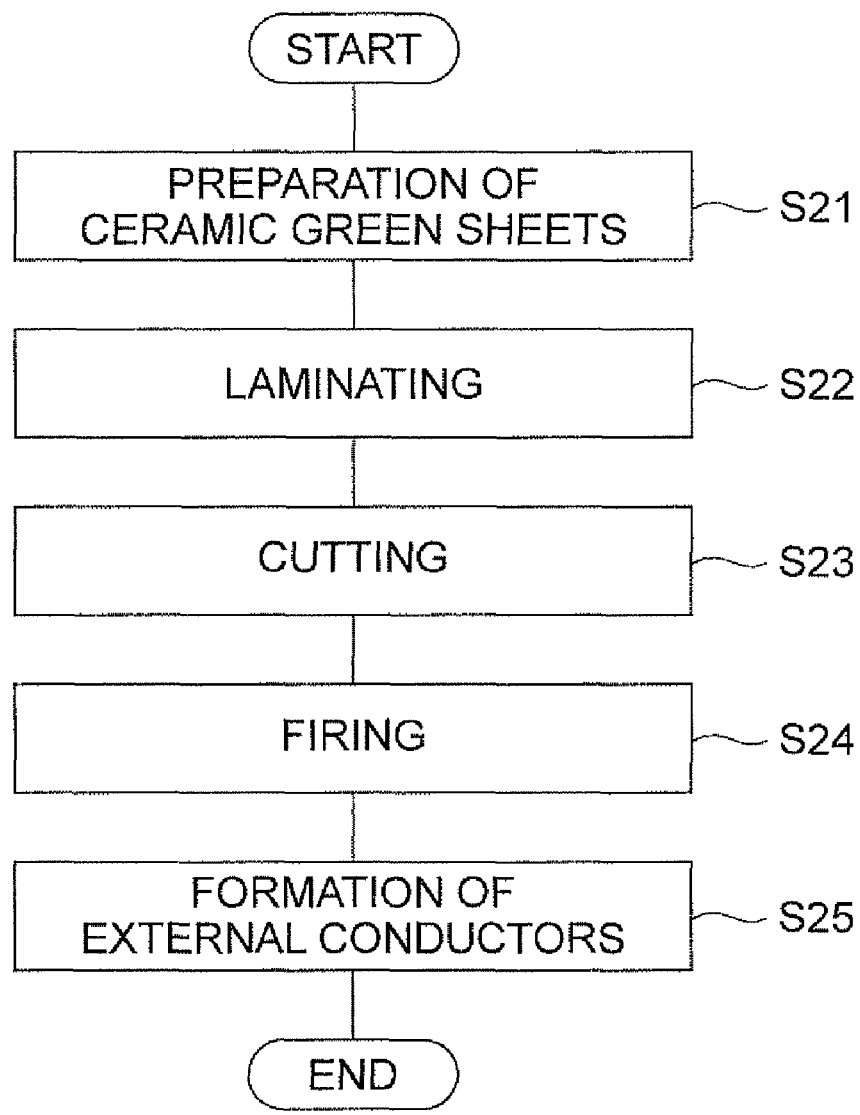
FIG. 58 is a flowchart showing a procedure of a production method of multilayer capacitor according to the ninth embodiment.

The below will describe the production method of multilayer capacitor according to the ninth embodiment, with reference to FIGS. 58 to 63. FIG. 58 shows a procedure of the production method of multilayer capacitor according to the ninth embodiment. The production method of multilayer capacitor according to the ninth embodiment, as shown in FIG. 58, includes respective steps of ceramic green sheet preparing step S21, laminating step S22, cutting step S23, firing step S24, and external conductor forming step S25.

Figure 59:
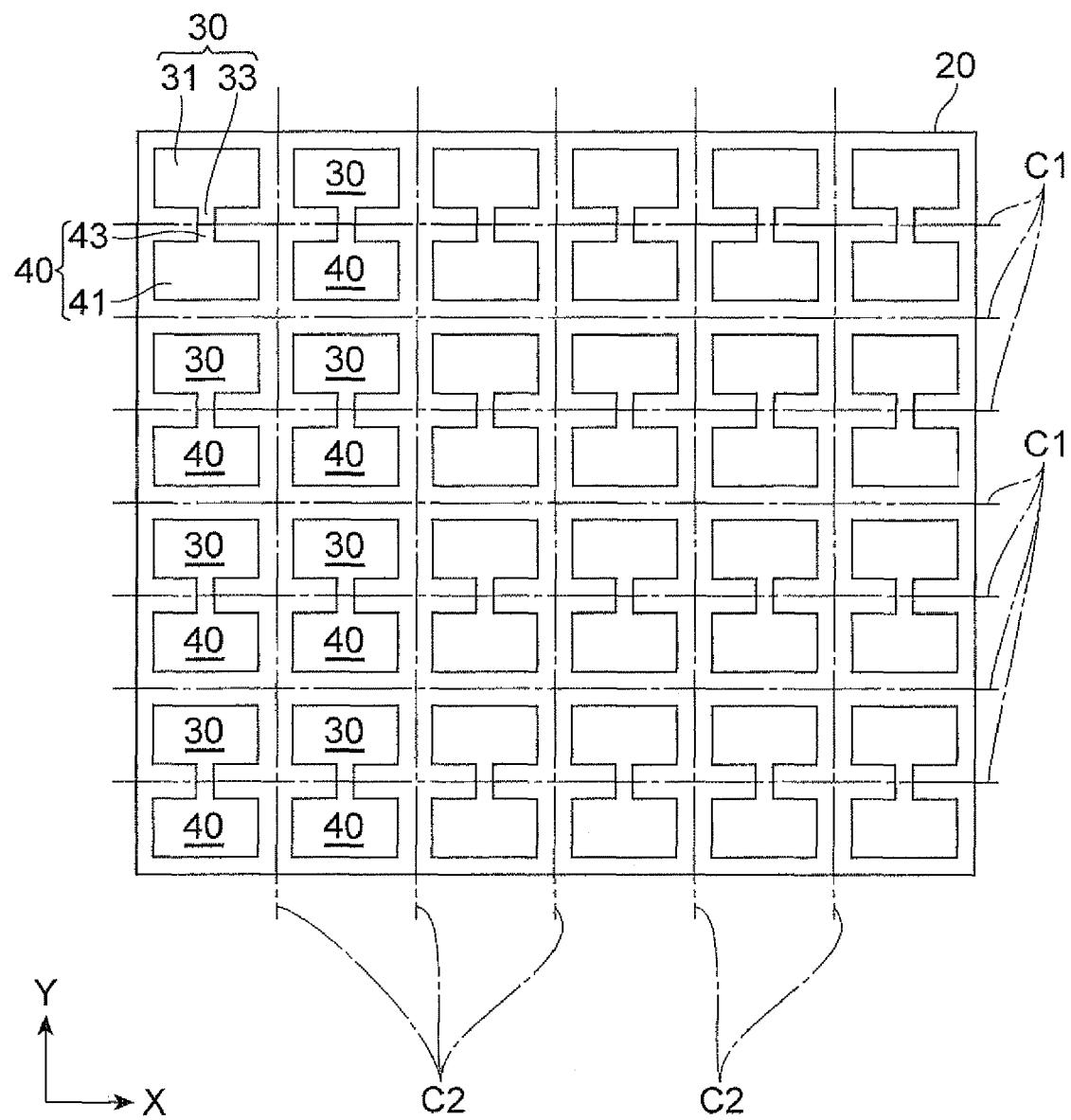
FIG. 59 is a plan view showing a ceramic green sheet.

The ceramic green sheet preparing step S21 includes preparing a plurality of ceramic green sheets 20 shown in FIG. 59. FIG. 59 is a plan view showing a ceramic green sheet.

The ceramic green sheet 20 is of a rectangular shape and a plurality of internal electrode patterns are formed on the top surface thereof. The plurality of internal electrode patterns consist of internal electrode patterns 30 corresponding to the internal electrodes 7A and internal electrode patterns 40 corresponding to the internal electrodes 7B. Each internal electrode pattern 30 has a portion 31 corresponding to the main electrode portion 13A, and a portion 33 corresponding to the lead portion 14A. Each internal electrode pattern 40 has a portion 41 corresponding to the main electrode portion 13B, and a portion 43 corresponding to the lead portion 14B.

The internal electrode patterns 30 and internal electrode patterns 40 are formed so that they are arranged each in juxtaposition in a first direction (X-direction in FIG. 59) and alternately arranged in a second direction (Y-direction in FIG. 59) and so that the portion 33 corresponding to the lead portion 14A and the portion 43 corresponding to the lead portion 14B are continuous across an intended cutting line C1. Namely, the internal electrode patterns 30 are aligned in rows in the first direction, the internal electrode patterns 40 are also aligned in rows in the first direction, and the rows of internal electrode pattern 30 and the rows of internal electrode pattern 40 are alternately arranged in the second direction. The internal electrode pattern 30 and the internal electrode pattern 40 adjacent in the second direction are continuous through their respective portions 33, 43 corresponding to the lead portions 14A, 14B. The first direction is a direction parallel to one side of the ceramic green sheet 20 and the second direction a direction parallel to one side of the ceramic green sheet 20 and perpendicular to the first direction.

Figure 60:
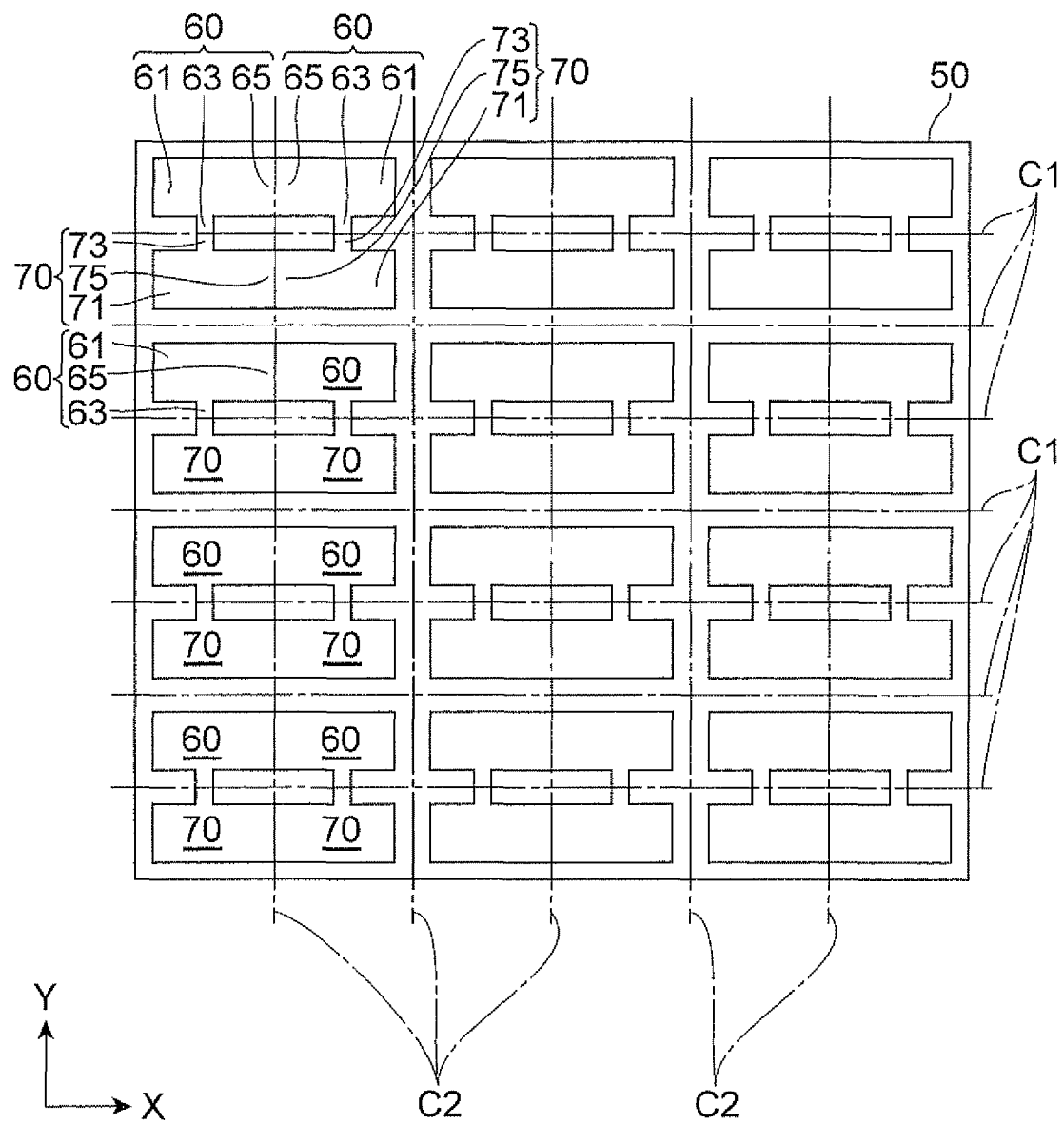
FIG. 60 is a plan view showing a ceramic green sheet.

The ceramic green sheet preparing step S21 also includes preparing a plurality of ceramic green sheets 50 shown in FIG. 60. FIG. 60 is a plan view showing a ceramic green sheet.

The ceramic green sheet 50 is of a rectangular shape and a plurality of internal electrode patterns are formed on a top surface thereof. The plurality of internal electrode patterns consist of internal electrode patterns 60 corresponding to the internal electrodes 7C, and internal electrode patterns 70 corresponding to the internal electrodes 7D. Each internal electrode pattern 60 has a portion 61 corresponding to the main electrode portion 13C, a portion 63 corresponding to the lead portion 14C, and a portion 65 corresponding to the lead portion 14D. Each internal electrode pattern 70 has a portion 71 corresponding to the main electrode portion 13D, a portion 73 corresponding to the lead portion 14E, and a portion 75 corresponding to the lead portion 14F.

The internal electrode patterns 60 and internal electrode patterns 70 are formed so that they are arranged each in juxtaposition in a first direction (X-direction in FIG. 60) and alternately arranged in a second direction (Y-direction in FIG. 60). The internal electrode patterns 60 and the internal electrode patterns 70 are formed so that the portion 63 corresponding to the lead portion 14C and the portion 73 corresponding to the lead portion 14E are continuous across an intended cutting line C1, so that each pair of the portions 65 corresponding to the lead portion 14D and each pair of the portions 75 corresponding to the lead portion 14F are also continuous across an intended cutting line C2, and so that, concerning four mutually adjacent internal electrode patterns 60, 70, these four internal electrode patterns 60, 70 are connected in a circuiting shape. The internal electrode pattern 60 and internal electrode pattern 70 adjacent in the second direction are continuous through their respective portions 63, 73 corresponding to the lead portions 14C, 14E. Each pair of internal electrode patterns 60 and each pair of internal electrode patterns 70 adjacent in the first direction are continuous through their respective portions 65 or 75 corresponding to the lead portion 14D or 14F. The first direction is a direction parallel to one side of the ceramic green sheet 50 and the second direction a direction parallel to one side of the ceramic green sheet 50 and perpendicular to the first direction. The internal electrode patterns 60 and internal electrode patterns 70 may be formed so that they are arranged each in juxtaposition in the second direction and alternately arranged in the first direction.

The ceramic green sheets 20, 50 are obtained in the same manner as in the first embodiment. The internal electrode patterns 30, 40, 60, 70 are also formed in the same manner as in the first embodiment.

Figure 61:
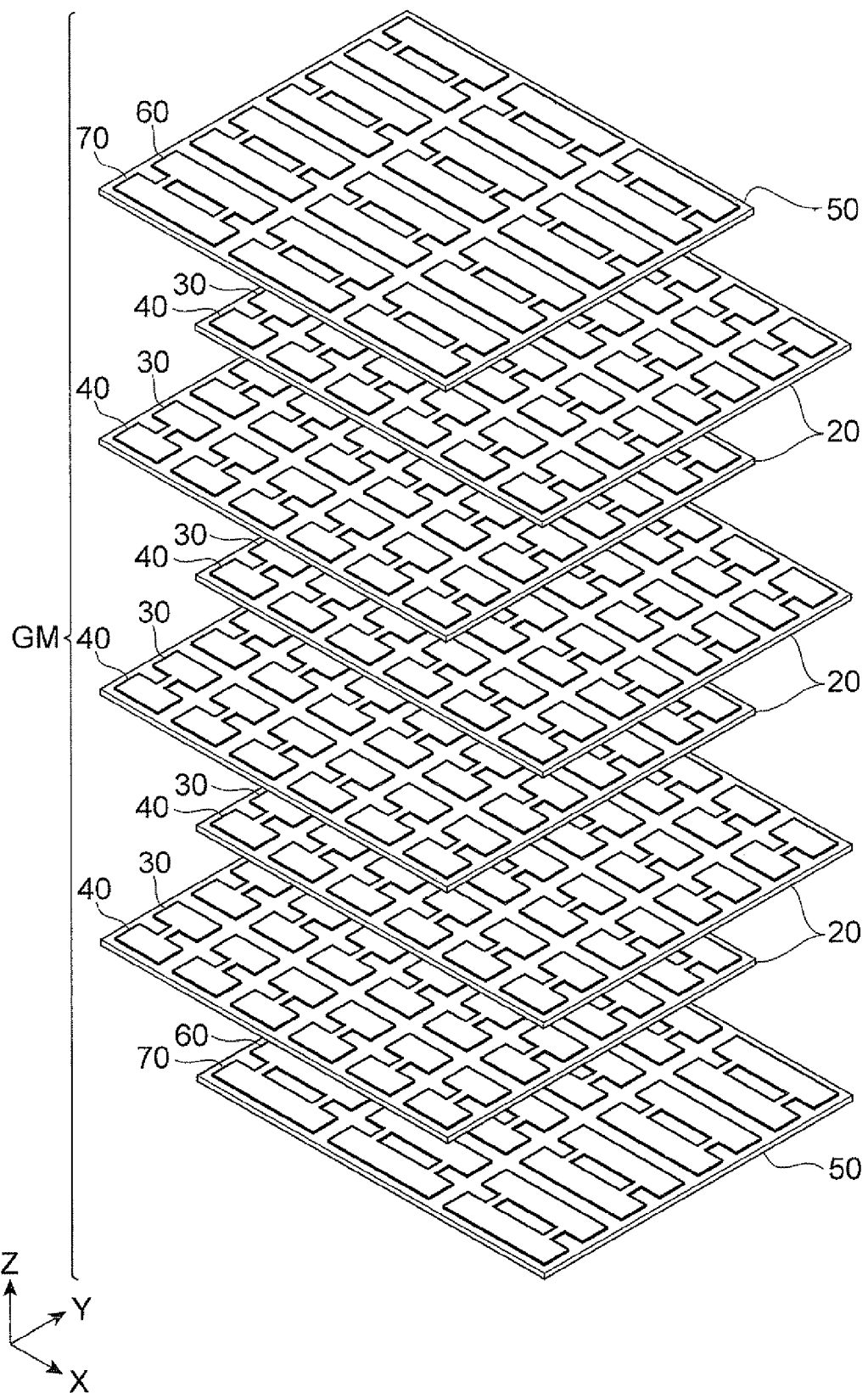
FIG. 61 is a perspective view showing an order of laminating ceramic green sheets in a laminating step.
Figure 62:
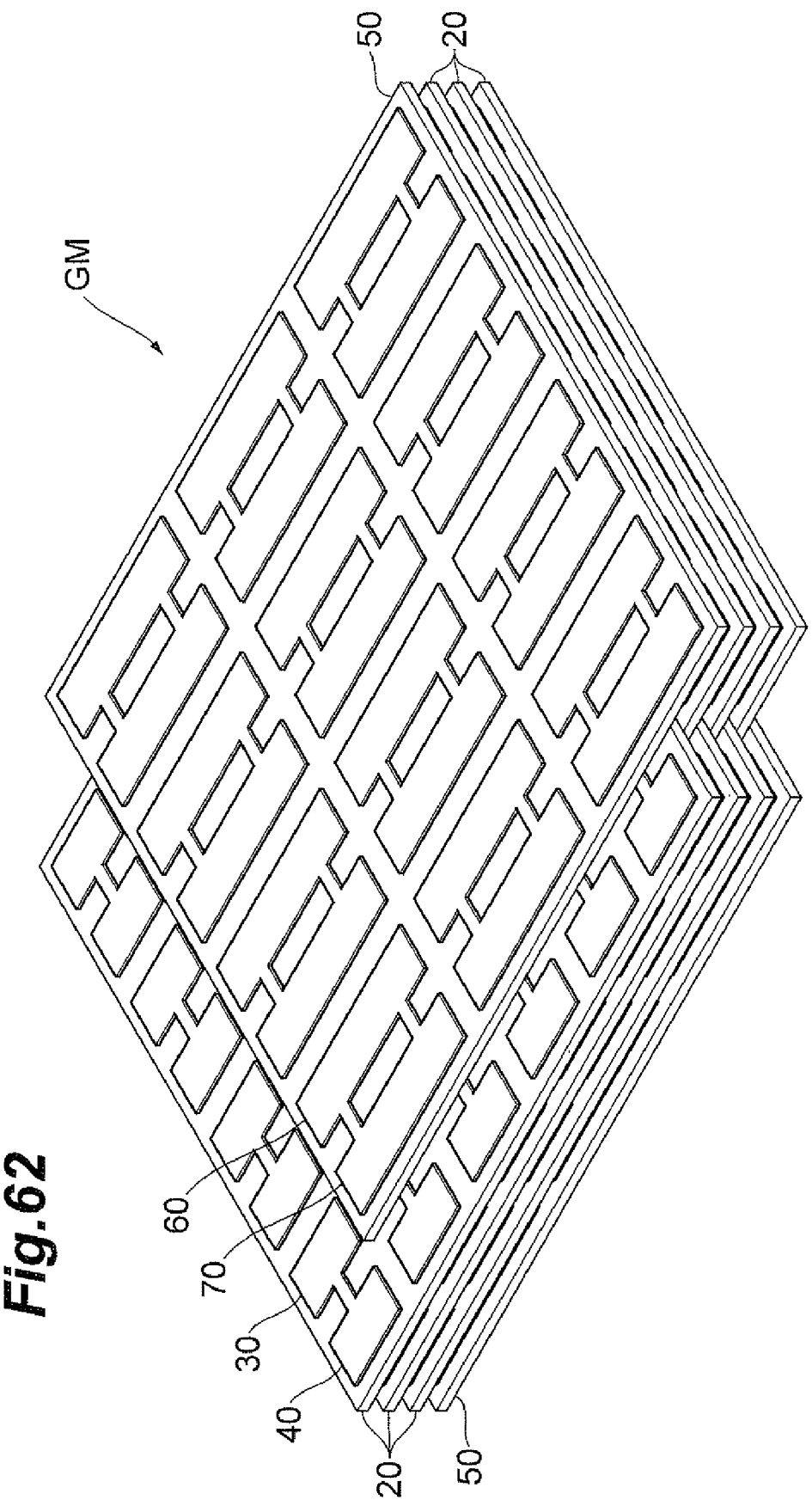
FIG. 62 is a perspective view showing a ceramic green sheet laminate body.

The subsequent laminating step S22 is, as shown in FIG. 61, to laminate a plurality of ceramic green sheets 20, 50, together with ceramic green sheets without any internal electrode patterns (not shown), in a third direction (Z-direction in FIG. 61) perpendicular to the first and second directions. This process provides a ceramic green sheet laminate body GM shown in FIG. 62. At this time, the ceramic green sheets 20, 50 are laminated in such a manner that the ceramic green sheets 20 deviate from each other by a length of one internal electrode pattern between two adjacent sheets in a direction intersecting with the first and second directions and that the ceramic green sheets 50 also deviate from each other by a length of one internal electrode pattern between two adjacent sheets in the direction intersecting with the first and second directions. Namely, the ceramic green sheets 20, 50 are laminated so that the portions 31, 41, 61, 71 corresponding to the main electrode portions 13A, 13B, 13C, 13D in the internal electrode patterns 30, 40, 60, 70 wholly overlap with each other when viewed from the third direction. The ceramic green sheets without any internal electrode patterns constitute outermost layers of the ceramic green sheet laminate body GM.

Figure 63:
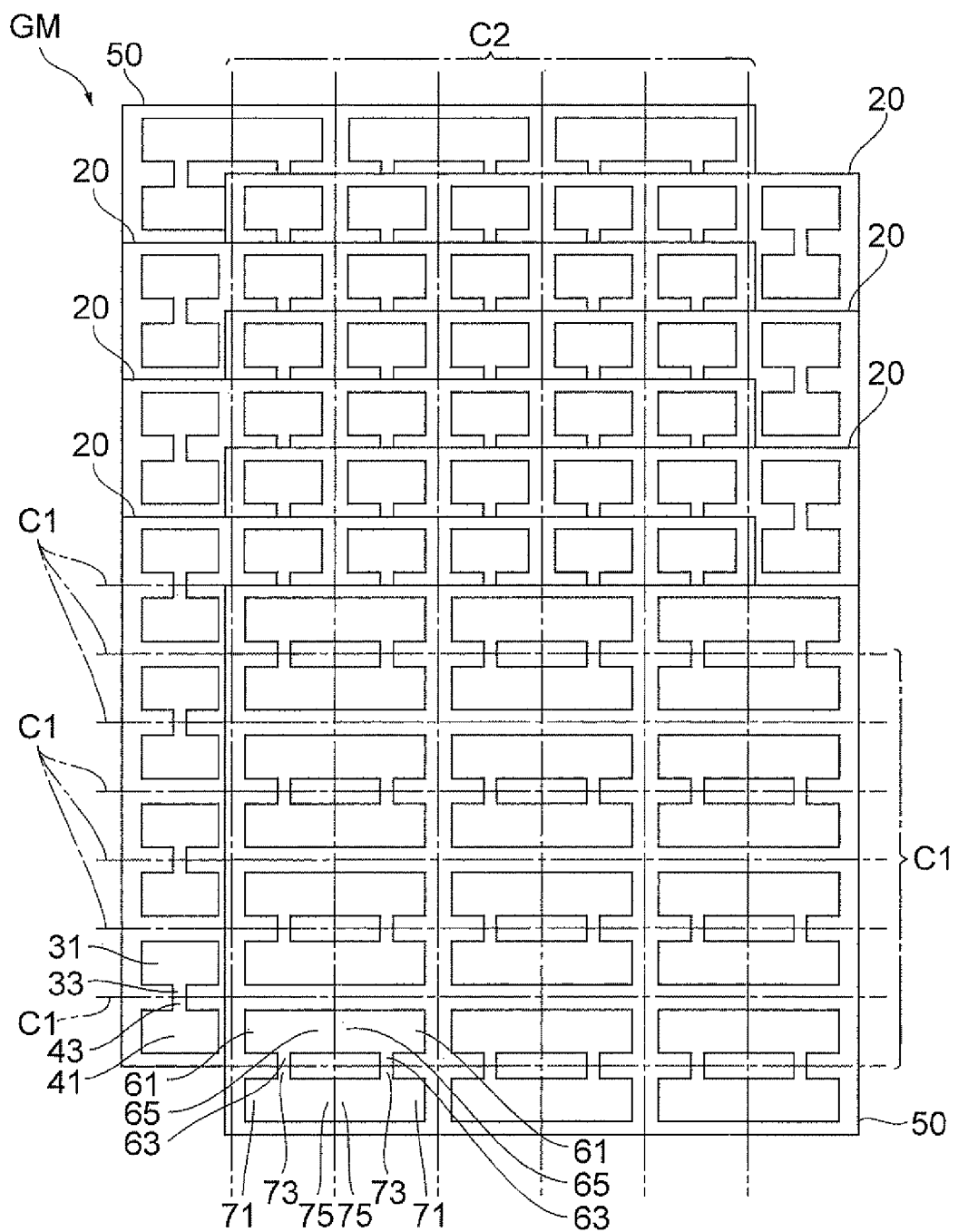
FIG. 63 is a plan view showing the ceramic green sheet laminate body in a decomposed state for explaining a cutting step.

The subsequent cutting step S23 is, as shown in FIG. 63, to cut the ceramic green sheet laminate body GM along intended cutting lines C1, C2. This process provides laminate chips MC of individual multilayer capacitor units shown in FIG. 12. FIG. 63 is a plan view showing the ceramic green sheet laminate body GM in a decomposed state, for explaining the cutting step S23. The intended cutting lines C1 and the intended cutting lines C2 are perpendicular to each other. In FIG. 63, while two adjacent ceramic green sheets are defined as a set, the ceramic green sheets are illustrated as shifted in the Y-direction for each set.

When the ceramic green sheet laminate body GM is cut along the intended cutting lines C1, the continuous portions 33, 43 corresponding to the lead portions 14A, 14B are cut in the middle, whereby the portions 33, 43 corresponding to the lead portions 14A, 14B are exposed in respective cut faces. Similarly, the continuous portions 63, 73 corresponding to the lead portions 14C, 14E are cut in the middle, whereby the portions 63, 73 corresponding to the lead portions 14C, 14E are exposed in respective cut faces. When the ceramic green sheet laminate body GM is cut along the intended cutting lines C2, the continuous portions 65, 75 corresponding to the lead portions 14D, 14F are cut in the middle, whereby the portions 65, 75 corresponding to the lead portions 14D, 14F are exposed in respective cut faces. In each laminate chip MC, therefore, the portions 33, 43, 63, 73, 65, 75 corresponding to the respective lead portions 14A, 14B, 14C, 14E, 14D, 14F are exposed in the side faces thereof.

The subsequent firing step S24 is to heat the laminate chips MC to carry out drying, debindering, and firing. This process provides the element bodies 2 of multilayer capacitors 1.

The subsequent external conductor forming step S25 is to form the external electrodes 3A, 3B and the connection conductors 4A, 4B on the exterior surface of each element body 2. This process finally provides the aforementioned multilayer capacitors 1. The external electrodes 3A, 3B and connection conductors 4A, 4B are formed in the same manner as in the first embodiment.

As described above, the production method of the ninth embodiment involves simply preparing only two types of ceramic green sheets, the ceramic green sheets 20 for capacitance section 11 with the internal electrode patterns 30, 40, and the ceramic green sheets 50 for ESR control section 12 with the internal electrode patterns 60, 70, as the ceramic green sheets with the internal electrode patterns, which simplifies the production steps of multilayer capacitor 1 and reduces the production cost.

In the production method of the ninth embodiment, the portions 33, 43 corresponding to the lead portions 14A, 14B are continuous across the intended cutting line C1, in the internal electrode patterns 30, 40 formed on the ceramic green sheets 20. In the internal electrode patterns 60, 70 formed on the ceramic green sheets 50, the portions 63, 73 corresponding to the lead portions 14C, 14E are also continuous across the intended cutting line C1 and the portions 65, 75 corresponding the lead portions 14D, 14F are continuous across the intended cutting line C2. For this reason, even if there is a deviation on the occasion of laminating the ceramic green sheets 20, 50 or on the occasion of cutting the ceramic green sheet laminate body GM, the portions 33, 43, 63, 73, 65, 75 corresponding to the lead portions 14A, 14B, 14C, 14E, 14D, 14F in the internal electrode patterns 30, 40, 60, 70 will always be exposed in the side faces of cut faces in each laminate chip MC obtained. Therefore, the multilayer capacitors 1 each provided with the element body 2 including the capacitance section 11 and the ESR control section 12 can be produced with a good yield, while suppressing occurrence of defective products in which the internal electrodes 7A, 7B, 7C, 7D fail to be exposed in the side faces 2a, 2b, 2c, 2d of the element body 2.

Tenth Embodiment

A configuration of a multilayer capacitor produced by a production method of multilayer capacitor according to the tenth embodiment is the same as the configuration of the multilayer capacitor in the second embodiment. Therefore, the description about the configuration of the multilayer capacitor in the tenth embodiment is omitted herein.

The below will describe the production method of multilayer capacitor according to the tenth embodiment, with reference to FIGS. 64 to 67. The production method of multilayer capacitor according to the tenth embodiment includes respective steps of the ceramic green sheet preparing step, laminating step, cutting step, firing step, and external conductor forming step as in the ninth embodiment.

Figure 64:
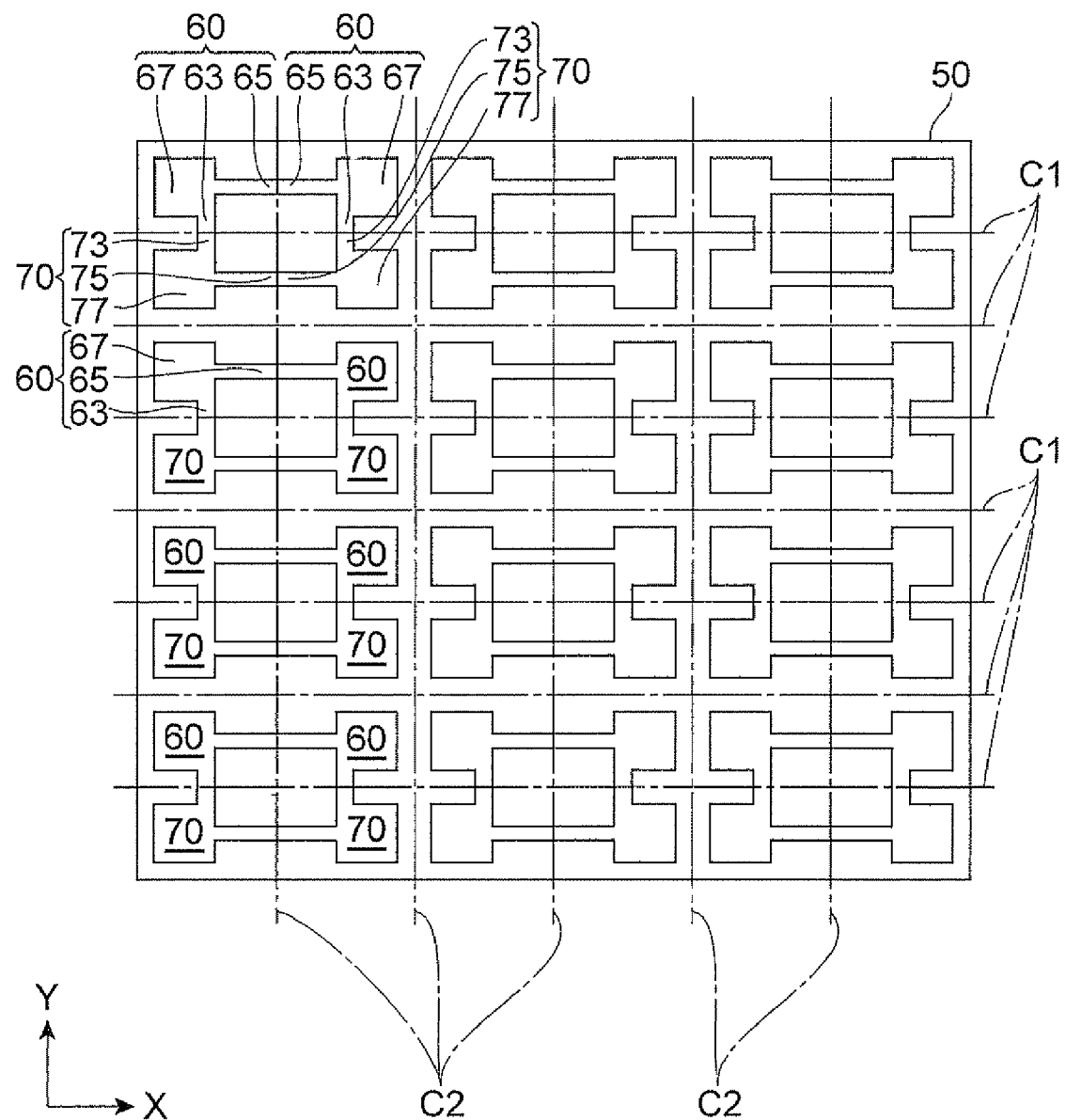
FIG. 64 is a plan view showing a ceramic green sheet in the tenth embodiment.

The ceramic green sheet preparing step includes preparing a plurality of ceramic green sheets 20 shown in FIG. 59. The ceramic green sheet preparing step also includes preparing a plurality of ceramic green sheets 50 shown in FIG. 64. FIG. 64 is a plan view showing a ceramic green sheet.

The ceramic green sheet 50 has internal electrode patterns 60 corresponding to the internal electrodes 7C, and internal electrode patterns 70 corresponding to the internal electrodes 7D, formed thereon. Each internal electrode pattern 60 has a portion 67 corresponding to the main electrode portion 13G, a portion 63 corresponding to the lead portion 14C, and a portion 65 corresponding to the lead portion 14D. Each internal electrode pattern 70 has a portion 77 corresponding to the main electrode portion 13H, a portion 73 corresponding to the lead portion 14E, and a portion 75 corresponding to the lead portion 14F.

The internal electrode patterns 60 and internal electrode patterns 70 are formed so that they are arranged each in juxtaposition in a first direction (X-direction in FIG. 64) and alternately arranged in a second direction (Y-direction in FIG. 64). The internal electrode patterns 60 and the internal electrode patterns 70 are formed so that the portion 63 corresponding to the lead portion 14C and the portion 73 corresponding to the lead portion 14E are continuous across an intended cutting line C1, so that each pair of portions 65 corresponding to the lead portion 14D and each pair of portions 75 corresponding to the lead portion 14F are continuous across an intended cutting line C2, and so that, concerning four mutually adjacent internal electrode patterns 60, 70, these four internal electrode patterns 60, 70 are connected in a circuiting shape. The internal electrode pattern 60 and internal electrode pattern 70 adjacent in the second direction are continuous through their respective portions 63, 73 corresponding to the lead portions 14C, 14E. Each pair of internal electrode patterns 60 and each pair of internal electrode patterns 70 adjacent in the first direction are continuous through their respective portions 65 or 75 corresponding to the lead portion 14D or 14F.

Figure 65:
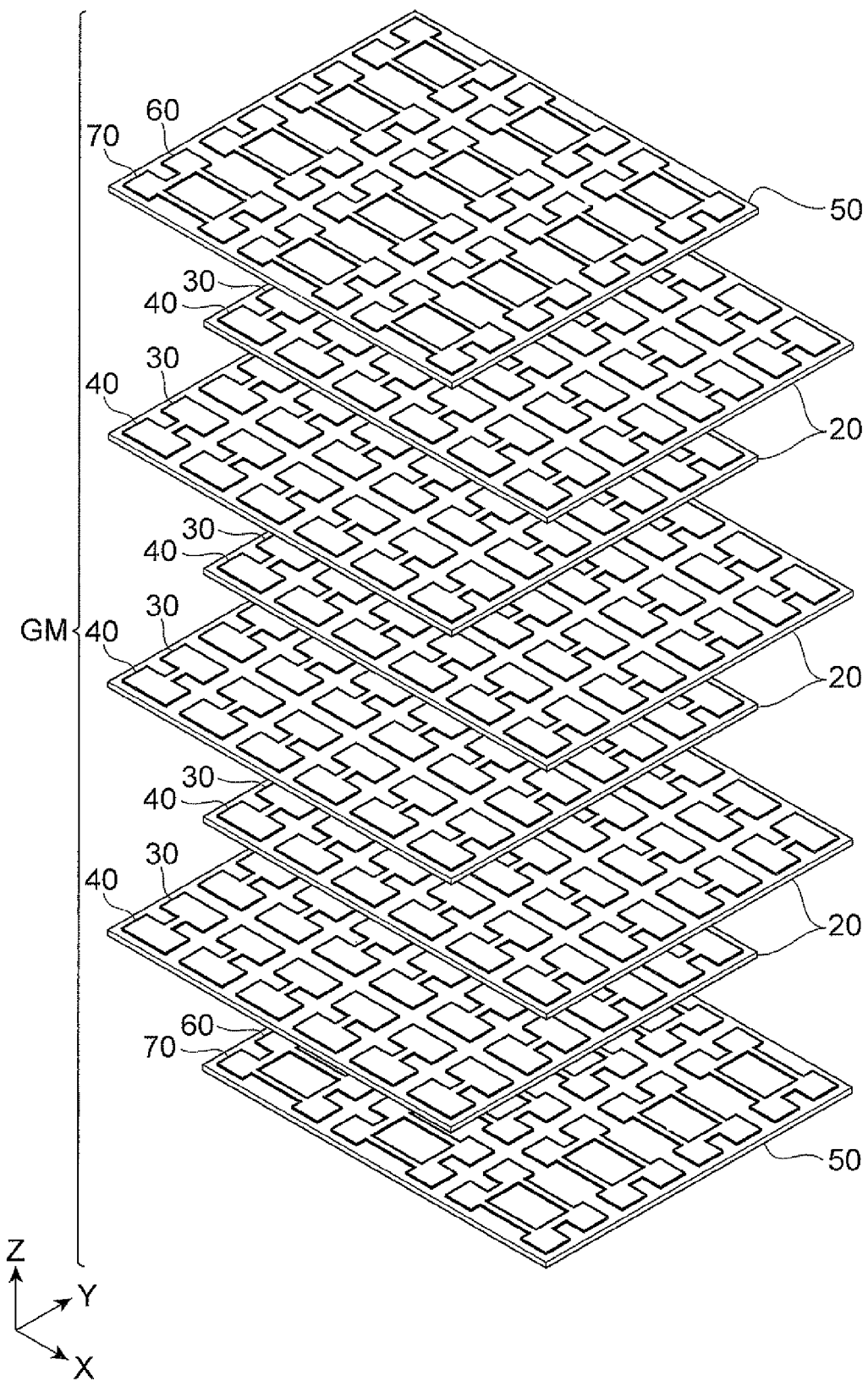
FIG. 65 is a perspective view showing an order of laminating ceramic green sheets in a laminating step.
Figure 66:
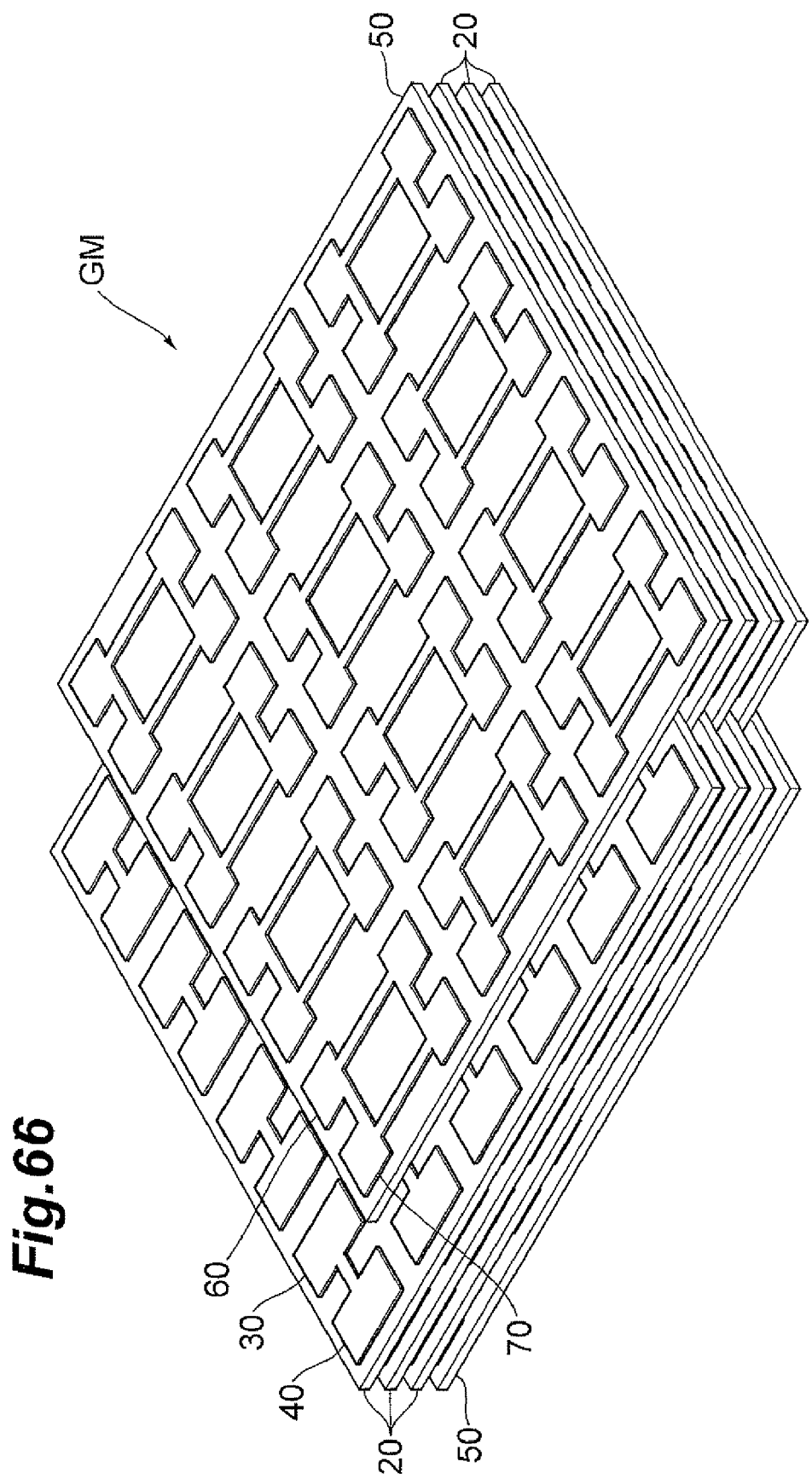
FIG. 66 is a perspective view showing a ceramic green sheet laminate body.

The subsequent laminating step is to laminate a plurality of ceramic green sheets 20, 50, together with ceramic green sheets without any internal electrode patterns (not shown), in a third direction (Z-direction in FIG. 65), as shown in FIG. 65. This process provides a ceramic green sheet laminate body GM shown in FIG. 66. At this time, the ceramic green sheets 20, 50 are laminated in such a manner that the ceramic green sheets 20 deviate from each other by a length of one internal electrode pattern between two adjacent sheets in a direction intersecting with the first and second directions and that the ceramic green sheets 50 also deviate from each other by a length of one internal electrode pattern between two adjacent sheets in the direction intersecting with the first and second directions. Namely, the ceramic green sheets 20, 50 are laminated so that the portions 31, 41, 67, 77 corresponding to the main electrode portions 13A, 13B, 13G, 13H in the internal electrode patterns 30, 40, 60, 70 overlap with each other when viewed from the third direction.

Figure 67:
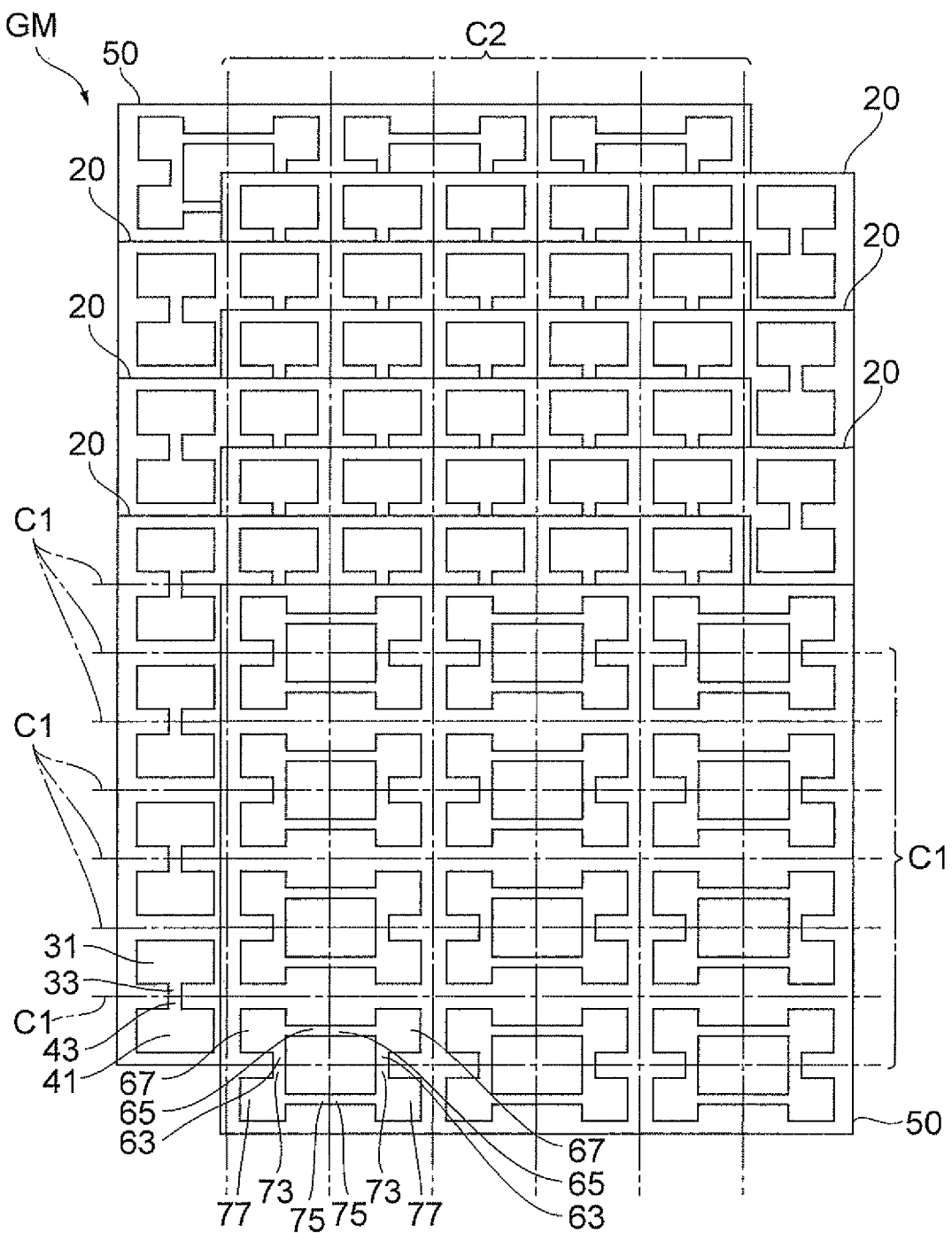
FIG. 67 is a plan view showing the ceramic green sheet laminate body in a decomposed state for explaining a cutting step.

The subsequent cutting step is, as shown in FIG. 67, to cut the ceramic green sheet laminate body GM along intended cutting lines C1, C2. This process provides laminate chips MC of individual multilayer capacitor units shown in FIG. 19. FIG. 67 is a plan view showing the ceramic green sheet laminate body GM in a decomposed state, for explaining the cutting step. In FIG. 67, while two adjacent ceramic green sheets are defined as a set, the ceramic green sheets are illustrated as shifted in the Y-direction for each set.

When the ceramic green sheet laminate body GM is cut along the intended cutting lines C1, the portions 33, 43 corresponding to the lead portions 14A, 14B and the portions 63, 73 corresponding to the lead portions 14C, 14E each are exposed in the cut faces. When the ceramic green sheet laminate body GM is cut along the intended cutting lines C2, the portions 65, 75 corresponding to the lead portions 14D, 14F each are exposed in the cut faces. Therefore, the portions 33, 43, 63, 73, 65, 75 corresponding to the respective lead portions 14A, 14B, 14C, 14E, 14D, 14F are exposed in the side faces in each laminate chip MC.

The aforementioned multilayer capacitors are finally obtained through the subsequent firing step and external conductor forming step. The firing step and external conductor forming step are the same as the firing step S24 and external conductor forming step S25 in the aforementioned ninth embodiment, and the description thereof is thus omitted herein.

As described above, the production method of the tenth embodiment also simplifies the production steps of multilayer capacitor 1, reduces the production cost, and permits the multilayer capacitor 1 with the element body 2 including the capacitance section 11 and the ESR control section 12 to be produced with a good yield, as the production method of the ninth embodiment does.

Eleventh Embodiment

A configuration of a multilayer capacitor produced by a production method of multilayer capacitor according to the eleventh embodiment is the same as the configuration of the multilayer capacitor in the third embodiment. Therefore, the description about the configuration of the multilayer capacitor in the eleventh embodiment is omitted herein.

The below will describe the production method of multilayer capacitor according to the eleventh embodiment, with reference to FIGS. 68 to 72. The production method of multilayer capacitor according to the eleventh embodiment includes respective steps of the ceramic green sheet preparing step, laminating step, cutting step, firing step, and external conductor forming step as in the ninth and tenth embodiments.

Figure 68:
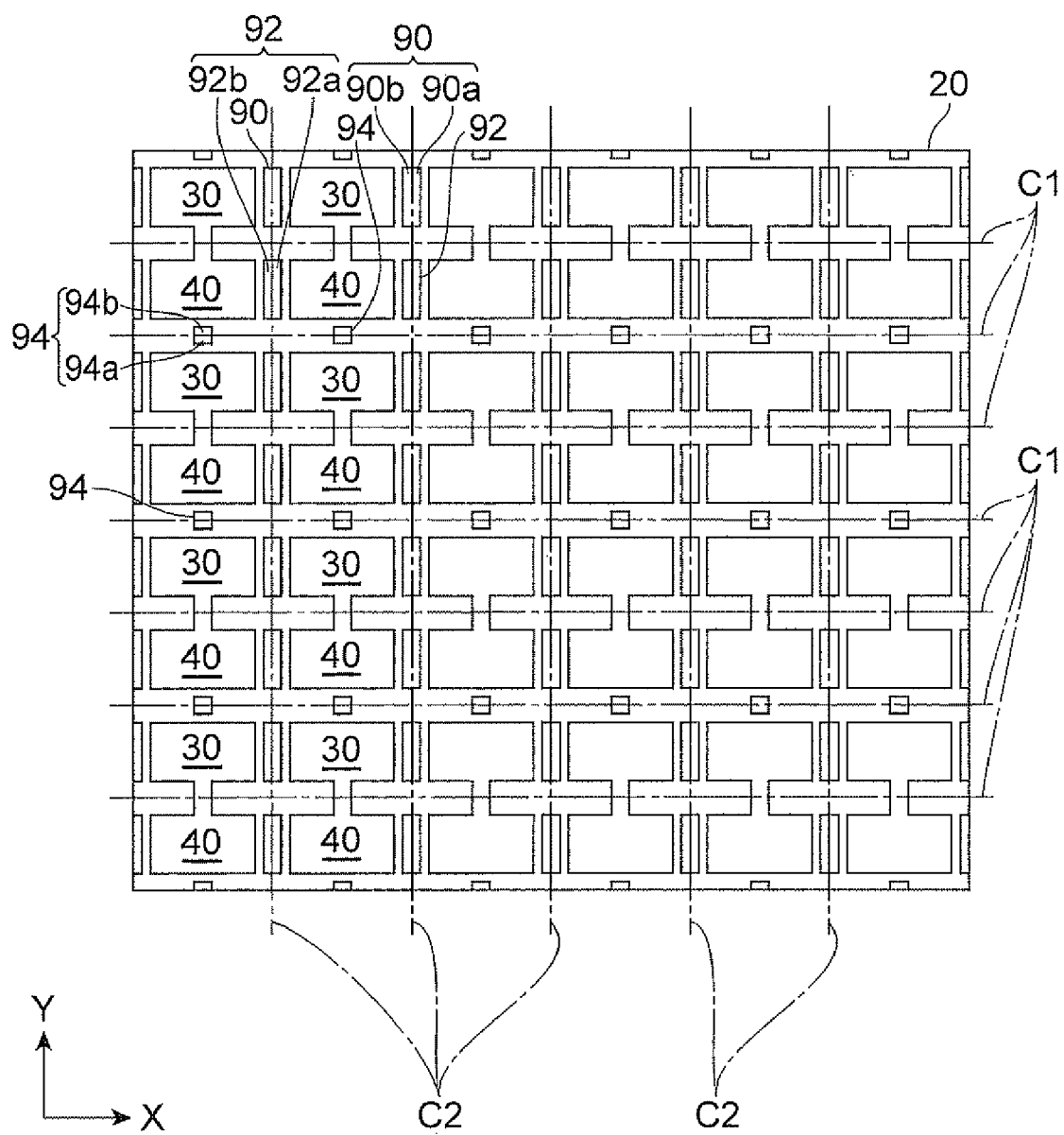
FIG. 68 is a plan view showing a ceramic green sheet in the eleventh embodiment.

The ceramic green sheet preparing step includes preparing a plurality of ceramic green sheets 20 shown in FIG. 68. FIG. 68 is a plan view showing a ceramic green sheet.

The ceramic green sheet 20 has dummy electrode patterns 90 corresponding to the dun my electrodes 8A, 9A, dummy electrode patterns 92 corresponding to the dummy electrodes 8B, 9B, and dummy electrode patterns 94 corresponding to the dummy electrodes 10A, 10B, in addition to the internal electrode patterns 30 and internal electrode patterns 40, the electrode patterns being formed on the green sheet 20. Each dummy electrode pattern 90 includes a portion 90*a* corresponding to the dummy electrode 8A and a portion 90*b* corresponding to the dummy electrode 9A. Each dummy electrode pattern 92 includes a portion 92*a* corresponding to the dummy electrode 8B and a portion 92*b* corresponding to the dummy electrode 9B. Each dummy electrode pattern 94 includes a portion 94*a* corresponding to the dummy electrode 10A and a portion 94*b* corresponding to the dummy electrode 10B.

The dummy electrode patterns 90 are formed so as to be alternately located between internal electrode patterns 30 in a first direction (X-direction in FIG. 68). The dummy electrode patterns 92 are formed so as to be alternately located between internal electrode patterns 40 in the first direction (X-direction in FIG. 68). The dummy electrode patterns 90 are also formed so that the portion 90*a* corresponding to the dummy electrode 8A and the portion 90*b* corresponding to the dummy electrode 9A are continuous across an intended cutting line C2. The dummy electrode patterns 92 are also formed so that the portion 92*a* corresponding to the dummy electrode 8B and the portion 92*b* corresponding to the dummy electrode 9B are continuous across an intended cutting line C2. The dummy electrode patterns 90 and dummy electrode patterns 92 are alternately arranged in juxtaposition along a direction in which the intended cutting line C2 extends.

The dummy electrode patterns 94 are formed so as to be located between internal electrode pattern 30 and internal electrode pattern 40 in a second direction (Y-direction in FIG. 68). The dummy electrode patterns 94 are also formed so that the portion 94*a* corresponding to the dummy electrode 10A and the portion 94*b* corresponding to the dummy electrode 10B are continuous across an intended cutting line C1.

Figure 69:
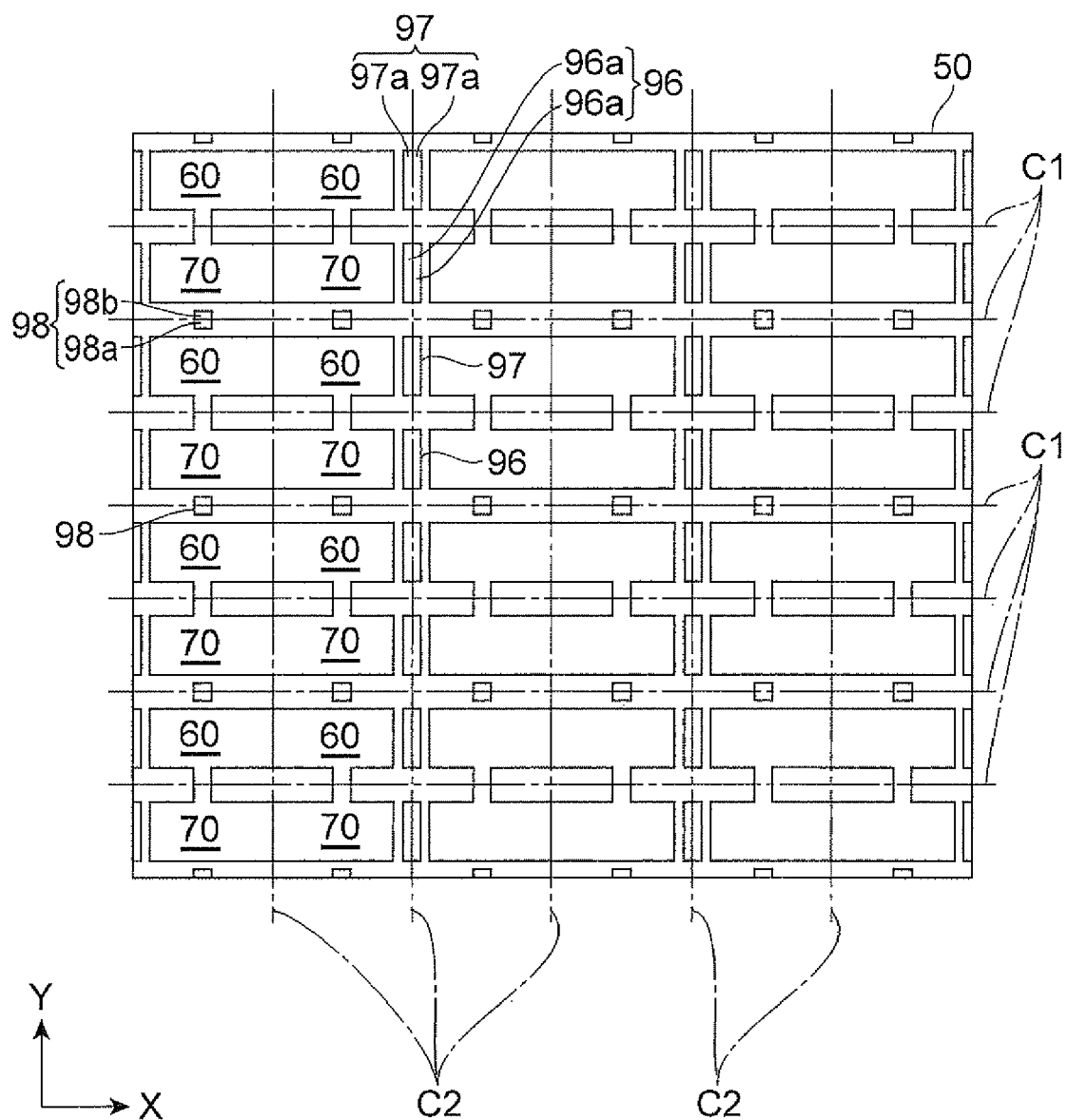
FIG. 69 is a plan view showing a ceramic green sheet.

The ceramic green sheet preparing step also includes preparing a plurality of ceramic green sheets 50 shown in FIG. 69. FIG. 69 is a plan view showing a ceramic green sheet.

The ceramic green sheet 50 has dummy electrode patterns 96 corresponding to the dummy electrode 9C, dummy electrode patterns 97 corresponding to the dummy electrode 8D, and dummy electrode patterns 98 corresponding to the dummy electrodes 10C, 10D, in addition to the internal electrode patterns 60 and internal electrode patterns 70, the electrode patterns being formed on the green sheet 50. Each dummy electrode pattern 96 includes portions 96*a* corresponding to the dummy electrode 9C. Each dummy electrode pattern 97 includes portions 97*a* corresponding to the dummy electrode 8D. Each dummy electrode pattern 98 includes a portion 98*a* corresponding to the dummy electrode 10C and a portion 98*b* corresponding to the dummy electrode 10D.

The dummy electrode patterns 96 are formed so as to be alternately located between internal electrode patterns 70 in a first direction (X-direction in FIG. 69). The dummy electrode patterns 96 are also formed so that the portions 96*a* corresponding to the dummy electrode 9C are continuous across an intended cutting line C2. The dummy electrode patterns 97 are formed so as to be alternately located between internal electrode patterns 60 in the first direction (X-direction in FIG. 69). The dummy electrode patterns 97 are also formed so that the portions 97*a* corresponding to the dummy electrode 8D are continuous across an intended cutting line C2. The dummy electrode patterns 96 and dummy electrode patterns 97 are alternately arranged in juxtaposition along a direction in which the intended cutting line C2 extends.

The dummy electrode patterns 98 are formed so as to be located between internal electrode pattern 60 and internal electrode pattern 70 in a second direction (Y-direction in FIG. 69). The dummy electrode patterns 98 are also formed so that the portion 98*a* corresponding to the dummy electrode 10C and the portion 98*b* corresponding to the dummy electrode 10D are continuous across an intended cutting line C1.

Figure 70:
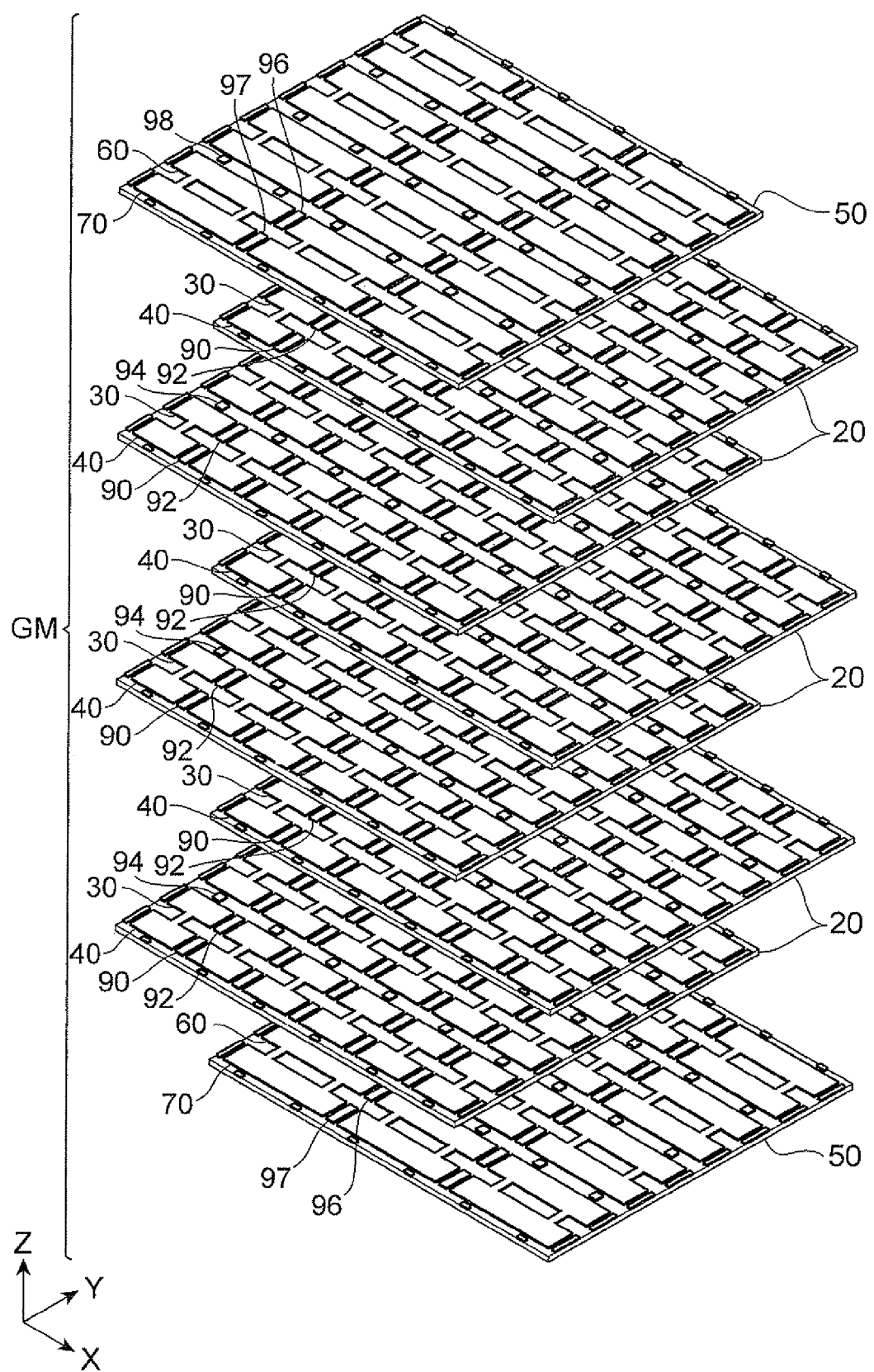
FIG. 70 is a perspective view showing an order of laminating ceramic green sheets in a laminating step.

The subsequent laminating step is, as shown in FIG. 70, to laminate a plurality of ceramic green sheets 20, 50, together with ceramic green sheets without any internal electrode patterns (not shown), in a third direction (Z-direction in FIG. 70).

Figure 71:
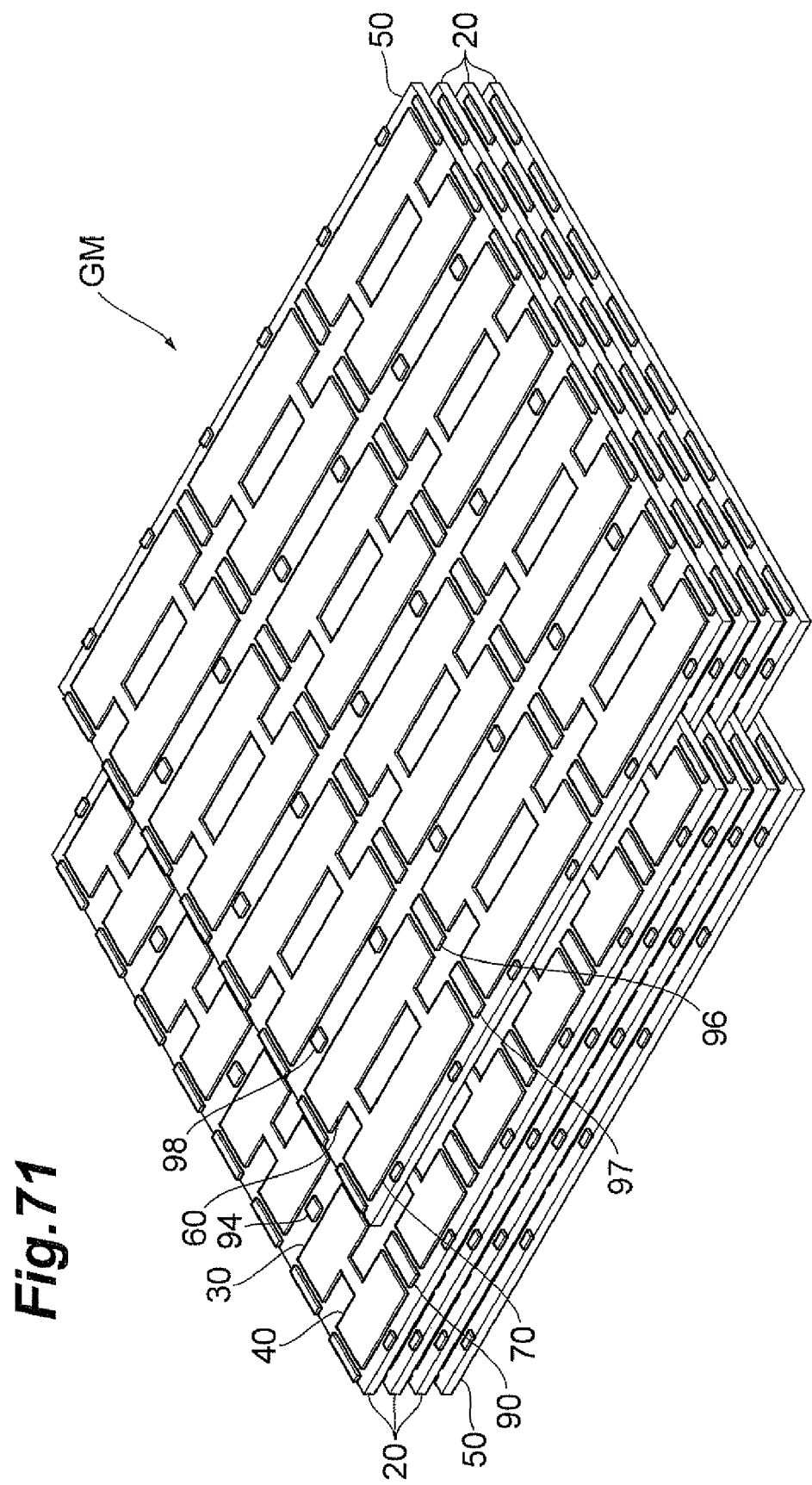
FIG. 71 is a perspective view showing a ceramic green sheet laminate body.

This process provides a ceramic green sheet laminate body GM shown in FIG. 71.

Figure 72:
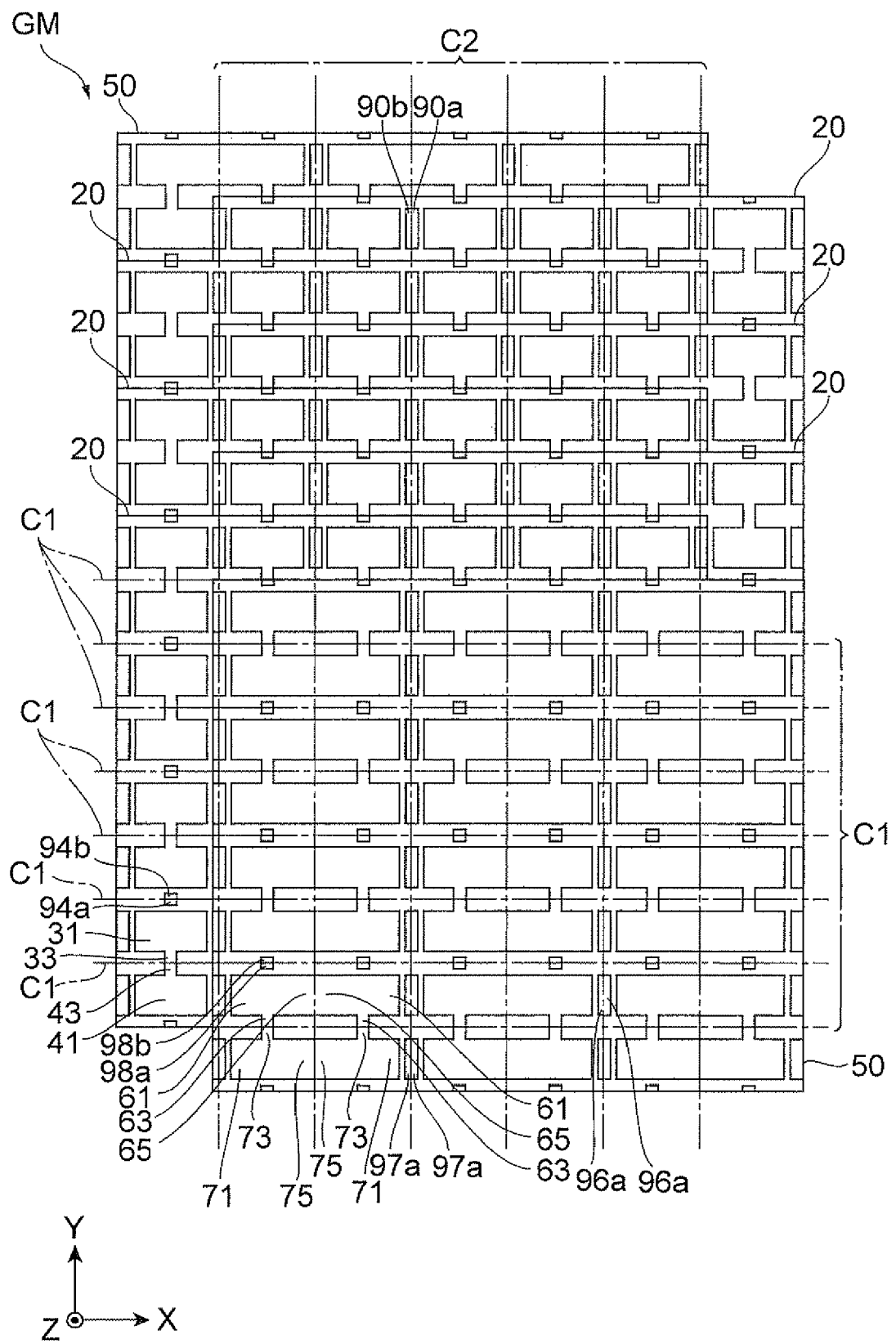
FIG. 72 is a plan view showing the ceramic green sheet laminate body in a decomposed state for explaining a cutting step.

The subsequent cutting step is, as shown in FIG. 72, to cut the ceramic green sheet laminate body GM along intended cutting lines C1, C2. This process provides laminate chips MC of individual multilayer capacitor units shown in FIG. 28. FIG. 72 is a plan view showing the ceramic green sheet laminate body GM in a decomposed state, for explaining the cutting step. In FIG. 72, while two adjacent ceramic green sheets are defined as a set, the ceramic green sheets are illustrated as shifted in the Y-direction for each set.

When the ceramic green sheet laminate body GM is cut along the intended cutting lines C1, the portions 33, 43 corresponding to the lead portions 14A, 14B, the portions 63, 73 corresponding to the lead portions 14C, 14E, and the portions 94a, 94b, 98a, 98b corresponding to the dummy electrodes 10A, 10B, 10C, 10D each are exposed in the cut faces. When the ceramic green sheet laminate body GM is cut along the intended cutting lines C2, the portions 65, 75 corresponding to the lead portions 14D, 14F, the portions 90a, 92a, 96a corresponding to the dummy electrodes 8A, 8B, 8D, and the portions 92b, 90b, 97a corresponding to the dummy electrodes 9A, 9B, 9C each are exposed in the cut faces. In each laminate chip MC, therefore, the portions 33, 43, 63, 73, 65, 75, 90a, 92a, 96a, 92b, 90b, 97a, 94a, 94b, 98a, 98b corresponding to the respective lead portions 14A, 14B, 14C, 14E, 14D, 14F and dummy electrodes 8A, 8B, 8D, 9A, 9B, 9C, 10A, 10B, 10C, 10D are exposed in the side faces thereof.

The aforementioned multilayer capacitors are finally obtained through the subsequent firing step and external conductor forming step. The firing step and external conductor forming step are the same as the firing step S24 and external conductor forming step S25 in the aforementioned ninth embodiment and the description thereof is thus omitted herein.

As described above, the production method of the eleventh embodiment simplifies the production steps of multilayer capacitor 1, reduces the production cost, and permits the multilayer capacitor 1 with the element body 2 including the capacitance section 11 and ESR control section 12 to be produced with a good yield, as the production methods of the ninth and tenth embodiments.

In the production method of the eleventh embodiment, the portion 90a corresponding to the dummy electrode 8A and the portion 90b corresponding to the dummy electrode 9A are continuous across the intended cutting line C2, in each dummy electrode pattern 90 formed on the ceramic green sheet 20. In each dummy electrode pattern 92, the portion 92a corresponding to the dummy electrode 8B and the portion 92b corresponding to the dummy electrode 9B are continuous across the intended cutting line C2. In each dummy electrode pattern 94, the portion 94a corresponding to the dummy electrode 10A and the portion 94b corresponding to the dummy electrode 10B are continuous across the intended cutting line C1. In each dummy electrode pattern 96 formed on the ceramic green sheet 50, the portions 96a corresponding to the dummy electrode 9C are continuous across the intended cutting line C2. In each dummy electrode pattern 97, the portions 97a corresponding to the dummy electrode 8D are continuous across the intended cutting line C2. In each dummy electrode pattern 98, the portion 98a corresponding to the dummy electrode 10C and the portion 98b corresponding to the dummy electrode 10D are also continuous across the intended cutting line C1. In each laminate chip MC, therefore, the dummy electrode patterns 90-98 (90a, 92a, 96a, 92b, 90b, 97a, 94a, 94b, 98a, 98b) are always exposed in the side faces of cut faces, whereby the element body 2 can be obtained in the structure wherein the dummy electrodes 8A, 8B, 8D, 9A, 9B, 9C, 10A, 10B, 10C, 10D are also exposed in the side faces 2a-2d. The dummy electrodes 8A, 8B, 8D, 9A, 9B, 9C, 10A, 10B, 10C, 10D are provided for increasing contact areas with the external electrodes 3A, 3B and connection conductors 4A, 4B on the occasion of forming the external electrodes 3A, 3B and connection conductors 4A, 4B on the element body 2 and thereby increasing the connection strength between the element body 2 and the external electrodes 3A, 3B and connection conductors 4A, 4B. When the dummy electrode patterns 90-98 are formed on the ceramic green sheets 20, 50, the dummy electrode patterns 90-98 function as level difference absorbing layers to restrain occurrence of a level difference due to the thickness of the internal electrode patterns 30, 40, 60, 70, thereby preventing each laminate chip MC (element body 2) from being deformed.

Twelfth Embodiment

A configuration of a multilayer capacitor produced by a production method of multilayer capacitor according to the twelfth embodiment is the same as the configuration of the multilayer capacitor in the fourth embodiment. Therefore, the description about the configuration of the multilayer capacitor in the twelfth embodiment is omitted herein.

The below will describe the production method of multilayer capacitor according to the twelfth embodiment, with reference to FIGS. 73 to 76. The production method of multilayer capacitor according to the twelfth embodiment includes respective steps of the ceramic green sheet preparing step, laminating step, cutting step, firing step, and external conductor forming step as in the ninth to eleventh embodiments.

Figure 73:
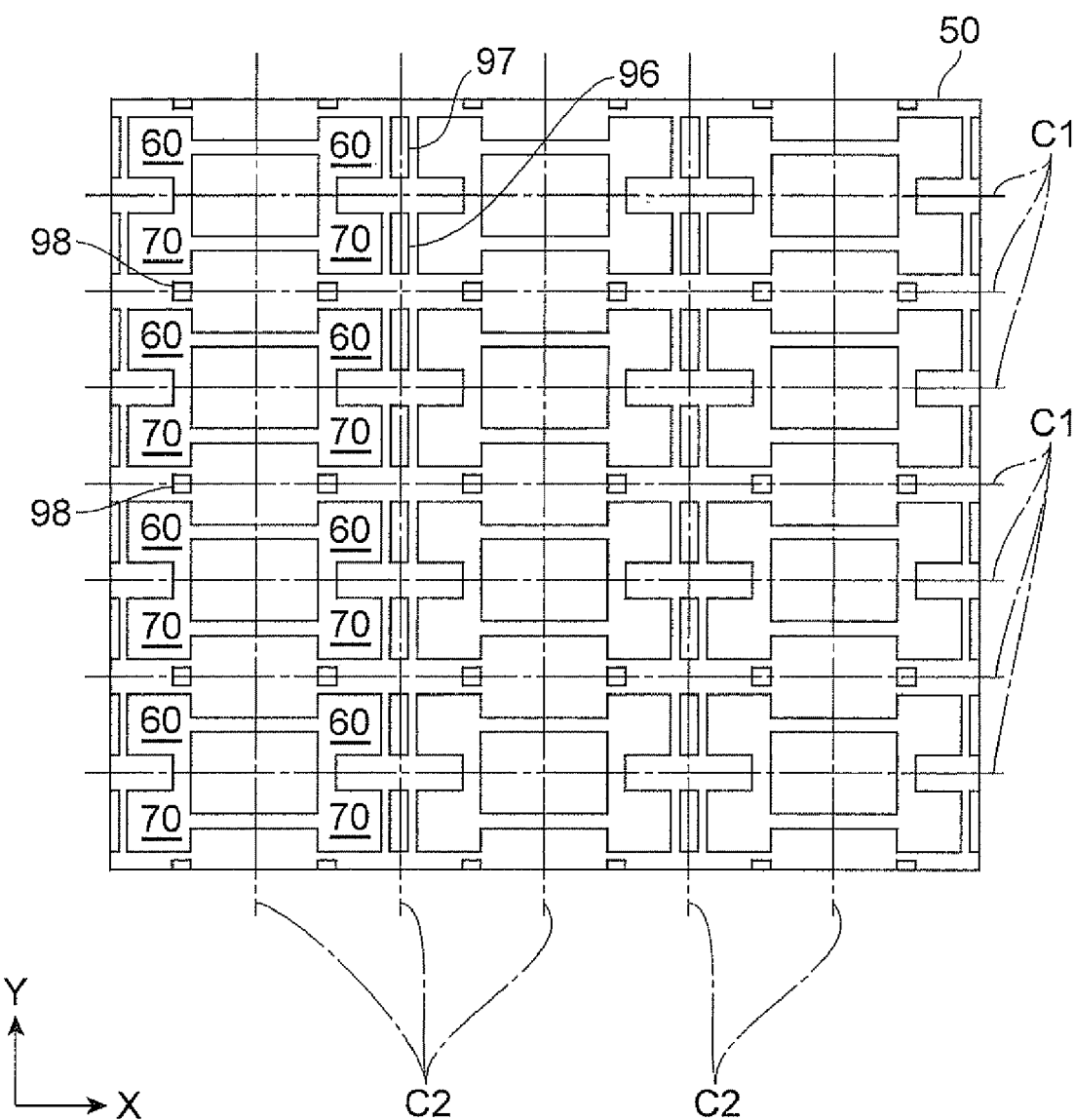
FIG. 73 is a plan view showing a ceramic green sheet in the twelfth embodiment.

The ceramic green sheet preparing step includes preparing a plurality of ceramic green sheets 20 shown in FIG. 68. Each ceramic green sheet 20 has internal electrode patterns 30, internal electrode patterns 40, dummy electrode patterns 90, dummy electrode patterns 92, and dummy electrode patterns 94 formed thereon. The ceramic green sheet preparing step also includes preparing a plurality of ceramic green sheets 50 shown in FIG. 73. Each ceramic green sheet 50 has internal electrode patterns 60, internal electrode patterns 70, dummy electrode patterns 96, and dummy electrode patterns 98 formed thereon. FIG. 73 is a plan view showing a ceramic green sheet.

Figure 74:
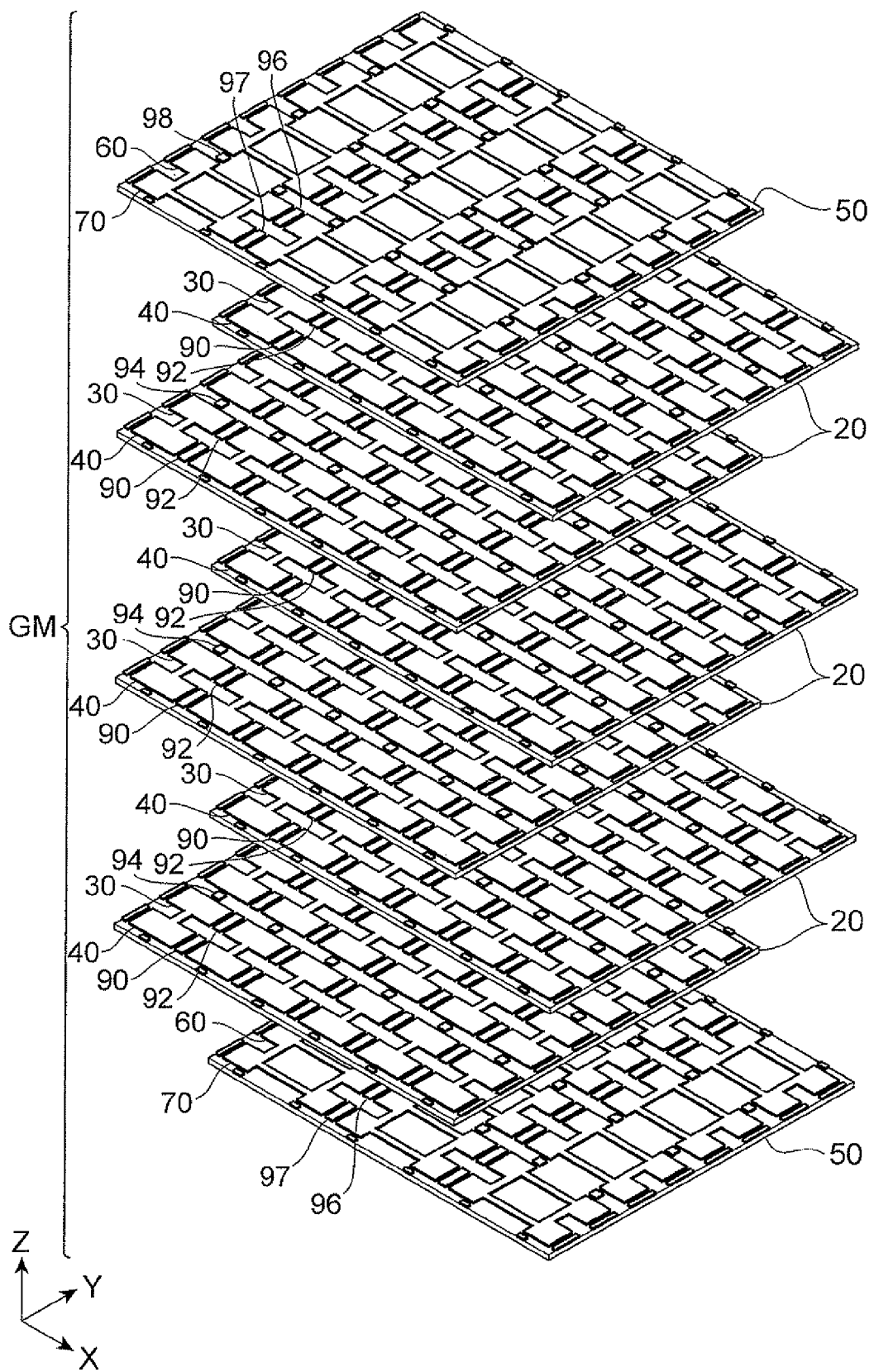
FIG. 74 is a perspective view showing an order of laminating ceramic green sheets in a laminating step.
Figure 75:
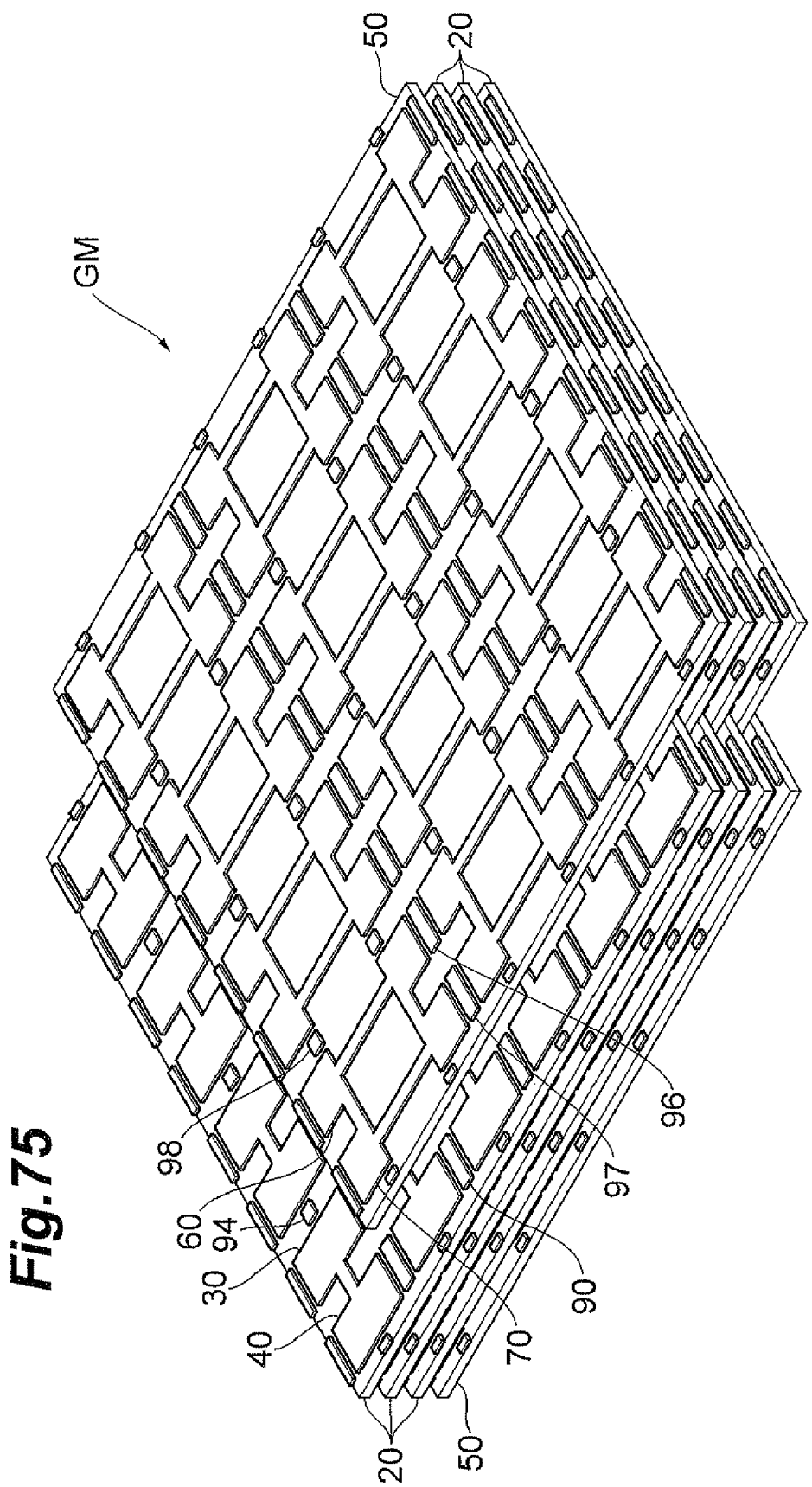
FIG. 75 is a perspective view showing a ceramic green sheet laminate body.

The subsequent laminating step is, as shown in FIG. 74, to laminate a plurality of ceramic green sheets 20, 50, together with ceramic green sheets without any internal electrode patterns (not shown), in a third direction (Z-direction in FIG. 74). This process provides a ceramic green sheet laminate body GM shown in FIG. 75.

Figure 76:
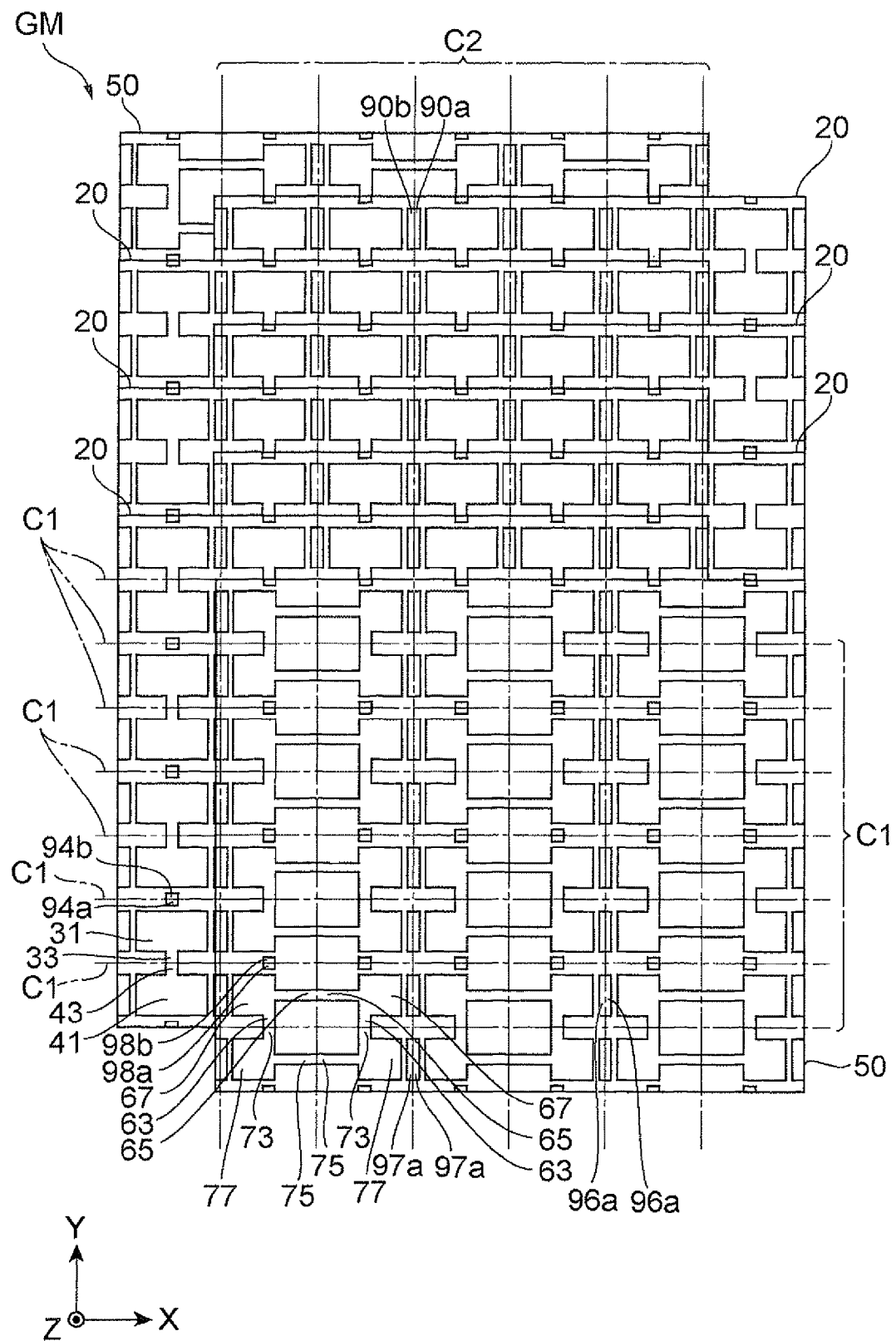
FIG. 76 is a plan view showing the ceramic green sheet laminate body in a decomposed state for explaining a cutting step.

The subsequent cutting step is, as shown in FIG. 76, to cut the ceramic green sheet laminate body GM along intended cutting lines C1, C2. This process provides laminate chips MC of individual multilayer capacitor units shown in FIG. 35. FIG. 76 is a plan view showing the ceramic green sheet laminate body GM in a decomposed state, for explaining the cutting step.

The aforementioned multilayer capacitors are finally obtained through the subsequent firing step and external conductor forming step. The firing step and external conductor forming step are the same as the firing step S24 and external conductor forming step S25 in the aforementioned ninth embodiment and the description thereof is thus omitted herein.

As described above, the production method of the twelfth embodiment simplifies the production steps of multilayer capacitor 1, reduces the production cost, and permits the multilayer capacitor 1 with the element body 2 including the capacitance section 11 and ESR control section 12 to be produced with a good yield, as the production methods of the ninth to eleventh embodiments do.

Figure 77:
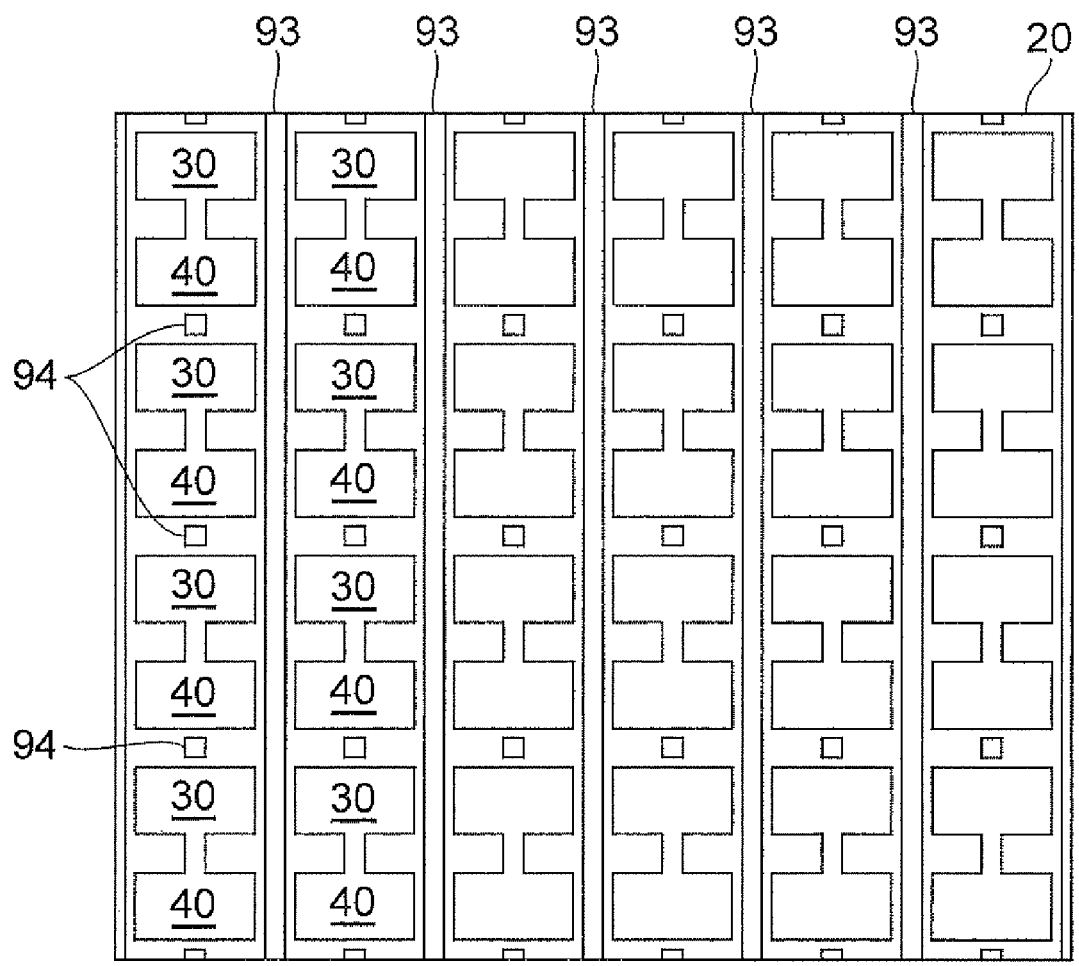
FIG. 77 is a plan view showing a modification example of a ceramic green sheet.
Figure 78:
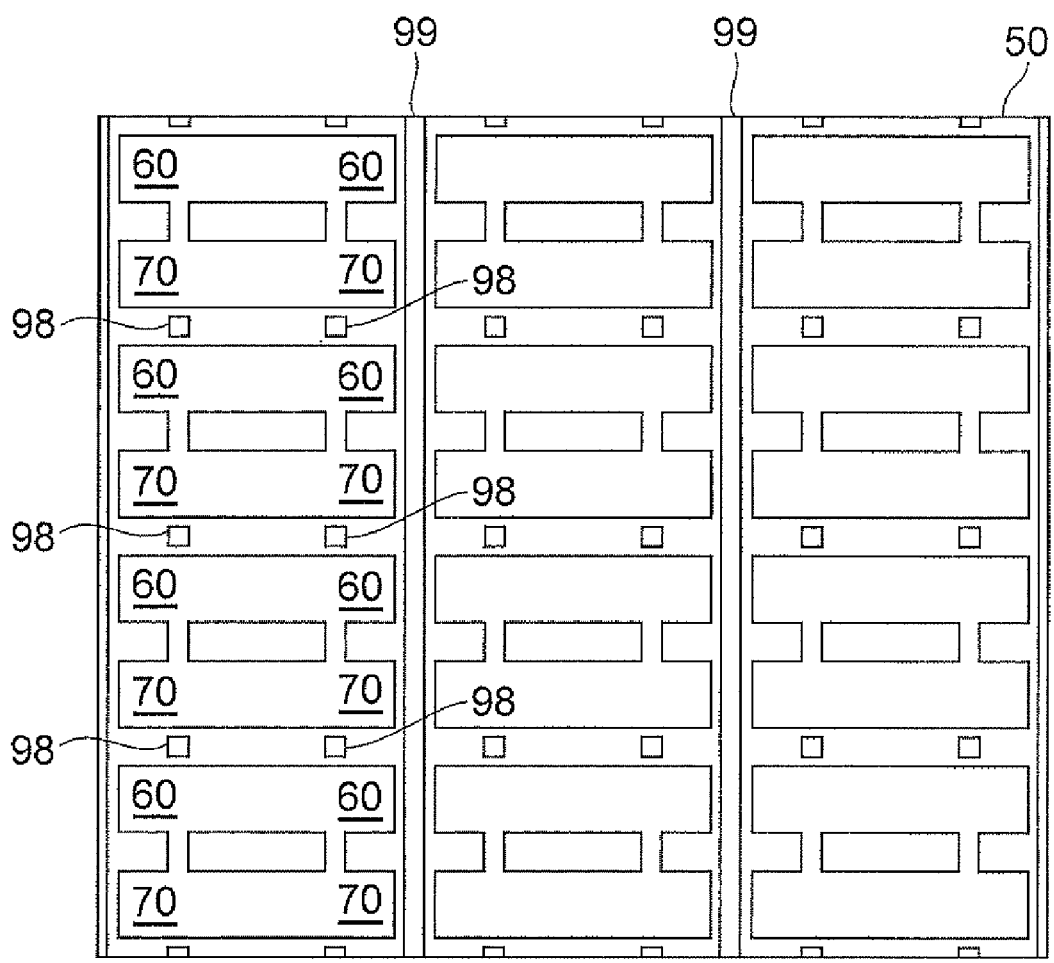
FIG. 78 is a plan view showing a modification example of a ceramic green sheet.
Figure 79:
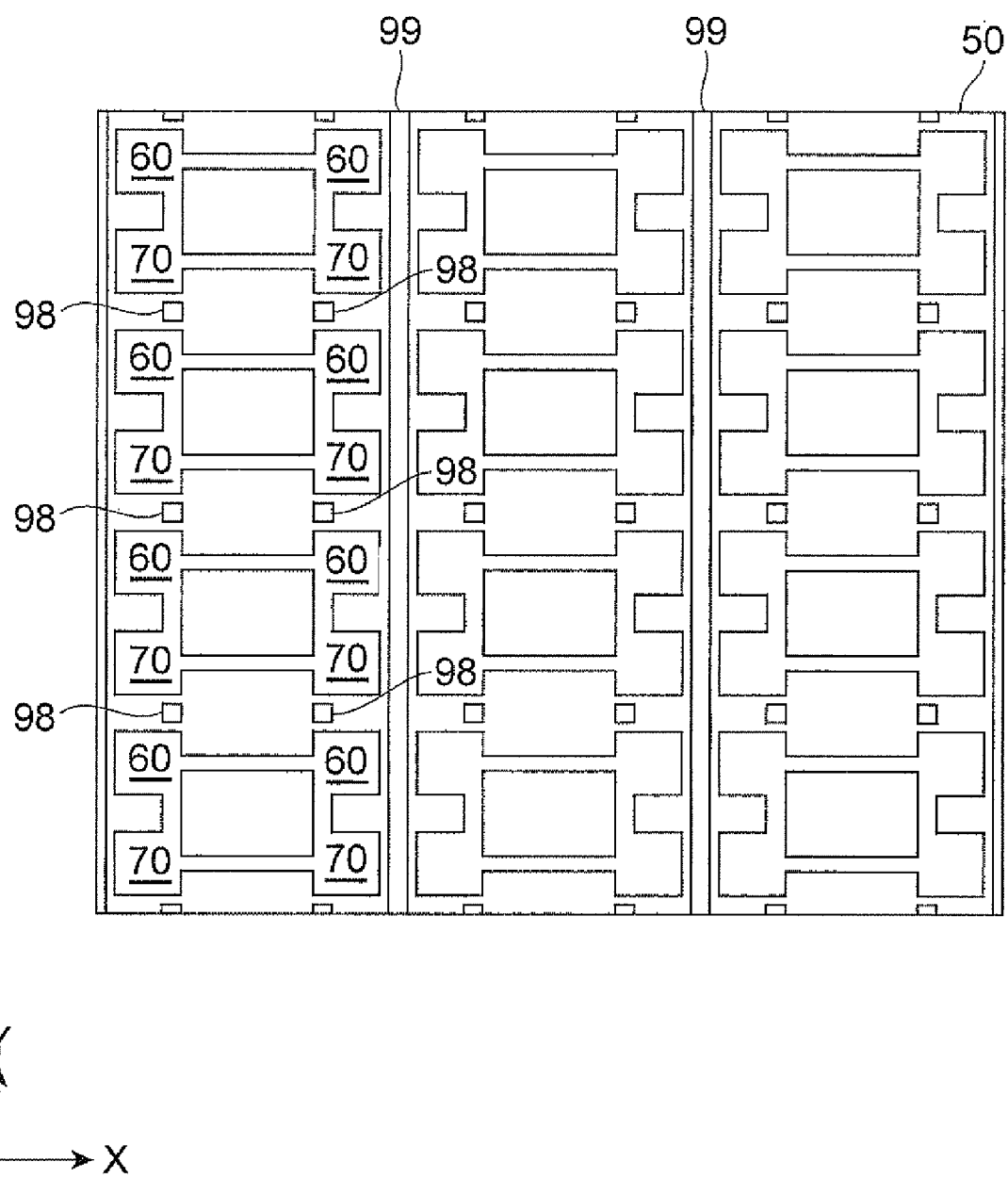
FIG. 79 is a plan view showing a modification example of a ceramic green sheet.

The dummy electrode patterns 90, 92 may be dummy electrode patterns 93 continuously formed in the extending direction of the intended cutting lines C2, as shown in FIG. 77. The dummy electrode patterns 96 may also be dummy electrode patterns 99 continuously formed in the extending direction of the intended cutting lines C2, as shown in FIGS. 78 and 79.

The above described the preferred embodiments of the present invention, but it should be noted that the present invention is by no means limited to the above-described embodiments and that the present invention can be modified in various ways without departing from the spirit and scope of the invention.

The number and order of ceramic green sheets 20, 50 to be laminated are not limited to those in the above embodiments. For example, the ceramic green sheets 50 may be continuously laminated or may be laminated between ceramic green sheets 20. It is also noted that the numbers of electrode patterns 30, 40, 60, 70, 90, 92, 93, 94, 96, 97, 98, 99 formed on the ceramic green sheets 20, 50 are not limited to those in the above embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of producing a multilayer capacitor comprising an element body of a substantially rectangular parallelepiped shape in which a plurality of internal electrodes are laminated together with a dielectric layer in between, said element body including: a capacitance section constructed in a structure in which a first internal electrode exposed in a first side face and connected to a first polarity and a second internal electrode exposed in a second side face opposed to the first side face and connected to a second polarity alternate with at least one layer of said dielectric layer in between; and an equivalent series resistance control section having a third internal electrode exposed in the first side face in which the first internal electrode is exposed and in a third side face adjacent to the first side face, and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity, the method comprising:

a step of preparing a plurality of first ceramic green sheets for the capacitance section on each of which a first internal electrode pattern corresponding to the first internal electrode and a second internal electrode pattern corresponding to the second internal electrode are formed;

a step of preparing a plurality of second ceramic green sheets for the equivalent series resistance control section on each of which a third internal electrode pattern corresponding to the third internal electrode and a fourth internal electrode pattern corresponding to the fourth internal electrode are formed;

a step of laminating the plurality of first and second ceramic green sheets in such a manner that the first ceramic green sheets deviate from each other and the second ceramic green sheets deviate from each other by a length of one internal electrode pattern between two adjacent sheets in a predetermined direction, to obtain a ceramic green sheet laminate body;

a step of cutting the ceramic green sheet laminate body along a predetermined intended cutting line to obtain a laminate chip of an individual multilayer capacitor unit; and a step of firing the laminate chip to obtain the element body, wherein in the step of preparing the first ceramic green sheets, the first and second internal electrode patterns are formed so that the first and second internal electrode patterns are alternately arranged in the predetermined direction and in a direction perpendicular to the predetermined direction and so that portions corresponding to lead portions of the first and second internal electrodes in the first and second internal electrode patterns are continuous across the predetermined intended cutting line, and wherein in the step of preparing the second ceramic green sheets, the third and fourth internal electrode patterns are formed so that the third and fourth internal electrode patterns are alternately arranged in the predetermined direction and in the direction perpendicular to the predetermined direction and so that portions corresponding to lead portions of the third and fourth internal electrodes in the third and fourth internal electrode patterns are continuous across the predetermined intended cutting line.

2. The method according to claim 1, wherein the predetermined intended cutting line includes a first intended cutting line extending in parallel with the predetermined direction, and a second intended cutting line perpendicular to the first intended cutting line, and wherein in the portions corresponding to the lead portions of the third and fourth internal electrodes, a width of a region across the first intended cutting line is different from a width of a region across the second intended cutting line.

3. The method according to claim 1, wherein in the step of preparing the first ceramic green sheets, an electrode pattern for a dummy electrode is formed so as to have a space from the first and second internal electrode patterns and extend across the predetermined intended cutting line, and wherein in the step of preparing the second ceramic green sheets, an electrode pattern for a dummy electrode is formed so as to have a space from the third and fourth internal electrode patterns and extend across the predetermined intended cutting line.

4. The method according to claim 1, wherein the equivalent series resistance control section is configured to provide a desired equivalent series resistance for the multilayer capacitor.

5. A method of producing a multilayer capacitor comprising an element body of a substantially rectangular parallelepiped shape in which a plurality of internal electrodes are laminated together with a dielectric layer in between, said element body including: a capacitance section constructed in a structure in which a first internal electrode exposed in a first side face and connected to a first polarity and a second internal electrode exposed in a second side face opposed to the first side face and connected to a second polarity alternate with at least one layer of said dielectric layer in between; and an equivalent series resistance control section having a third internal electrode exposed in the first side face in which the first internal electrode is exposed and in a third side face adjacent to the first side face, and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity, the method comprising:

a step of preparing a plurality of first ceramic green sheets for the capacitance section on each of which a first internal electrode pattern corresponding to the first internal electrode and a second internal electrode pattern corresponding to the second internal electrode are formed;

a step of preparing a plurality of second ceramic green sheets for the equivalent series resistance control section on each of which a third internal electrode pattern corresponding to the third internal electrode and a fourth internal electrode pattern corresponding to the fourth internal electrode are formed;

a step of laminating the plurality of first and second ceramic green sheets in such a manner that the first ceramic green sheets deviate from each other and the second ceramic green sheets deviate from each other by a length of one internal electrode pattern between two adjacent sheets in a predetermined direction, to obtain a ceramic green sheet laminate body;

a step of cutting the ceramic green sheet laminate body along a predetermined intended cutting line to obtain a laminate chip of an individual multilayer capacitor unit; and a step of firing the laminate chip to obtain the element body, wherein in the step of preparing the first ceramic green sheets, the first and second internal electrode patterns are formed so that the first and second internal electrode patterns are alternately arranged in the predetermined direction and in a direction perpendicular to the predetermined direction and so that portions corresponding to lead portions of the first and second internal electrodes in the first and second internal electrode patterns are continuous across the predetermined intended cutting line, and wherein in the step of preparing the second ceramic green sheets, the third and fourth internal electrode patterns are formed so that the third and fourth internal electrode patterns are alternately arranged in the predetermined direction and in the direction perpendicular to the predetermined direction, so that portions corresponding to lead portions of the third and fourth internal electrodes in the third and fourth internal electrode patterns are continuous across the predetermined intended cutting line, and so that the third and fourth internal electrode patterns are alternately connected in one direction intersecting with the predetermined direction and the direction perpendicular to the predetermined direction.

6. The method according to claim 5, wherein the predetermined intended cutting line includes a first intended cutting line extending in parallel with the predetermined direction, and a second intended cutting line perpendicular to the first intended cutting line, and wherein in the portions corresponding to the lead portions of the third and fourth internal electrodes, a width of a region across the first intended cutting line is different from a width of a region across the second intended cutting line.

7. The method according to claim 5, wherein in the step of preparing the first ceramic green sheets, an electrode pattern for a dummy electrode is formed so as to have a space from the first and second internal electrode patterns and extend across the predetermined intended cutting line, and wherein in the step of preparing the second ceramic green sheets, an electrode pattern for a dummy electrode is formed so as to have a space from the third and fourth internal electrode patterns and extend across the predetermined intended cutting line.

8. The method according to claim 5, wherein the equivalent series resistance control section is configured to provide a desired equivalent series resistance for the multilayer capacitor.

9. A method of producing a multilayer capacitor comprising an element body of a substantially rectangular parallelepiped shape in which a plurality of internal electrodes are laminated together with a dielectric layer in between, said element body including: a capacitance section constructed in a structure in which a first internal electrode exposed in a first side face and connected to a first polarity and a second internal electrode exposed in a second side face opposed to the first side face and connected to a second polarity alternate with at least one layer of said dielectric layer in between; and an equivalent series resistance control section having a third internal electrode exposed in the first side face in which the first internal electrode is exposed and in a third side face adjacent to the first side face and connected to the first polarity, and a fourth internal electrode exposed in the second side face in which the second internal electrode is exposed and in a fourth side face adjacent to the second side face, except for the first and third side faces in which the third internal electrode is exposed, and connected to the second polarity, the method comprising:

a step of preparing a plurality of first ceramic green sheets for the capacitance section on each of which a first internal electrode pattern corresponding to the first internal electrode and a second internal electrode pattern corresponding to the second internal electrode are formed;

a step of preparing a plurality of second ceramic green sheets for the equivalent series resistance control section on each of which a third internal electrode pattern corresponding to the third internal electrode and a fourth internal electrode pattern corresponding to the fourth internal electrode are formed;

a step of laminating the plurality of first and second ceramic green sheets in such a manner that the first ceramic green sheets deviate from each other and the second ceramic green sheets deviate from each other by a length of one internal electrode pattern between two adjacent sheets in a predetermined direction, to obtain a ceramic green sheet laminate body;

a step of cutting the ceramic green sheet laminate body along a predetermined intended cutting line to obtain a laminate chip of an individual multilayer capacitor unit; and a step of firing the laminate chip to obtain the element body, wherein in the step of preparing the first ceramic green sheets, the first and second internal electrode patterns are formed so that the first and second internal electrode patterns are arranged each in juxtaposition in a first direction and alternately arranged in a second direction perpendicular to the first direction and so that portions corresponding to lead portions of the first and second internal electrodes in the first and second internal electrode patterns are continuous across the predetermined intended cutting line, wherein in the step of preparing the second ceramic green sheets, the third and fourth internal electrode patterns are formed so that the third and fourth internal electrode patterns are alternately arranged in one direction out of the first and second directions and arranged each in juxtaposition in the other direction out of the first and second directions, so that portions corresponding to lead portions of the third and fourth internal electrodes in the third and fourth internal electrode patterns are continuous across the predetermined intended cutting line, and so that, concerning four mutually adjacent third and fourth internal electrode patterns, the third and fourth internal electrode patterns are connected in a circuiting shape, and wherein in the step of obtaining the ceramic green sheet laminate body, the predetermined direction is set to be a direction intersecting with the first and second directions.

10. The method according to claim 9, wherein the predetermined intended cutting line includes a first intended cutting line extending in parallel with the predetermined direction, and a second intended cutting line perpendicular to the first intended cutting line, and wherein in the portions corresponding to the lead portions of the third and fourth internal electrodes, a width of a region across the first intended cutting line is different from a width of a region across the second intended cutting line.

11. The method according to claim 9, wherein in the step of preparing the first ceramic green sheets, an electrode pattern for a dummy electrode is formed so as to have a space from the first and second internal electrode patterns and extend across the predetermined intended cutting line, and wherein in the step of preparing the second ceramic green sheets, an electrode pattern for a dummy electrode is formed so as to have a space from the third and fourth internal electrode patterns and extend across the predetermined intended cutting line.

12. The method according to claim 9, wherein the equivalent series resistance control section is configured to provide a desired equivalent series resistance for the multilayer capacitor.

* * * * *